United States Patent
Yamaguchi et al.

(10) Patent No.: US 7,412,296 B2
(45) Date of Patent: Aug. 12, 2008

(54) WORKING CONTROL DEVICE

(75) Inventors: Shingo Yamaguchi, Kawasaki (JP);
Hiroshi Takahashi, Kawasaki (JP);
Satoshi Kanbayashi, Kawasaki (JP);
Katsuyuki Kurita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 278 days.

(21) Appl. No.: 10/766,043

(22) Filed: Jan. 29, 2004

(65) Prior Publication Data

US 2004/0186614 A1  Sep. 23, 2004

(30) Foreign Application Priority Data

Jan. 31, 2003  (JP) .............................. 2003-024866
Jul. 28, 2003  (JP) .............................. 2003-202592

(51) Int. Cl.
G06F 19/00 (2006.01)
G05B 11/01 (2006.01)

(52) U.S. Cl. ............................. 700/98; 700/29; 700/160

(58) Field of Classification Search .................. 700/159, 700/29, 86, 87, 160, 182–184, 175, 124, 700/108, 98, 174, 187
See application file for complete search history.

(56) References Cited

U.S. PATENT DOCUMENTS

| 4,789,931 | A | * | 12/1988 | Kuragano et al. ........... 700/176 |
| 5,191,538 | A | * | 3/1993 | Yoneda et al. .............. 700/174 |
| 5,276,606 | A | | 1/1994 | Mizukami et al. |
| 5,383,131 | A | | 1/1995 | Itamoto et al. |
| 5,428,547 | A | * | 6/1995 | Ikeda ......................... 700/174 |
| 5,465,221 | A | * | 11/1995 | Merat et al. ................... 702/83 |
| 5,815,400 | A | * | 9/1998 | Hirai et al. .................. 700/173 |
| 6,161,055 | A | * | 12/2000 | Pryor .......................... 700/175 |
| 6,535,788 | B1 | | 3/2003 | Yoshida et al. |

(Continued)

FOREIGN PATENT DOCUMENTS

EP        0 198 927 A1     10/1986

(Continued)

OTHER PUBLICATIONS

Yuan-Jye Tseng et al: "Recognizing Multiple Interpretations of Interacting Machining Features" Computer Aided Design, Elsevier Publishers BV., Barking, GB, vol. 26, No. 9, Sep. 1, 1994, pp. 667-688.

(Continued)

Primary Examiner—Thomas K Pham
(74) Attorney, Agent, or Firm—Westerman, Hattori, Daniels & Adrian, LLP.

(57) ABSTRACT

To provide a working control device, a working control program and a working control system enabling the working under proper working conditions by searching for a working case corresponding to characteristics of a configuration to be worked and setting the working conditions based on this working case. Configuration information about characteristics of a three-dimensional configuration is obtained from design data of an object workpiece, a working case is searched out based on the configuration information from the working case storage unit storing working conditions, as a working case, of the working conducted in the past, the working conditions are determined based on the working case searched out by the case searching unit, and a working machine is controlled based on the working conditions.

25 Claims, 39 Drawing Sheets

U.S. PATENT DOCUMENTS

| | | | |
|---|---|---|---|
| 6,591,156 B1 * | 7/2003 | Fukaya et al. | 700/159 |
| 6,643,560 B2 * | 11/2003 | Shimomura | 700/160 |
| 6,772,038 B2 * | 8/2004 | Kadono | 700/159 |
| 2001/0000805 A1 | 5/2001 | Kadono | |

FOREIGN PATENT DOCUMENTS

| | | |
|---|---|---|
| EP | 0 501 494 A2 | 9/1992 |
| EP | 0 664 186 A1 | 7/1995 |
| EP | 0 881 034 A1 | 12/1998 |
| EP | 0 913 229 A1 | 5/1999 |
| EP | 1 065 029 A1 | 1/2001 |
| EP | 1 087 277 A2 | 3/2001 |
| EP | 1 132 789 A2 | 9/2001 |
| EP | 1 217 482 A2 | 6/2002 |
| EP | 1 296 211 A1 | 3/2003 |
| JP | 60-127946 A | 7/1985 |
| JP | 01-216745 A | 8/1989 |
| JP | 4-106603 | 4/1992 |
| JP | 5-108132 A | 4/1993 |
| JP | 8-211919 | 8/1996 |
| JP | 10034496 A * | 2/1998 |
| JP | 11165239 A * | 6/1999 |
| JP | 11175124 A * | 7/1999 |
| JP | 2000-84794 | 3/2000 |
| JP | 2002-116807 | 4/2000 |
| JP | 2001-5507 A | 1/2001 |
| JP | 2002-189510 | 7/2002 |
| WO | WO 02/03156 A1 | 1/2002 |

OTHER PUBLICATIONS

Van Den Berg E et al: "Freeform feature modeling: concept and prospects" Computers in Industry, Elsevier Science Publishers. Amsterdam, NL, vol. 49, No. 2, Oct. 2002, pp. 217-233.

Ferreira J C E et al: "Convex Hull-Based Feature-Recognition Method for 2.5D Components" Computer Aided Design, Elsevier Publishers BV., Barking GB, vol. 22, No. 1, Jan. 1990, pp. 41-49.

M C Wu et al: "Analysis on machined feature recognition techniques based on B-rep" Computer Aided Design, Elsevier Publishers BV., Barking, GB, vol. 28, No. 8, Aug. 1996, pp. 603-316.

Suresh K et al: "Constant Scallop-Height Machining of Free-Form Surfaces" Transactions of the American Society of Mechanical Engineers, Series B: Journal of Engineering for Industry, ASME. New York, US, vol. 116, No. 2. May 1, 1994, pp. 253-259.

Japanese Office Action dated Jan. 8, 2008, issued in corresponding Japanese Application No. 2003-202592.

* cited by examiner

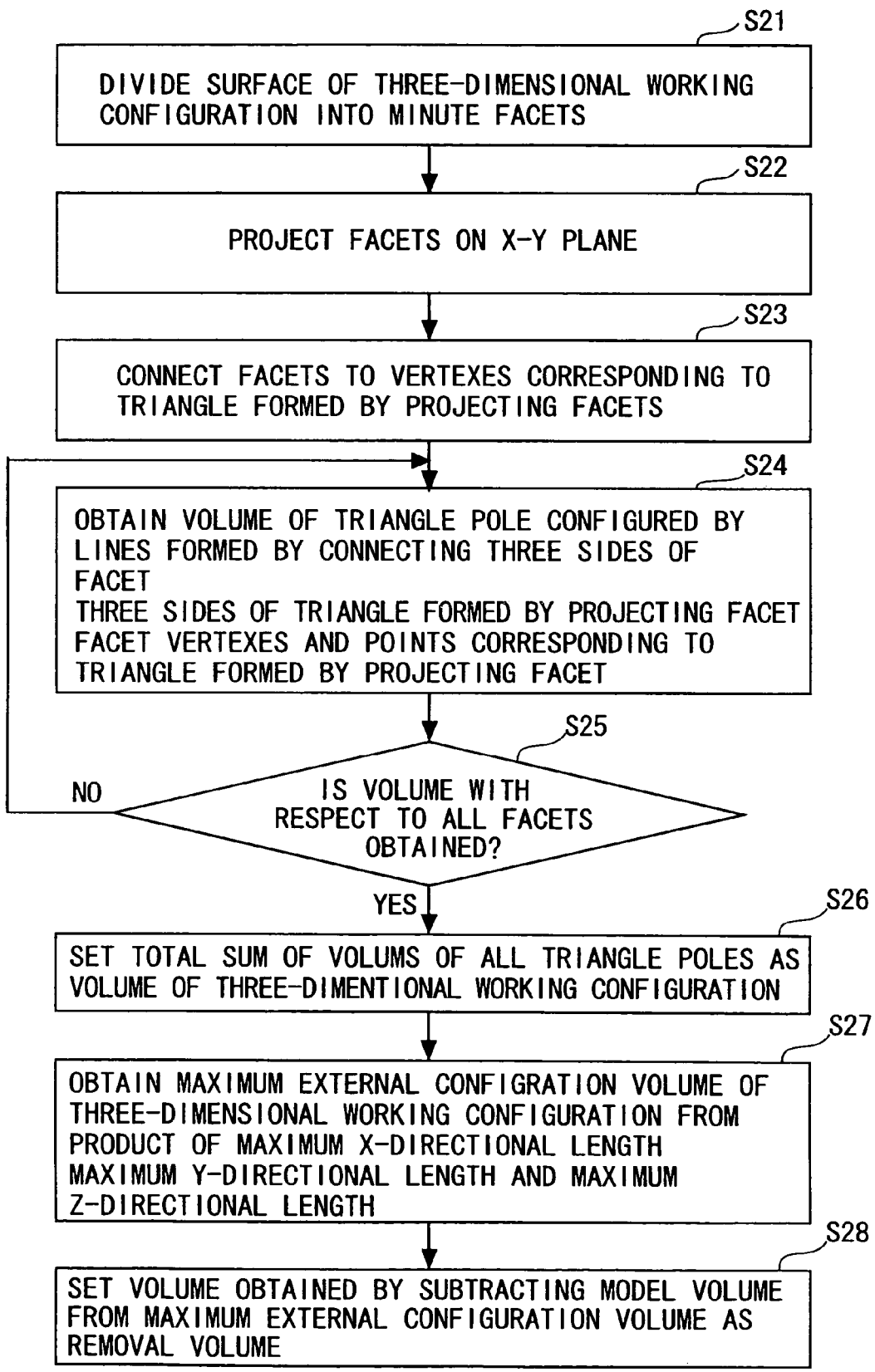

FIG. 8A
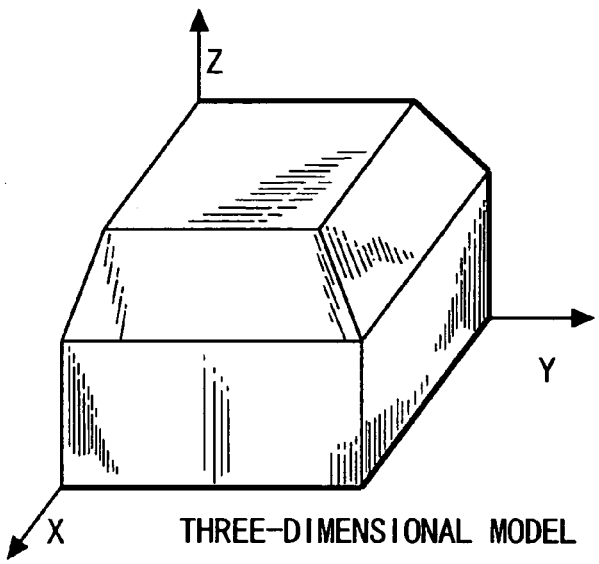
THREE-DIMENSIONAL MODEL
FIG. 8B
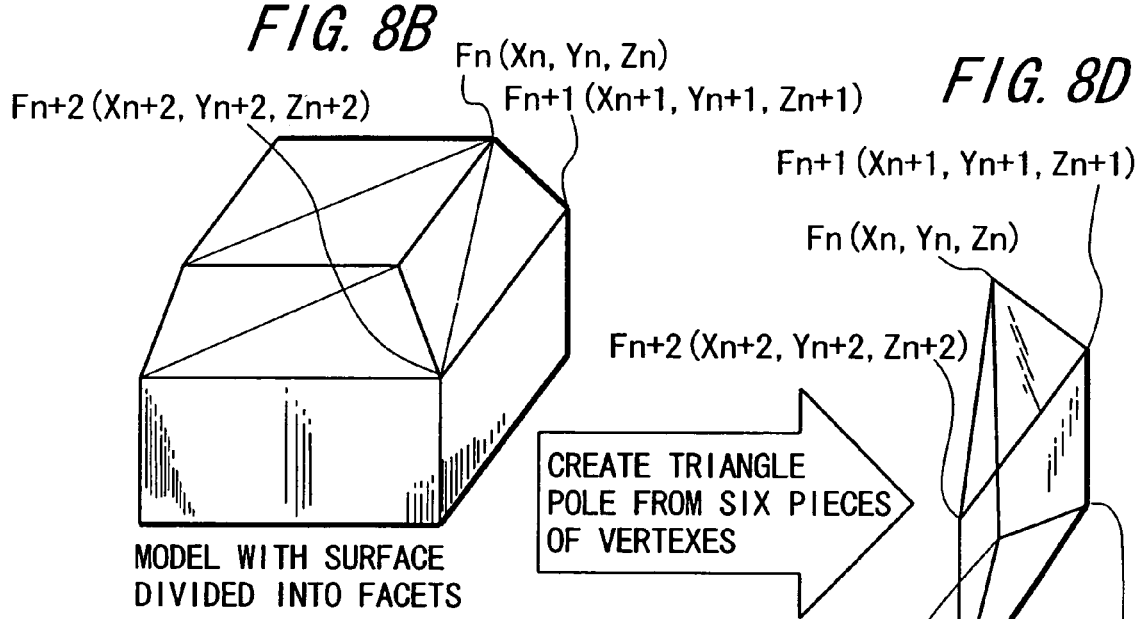
MODEL WITH SURFACE DIVIDED INTO FACETS
CREATE TRIANGLE POLE FROM SIX PIECES OF VERTEXES
FIG. 8D
FIG. 8C
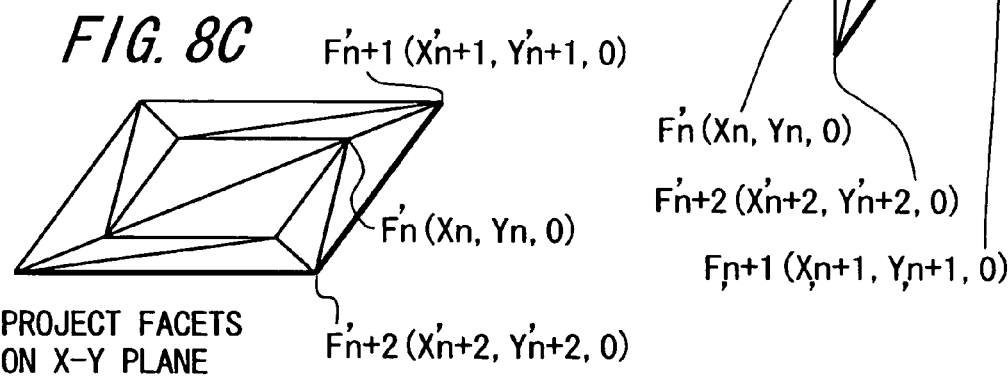
PROJECT FACETS ON X-Y PLANE

REMOVAL VOLUME

91

THREE-DIMENSIONAL WORKING
CONFIGURATION VOLUME

FIG. 15A

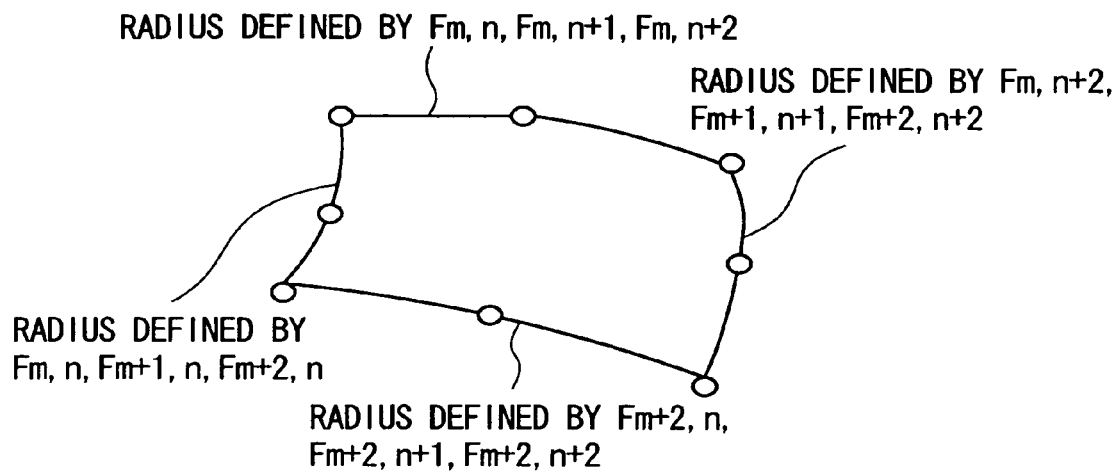

RADIUS DEFINED BY Fm, n, Fm, n+1, Fm, n+2

RADIUS DEFINED BY Fm, n+2, Fm+1, n+1, Fm+2, n+2

RADIUS DEFINED BY Fm, n, Fm+1, n, Fm+2, n

RADIUS DEFINED BY Fm+2, n, Fm+2, n+1, Fm+2, n+2

FIG. 15B

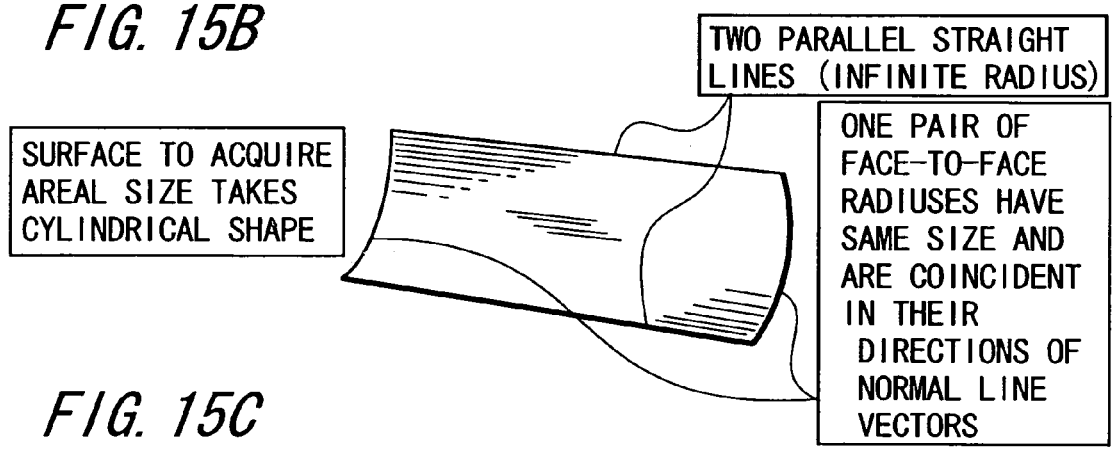

SURFACE TO ACQUIRE AREAL SIZE TAKES CYLINDRICAL SHAPE

TWO PARALLEL STRAIGHT LINES (INFINITE RADIUS)

ONE PAIR OF FACE-TO-FACE RADIUSES HAVE SAME SIZE AND ARE COINCIDENT IN THEIR DIRECTIONS OF NORMAL LINE VECTORS

FIG. 15C

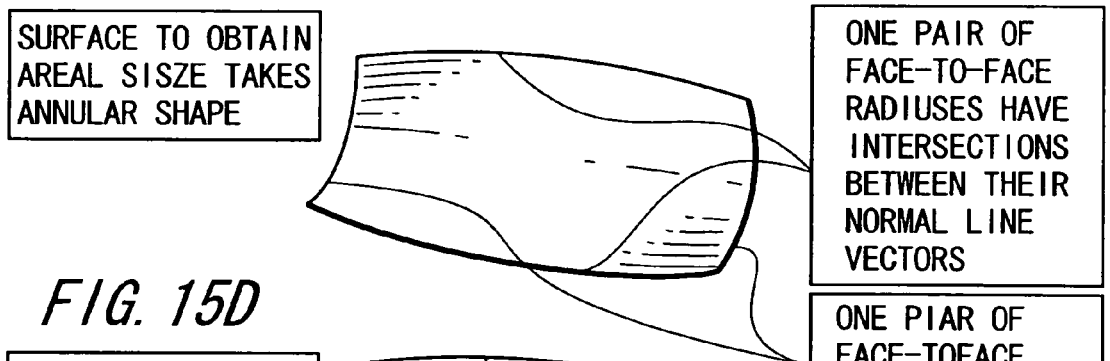

SURFACE TO OBTAIN AREAL SISZE TAKES ANNULAR SHAPE

ONE PAIR OF FACE-TO-FACE RADIUSES HAVE INTERSECTIONS BETWEEN THEIR NORMAL LINE VECTORS

FIG. 15D

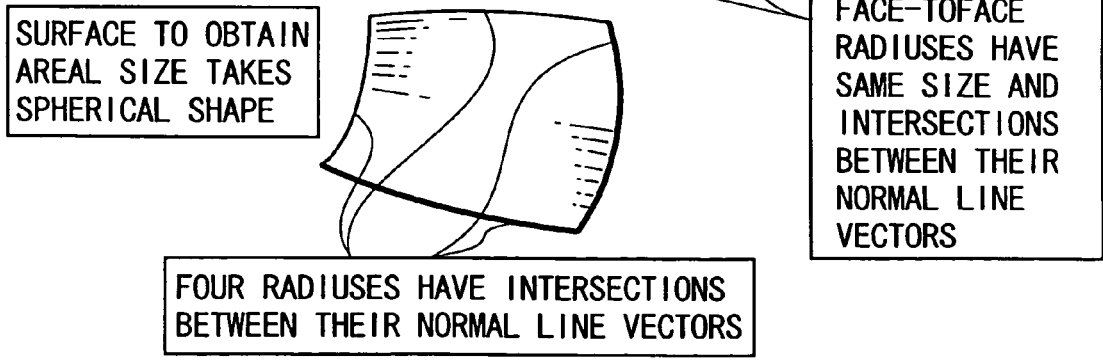

SURFACE TO OBTAIN AREAL SIZE TAKES SPHERICAL SHAPE

ONE PIAR OF FACE-TOFACE RADIUSES HAVE SAME SIZE AND INTERSECTIONS BETWEEN THEIR NORMAL LINE VECTORS

FOUR RADIUSES HAVE INTERSECTIONS BETWEEN THEIR NORMAL LINE VECTORS

FIG. 17A

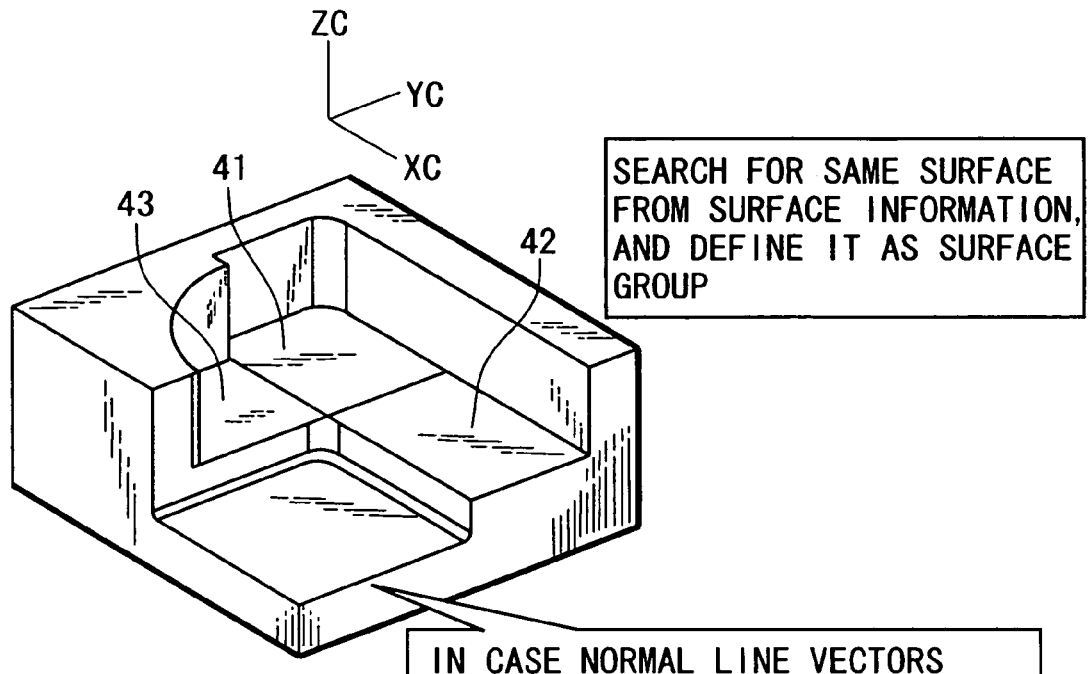

SEARCH FOR SAME SURFACE FROM SURFACE INFORMATION, AND DEFINE IT AS SURFACE GROUP

IN CASE NORMAL LINE VECTORS IN WORKING HORIZONTAL DIRECTION ARE PARALLEL AT POINTS ON RESPECTIVE SURFACE DGES, IT IS JUDGED THAT EDGES ARE SHARED. →SURFACES THEREOF ARE ADJACENT TO EACH OTHER.

FIG. 17B

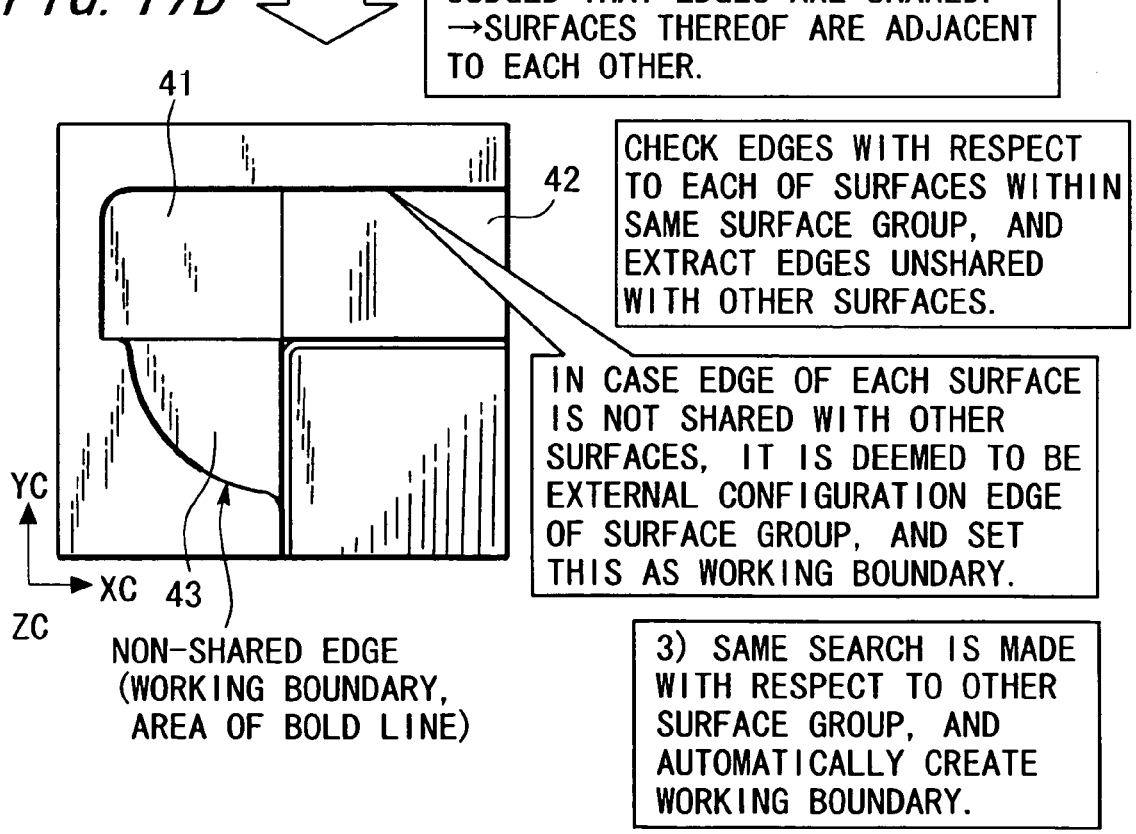

NON-SHARED EDGE (WORKING BOUNDARY, AREA OF BOLD LINE)

CHECK EDGES WITH RESPECT TO EACH OF SURFACES WITHIN SAME SURFACE GROUP, AND EXTRACT EDGES UNSHARED WITH OTHER SURFACES.

IN CASE EDGE OF EACH SURFACE IS NOT SHARED WITH OTHER SURFACES, IT IS DEEMED TO BE EXTERNAL CONFIGURATION EDGE OF SURFACE GROUP, AND SET THIS AS WORKING BOUNDARY.

3) SAME SEARCH IS MADE WITH RESPECT TO OTHER SURFACE GROUP, AND AUTOMATICALLY CREATE WORKING BOUNDARY.

FIG. 33A

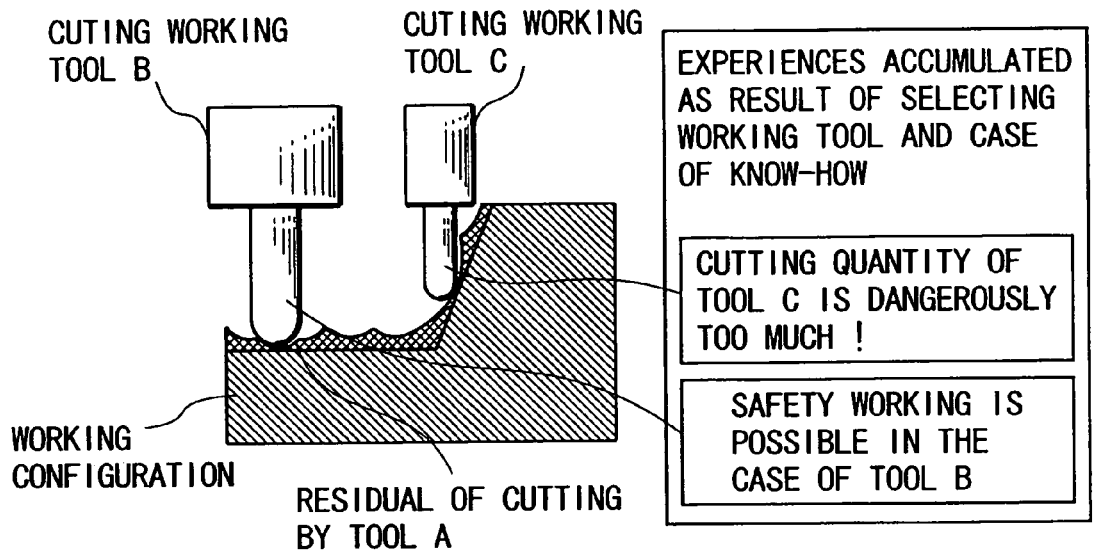

CUTTING WORKING TOOL B
CUTTING WORKING TOOL C
WORKING CONFIGURATION
RESIDUAL OF CUTTING BY TOOL A

EXPERIENCES ACCUMULATED AS RESULT OF SELECTING WORKING TOOL AND CASE OF KNOW-HOW

CUTTING QUANTITY OF TOOL C IS DANGEROUSLY TOO MUCH !

SAFETY WORKING IS POSSIBLE IN THE CASE OF TOOL B

FIG. 33B

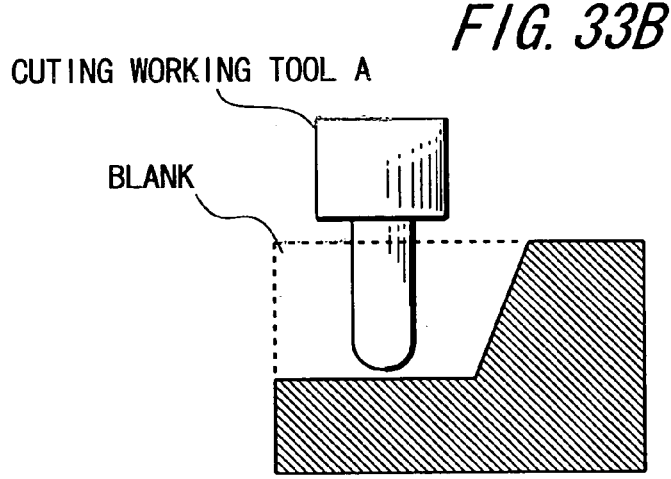

CUTING WORKING TOOL A
BLANK

FIG. 33C

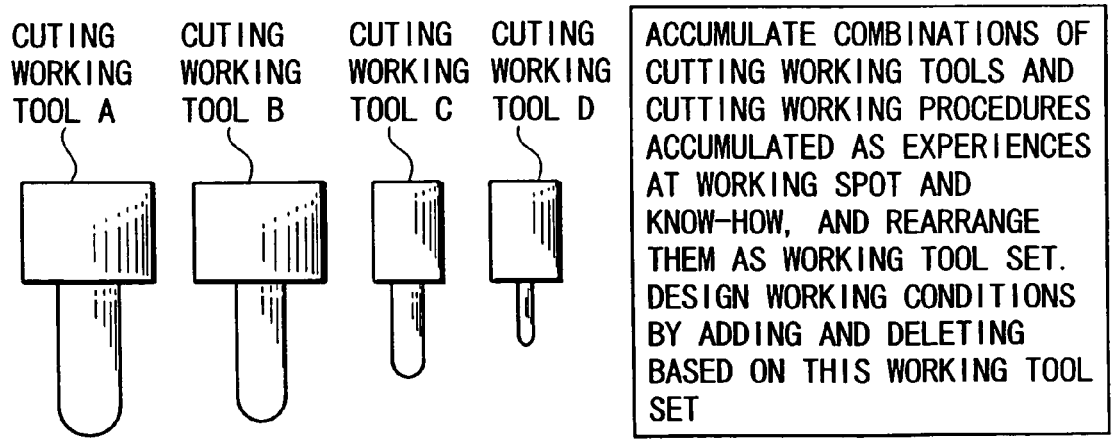

CUTTING WORKING TOOL A
CUTTING WORKING TOOL B
CUTTING WORKING TOOL C
CUTTING WORKING TOOL D

ACCUMULATE COMBINATIONS OF CUTTING WORKING TOOLS AND CUTTING WORKING PROCEDURES ACCUMULATED AS EXPERIENCES AT WORKING SPOT AND KNOW-HOW, AND REARRANGE THEM AS WORKING TOOL SET. DESIGN WORKING CONDITIONS BY ADDING AND DELETING BASED ON THIS WORKING TOOL SET

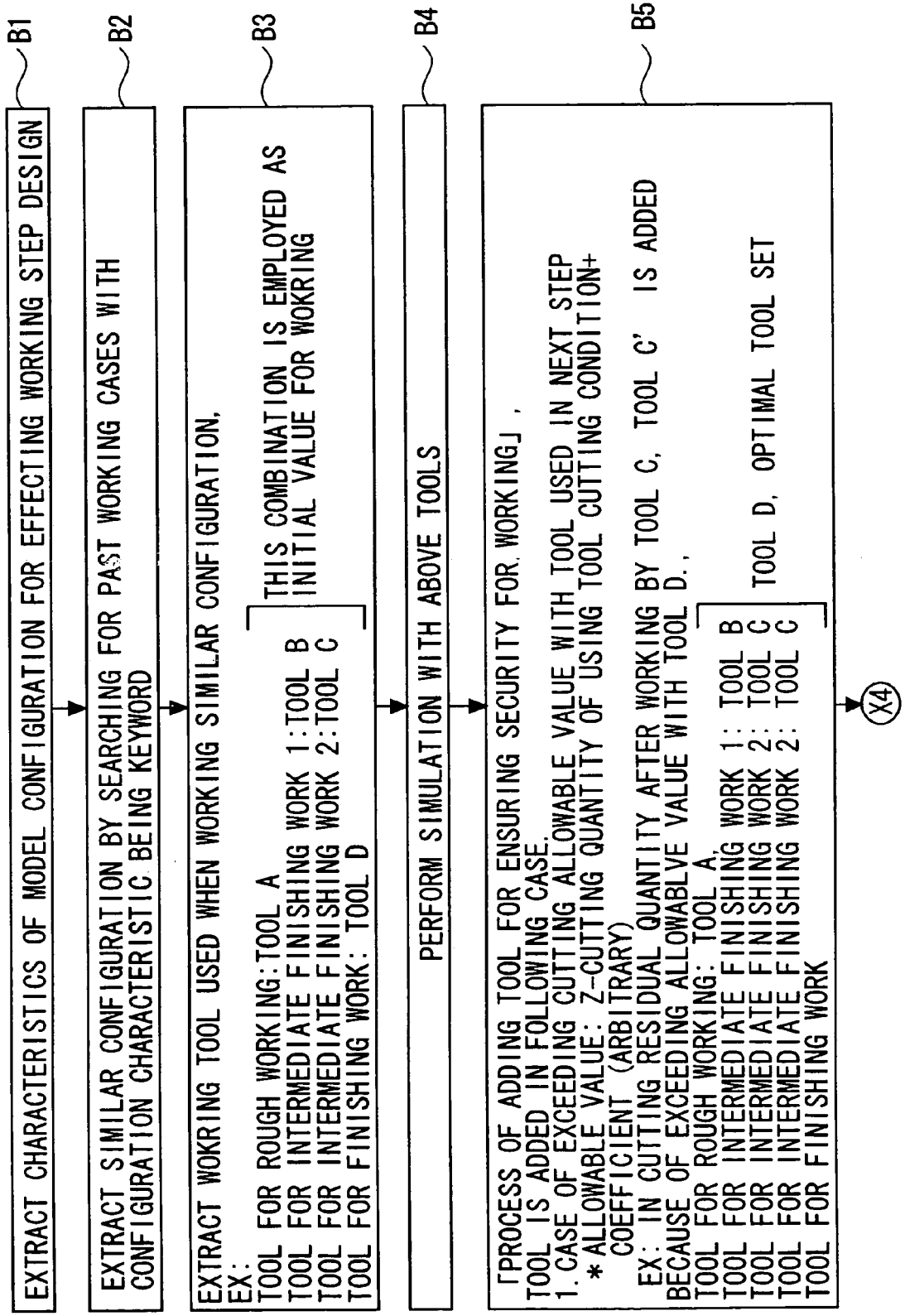

B6:
「PROCESS OF DELETING TOOL FOR MAKING WORKING EFFICIENT」
1. CASE OF BEING SMALL OF CUTTING RESIDUAL QUANTITY EVEN WHEN THERE IS NO RELEVANT TOOL AND BEING POSSIBLE OF WOKRING BECAUSE OF WITHIN CUTTING ALLOWABLE VALUE WITH TOOL IN NEXT STEP.
※ALLOWABLE VALUE: Z-CUTTING QUANTITY OF USING TOOL CUTTING CONDITION + COEFFICIENT(ARBITRARY)
EX: TOOL C IS DELETED BECAUSE OF BEING SMALL OF CUTTING RESIDUAL QUANTITY AFTER WORKING BY TOOL B AND BECAUSE OF NOT EXCEEDING ALLOWABLVE VALUE WITH TOOL D.
TOOL FOR ROUGH WORKING: TOOL A ⎤
TOOL FOR INTERMEDIATE FINISHING WORK 1: TOOL B ⎬ OPTIMAL TOOL SET
TOOL FOR FINISHING WORK ⎦

→

B7: DETERMINE OPTIMAL USING TOOL SUITED TO CONFIGURATION

WORKING CONTROL DEVICE

BACKGROUND OF THE INVENTION

The invention relates to a technology of obtaining an object workpiece by working a work material in a way that controls a cutting machine on the basis of design information defined on a computer.

There has hitherto been known a device contrived to automatically perform working by controlling a working machine on the basis of CAD data, etc. For instance, there is proposed a control device for a machine tool that includes tool route determining means for: inputting workpiece data about workpiece configuration data concerning a final workpiece configuration and workpiece data about a material and a configuration of the workpiece; generating a workpiece working tool route on the basis of data stored with machine s data containing characteristics of a machine body such as a column, a bed, etc. of the machine tool, and tool s data about a working tool which contain a deformation, etc. at a working time when this tool is attached to a holder; and determining working conditions such as a rotating speed of a main shaft, a feeding speed, etc. of the machine tool.

In the conventional device, a working process is determined by a predetermined algorithm which involves using generally three-dimensional CAD data and databases, thereby actualizing automation and standardization. In this case, contents of the database are not automatically updated unless a man changes them, and a result of working is not reflected in the contents of the database. Further, for adjusting the working process outputted from a system it was required that a man having special knowledge adjusts the database.

Therefore, a so-called condition library is main as the database, and there was no system having, as intra-system function, a role performed by an operator such as optimizing the conditions and storing working phenomena, and automatically generating NC data by optimally combining these pieces of information.

Further, as to a so-called feedback system, there exists a working condition correcting device for measuring dimensions of a plurality of workpieces, obtaining an error between a value of this time and a value of the last time of a specified value thereof, and correcting it, however, there exists none of devices used for correcting a feed and the number of revolutions of a working machine in real time while monitoring a main shaft load and working phenomena such as a chatter, etc. during cutting of one workpiece or for correcting the cutting conditions when working next time.

Moreover, in a conventional working control device, a feedback of the result of working to the database is intended for what can be expressed as a measured numerical value such as the number of revolutions, a feed speed, a working time, a dimensional accuracy, etc., wherein an intention and a judgment of the operator is not reflected therein as in a case where if preferable of fitting to other parts, an acceptance is gained even when, for instance, the measured value deviates from a dimensional tolerance, and a case where it is sufficient if a molding product is separable from a die even when the surface roughness of an insert part of a molding portion is rougher than a designated value in a resin molding product die assembly.

Moreover, the tool and the process have hitherto been determined from an experience of the operator. In a three-dimensional CAM that is widely utilized at the present, it is not yet automated as to which tool is used and which process this tool is used.

Note that there was proposed a system having a function of designing the working process based on the database stored with a type of a product to be worked, a tool and a process in a way that makes them mapping to each other, however, there is not any system for designing the working process from a tool library retaining a given 3D configuration without having such a type of database.

Further, a system exists, wherein a small tool is determined by calculating a cutting quantity and a cutting residual in sequence from the largest diameter, however, there is no system for calculating a maximum tool diameter that should be used, from a minimum tool diameter that is to be used by the operator for finishing, and a great deal of experiences of the operator were needed.

SUMMARY OF THE INVENTION

In the devices described above, the following problems are pointed out.

(a) Know-how of the well-experienced operator who creates the NC data can not be reflected in cutting conditions by other operators, and therefore the same failure is to be repeated between different operators.

(b) Education and training of the operator who creates the NC data is time-consuming.

(c) A result of creating the NC data differs depending on the know-how of the operator, and there occurs a difference in working state.

(d) Generally, cutting working conditions are written on the paper or left as a memory of the well-experienced operator, and are difficult to be accurately stored and utilized by others.

(e) As the working machine is changed, new working know-how needs accumulating.

(f) A working system for analyzing for drawing optimal working conditions takes too much time and is unsuited to a working spot in which the time is an important factor for decreasing the costs down and for management the processes.

(g) Whether the tool and the process can be adequately determined or not, depends on the experience of the operator, and hence there arise problems such as a scatter in working quality, non-efficient cutting and a use of improper tool. Moreover, in the case of the system including the database stored with a classification of a product to be worked in a way that make them mapping to a tool and a process, even an less-experienced operator is able to handle it to some extent but is unable to determine a proper tool and process with respect to configurations that the database does not retain. Accordingly, in a case where a man determines the tool, to start with, a tool having a diameter suited to rough working is determined based on the experience, and subsequently, the tools are determined in sequence from the largest diameter such as a tool for intermediate finishing and a tool for final finishing. To replace this with the system, in the case of determining the tools in sequence from the largest diameter, the calculations are performed in sequence from the tool having the largest diameter so far as they are usable, and therefore this is non-efficient.

The invention was made to solve the problems given above. Namely, the invention aims at providing a technology enabling the working under proper working conditions by searching for a working case corresponding to characteristics of a configuration to be worked and setting the working conditions based on this working case.

The invention adopted the following means in order to accomplish the object.

In a working control device, a working control program and a working control system of the invention, configuration information about characteristics of a three-dimensional configuration is obtained from design data of an object workpiece, a working case is searched out based on the configuration information from a working case storage unit for storing working conditions, as a working case, of the working conducted in the past, working conditions are determined based on the working case searched out by the case searching unit, and a working machine is controlled based on the working conditions.

A contrivance of the invention is, putting an emphasis on similarities of a working tool, a working process, further, a behavior of a cutting tool during the working and a result of the working if there are similarities in configuration between design data of the object workpiece that should be worked and the working cases conducted in the past, that the working case is accumulated and searched out based on characteristics of the configuration, and the working conditions are determined based on this working case, whereby a result of the working in the past can be utilized. Namely, even a less-experienced operator can perform the working based on the past examples accumulated on a database. Moreover, failure cases can be accumulated together with successful cases after the cutting/working, and it is therefore possible to prevent similar failures from being repeated.

<<Readable-by-Computer Recording Medium>>

The invention may also be a recording medium in such a form that the program is recorded on a readable-by-computer recording medium. Then, the computer reads and executes the program on this recording medium, whereby the functions thereof can be provided.

Herein, the readable-by-computer recording medium connotes a recording medium capable of accumulating information such as data, programs, etc. electrically, magnetically, optically and mechanically or by chemical action, which can be read from the computer. What is demountable out of the computer among those recording mediums are, e.g., a flexible disk, a magneto-optic disk, a CD-ROM, a CD-R/W, a DVD, a DAT, an 8 mm tape, a memory card, etc.

Further, a hard disk, a ROM (Read Only Memory) and so on are given as recording mediums fixed to the computer.

As explained above, the invention enables the working under the proper working conditions by searching for the working case in accordance with the characteristics of the configuration to be worked and setting the working conditions based on this working case.

DESCRIPTION OF THE DRAWINGS

FIG. 7 is a flowchart of calculating a removal volume.

FIG. 8A-8D are an explanatory view of calculating the removal volume. FIGS are a view of calculating the removal volume.

FIG. 15A-15D are an explanatory view of obtaining the largest concave shape radius.

FIG. 17A-17B are an explanatory view of obtaining a working boundary.

FIG. 33A-33C are an explanatory diagram in the case of selecting a plurality of tools as a set.

FIG. 34 is a flowchart of control of selecting the plurality of tools as a set:

FIG. 35 is a flowchart of the control of selecting the plurality of tools as a set.

DETAILED DESCRIPTION OF THE INVENTION

A working system will be explained based on drawings in FIGS. 1 through 35 by way of embodiments of the invention.

<System Architecture>

Figure 1:
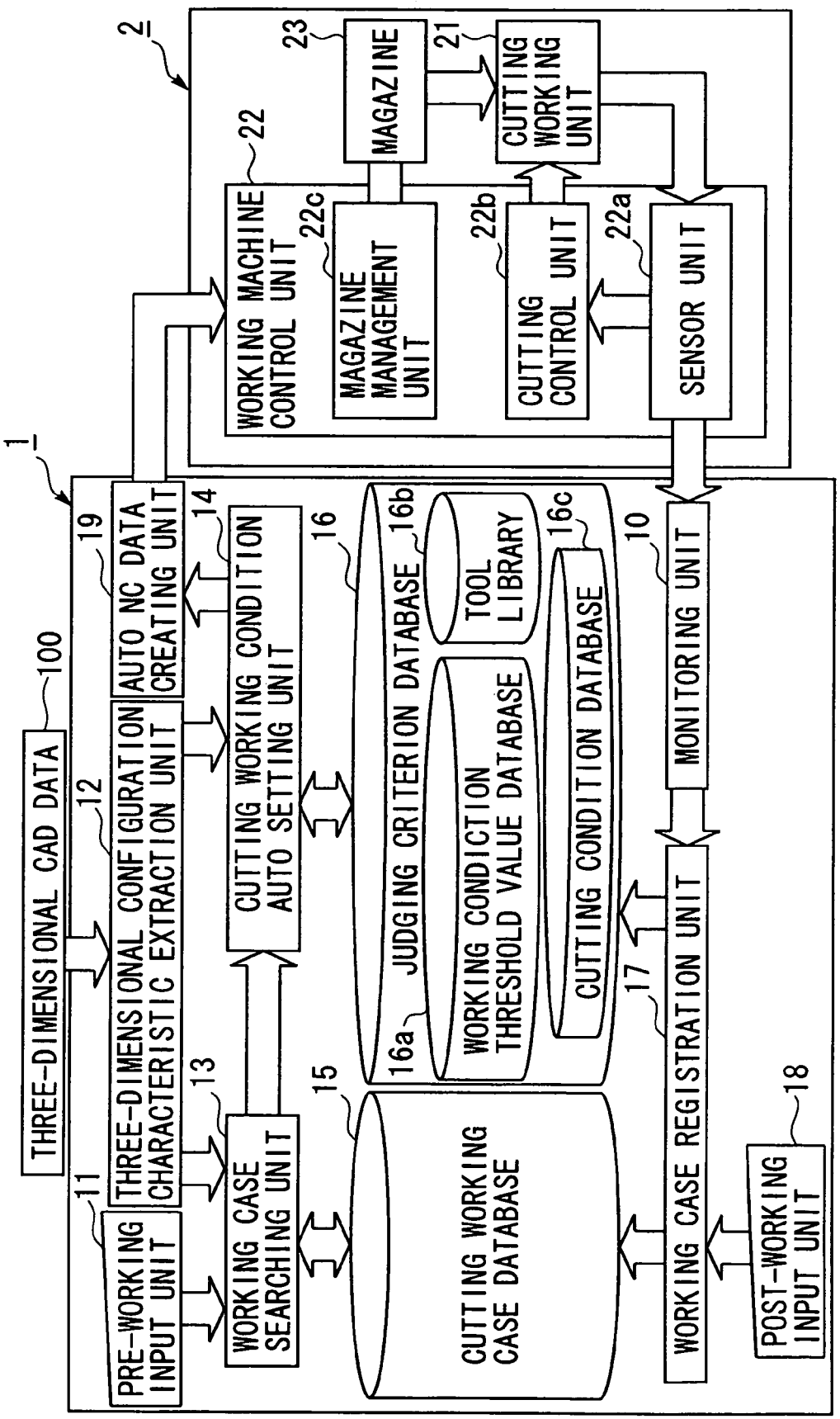
FIG. 1 is a schematic diagram of a working control system according to the invention.

FIG. 1 is a block diagram showing an architecture of the working system in an embodiment.

The working system in the embodiment is constructed of a working control device 1 and a working machine 2 controlled by this working control device 1.

§1. Working Control Device

The working control device 1 includes a pre-working input unit 11, a three-dimensional configuration characteristic extraction unit (corresponding to a configuration characteristic extraction unit) 12, a case searching unit 13, a cutting working condition auto setting unit (corresponding to a working condition setting unit) 14, a cutting working case database (corresponding to a working case storage unit) 15, a judgment criterion database (corresponding to a judgment criterion storage unit) 16, a working case registration unit 17, a post-working input unit 18, an auto NC data creating unit (control unit) 19, and a monitoring unit 10.

This pre-working input unit 11, which is an operation unit such as a keyboard, a touch panel, etc. and is operated by an operator, accepts an input of information(object workpiece information) about an object workpiece. The information about the object workpiece is information that is not contained in design data among pieces of data necessary for working, such as a classification, rigidity, etc. of a work material.

The three-dimensional configuration characteristic extraction unit 12, as will be described later on, obtains configuration information on characteristics of a three-dimensional configuration from three-dimensional CAD data (corresponding to design data) of the object workpiece).

The case searching unit 13 searches out a working case from the cutting working case database 15 on the basis of the configuration information obtained by the three-dimensional characteristic extraction unit 12.

The cutting working condition auto setting unit 14 determines working conditions based on the working case searched out by the case searching unit 13.

The cutting working case database 15 is stored with working conditions, as working cases, of the workings conducted in the past.

The judgment criterion database 16 is stored, as information serving as judgment criteria for the working conditions, with a working condition threshold value database 16a, a tool library 16b, a cutting condition database 16c, etc.

The working case registration unit 17 stores the working case storage unit with information of the working machine 2 that has been acquired by the monitoring unit 10 in a way that makes it as a working case mapping to the configuration information.

The post-working input unit 18, which is an operation unit such as a keyboard, a touch panel, etc. and is operated by the operator, accepts an input of information about whether the working is preferable or not. Note that one single keyboard serves as both of the pre-working input unit 11 and the post-working input unit 18 in the embodiment.

The auto NC data creating unit 19 controls the working machine 2 on the basis of the working conditions set by the cutting working condition auto setting unit 14.

The monitoring unit 10 acquires the information of the working machine 2 when the auto NC data creating unit 19 performs controlling based on the working conditions.

The working control device 1 may be a dedicated electronic device constructed of electronic circuits (hardware) designed exclusively as the respective units 10~19, and may also be a device in which the functions of the respective units 10~19 are actualized softwarewise on a general-purpose computer.

Figure 2:
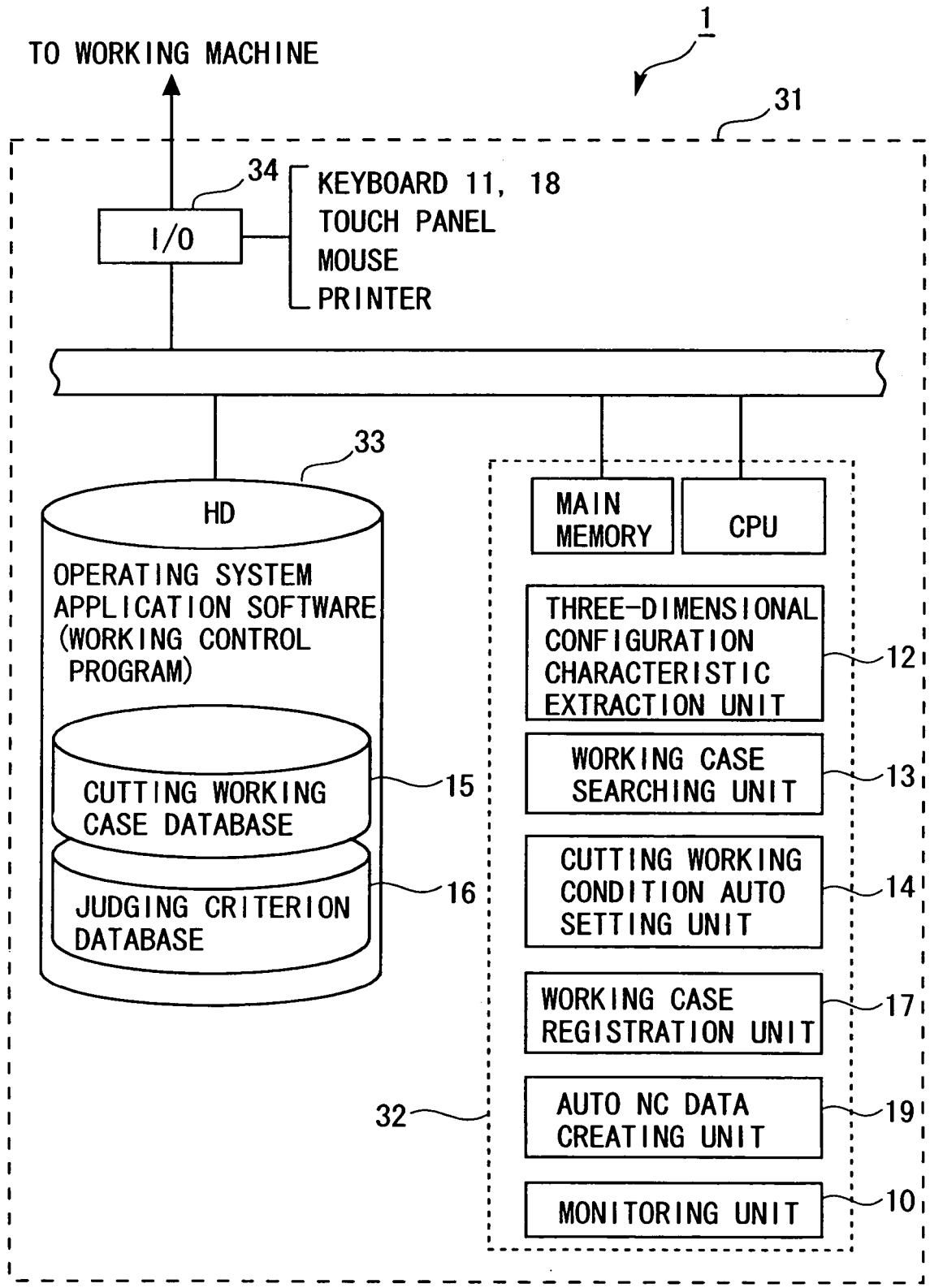
FIG. 2 is a schematic architecture diagram of a working control device.

Note that the working control device 1 in the embodiment is, as shown in FIG. 2, a general type of computer.

As illustrated in the same Figure, the working control device 1 includes, within a main body 31, an arithmetic processing unit 32 constructed of a CPU (central processing unit), a main memory, etc., a storage device (hard disk) 33 stored with data and software for the arithmetic processes, an input/output unit (I/O) 34 and so on.

Connected properly to the input/output unit 34 are an input device such as a keyboard (the pre-working input unit 11, the post-working input unit 18), the mouse, etc, an output device such as a display device, a printer, etc., and an interface for transmitting and receiving the information to and from other devices.

An operating system (OS) and application software (a working control program) are installed into the storage device 33. Further, the cutting working case database 15 and the judgment criterion database 16 are built up in the storage device 33.

The arithmetic processing unit 32 executes the arithmetic processes according to the working control program, thereby functioning as the three-dimensional configuration characteristic extraction unit (corresponding to the configuration characteristic extraction unit) 12, the case searching unit 13, the cutting working condition auto setting unit 14, the working case registration unit 17, the auto NC data creating unit 19 and the monitoring unit 10.

§2. Working Machine

The working machine 2 in the embodiment includes a cutting working unit 21, a working machine control unit 22 and a magazine 23.

This cutting working unit 21 is constructed of an installation base for attaching a work material, a cutting tool, a main shaft for fitting this tool, a rotation driving unit for the main shaft, a feed driving unit for feeding in X-axis, Y-axis and Z-axis directions, etc., and performs cutting/working of the work material.

The working machine control unit 22 controls the cutting working unit 21 on the basis of NC data. This working machine control unit 22 includes a sensor unit 22A for detecting a working state of the working machine 2, a cutting control unit 22B for controlling the cutting working unit 21 in accordance with the working state detected by the sensor unit 22a and the NC data, a magazine management unit 22c for giving an instruction of acquiring information of the tool housed in the magazine and an instruction of replacing the tool, and so on.

The magazine 23 houses the tool used in the cutting working unit 21. Further, the magazine 23 has a function (ATC) of replacing the tool used in the cutting working unit 21 in accordance with the NC data.

<Working Procedures>

Next, working control procedures in the system will be described by use of FIGS. 3~35.

§1. Basic Procedure

Figure 3:
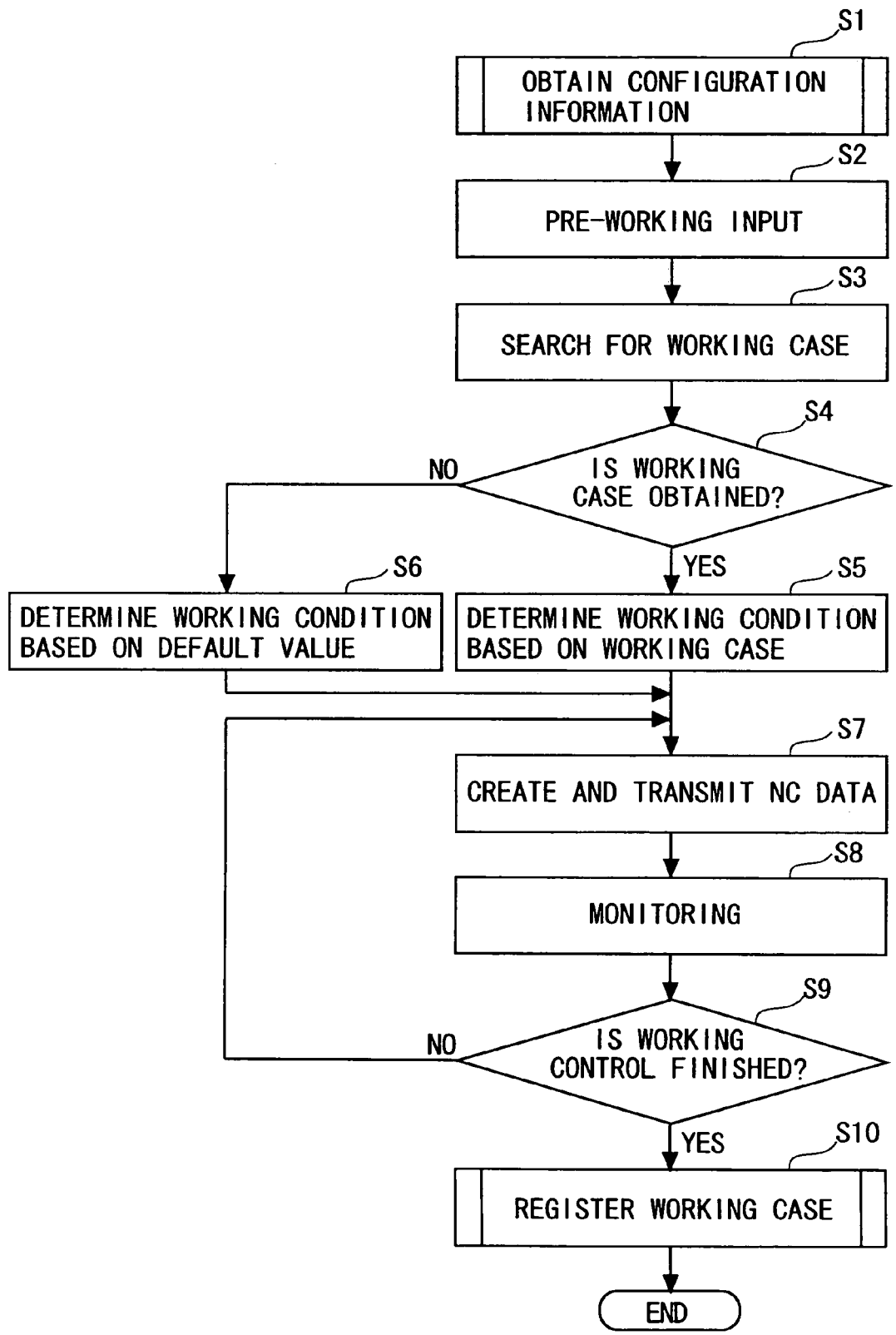
FIG. 3 is an explanatory chart of a working control procedure.

In the working control device 1, upon an input of three-dimensional CAD data 100 of an object workpiece, as shown in FIG. 3, the three-dimensional configuration characteristic extraction unit 12 obtains configuration information about characteristics of a three-dimensional configuration from the three-dimensional CAD data 100 in step S1.

Further, the operator inputs pieces of object workpiece information such as a classification, a rigidity of the work material by operating the pre-working input unit 11 in step S2, the pre-working input unit 11 accepts this input and inputs it to the case searching unit 13.

In next step S3, the case searching unit 13 searches out a working case from the cutting working case database 15 with the configuration information being as a search key.

In next step S4, the cutting working condition auto setting unit 14 judges whether or not the working case was obtained in step S3, moves to step S5 if obtained, and determines working conditions based on this working case and the information in the judgment criterion database 16. Moreover, if the working case was not obtained in step S3, moving to step S6, wherein the cutting working condition auto setting unit 14 determines the cutting working conditions on the basis of the configuration information obtained by the thee-dimensional configuration characteristic extraction unit 12, the information accepted by the pre-working input unit 11 and the information in the judgment criterion database 16. Herein, the cutting condition database 16c of the judgment criterion database 16 is previously stored with maker recommendation values and default values of the working conditions in accordance with the three-dimensional configuration and the classification of the work material. The cutting working condition auto setting unit 14, if unable to obtain the working case, determines the working conditions by referring to the maker recommendation values and the default values in accordance with the configuration information, etc.

In next step S7, the auto NC data creating unit 19 creates NC data based on the working conditions determined by the cutting working condition auto setting unit 14, and transmits the NC data to the working machine 2 via the interface of the I/O 34. On the other hand, the working machine 2 effects, based on the NC data, the cutting/working.

In next step S8, the monitoring unit 10 receives the information detected by the sensor unit 22a and monitors the working state in the working machine 2.

The auto NC data creating unit 19, in step S9, judges whether the working control is finished or not, repeats steps 7 and 8 if not finished, and moves to step S10 if finished.

In step S10, the working case registration unit 17 registers, in the cutting working case database 15, the information (working conditions) as a working case that has been detected by the monitoring unit 10 in a way that makes it mapping to the configuration information inputted to the cutting working condition auto setting unit 14 on the occasion of performing this working and to the information inputted from the pre-working input unit 11.

Thus, the working control device 1 in the embodiment determines the working conditions based on the working case and is therefore contrived so that even a less-experienced operator can do the same working as a well-experienced person does. Further, the working control device 1 registers the result of working in the cutting working case database 15, and hence the result of working can be shared with other persons.

§2. Details of Working Procedures

Next, details of the working procedures will be explained. All of these procedures must not necessarily be executed and may be executed by arbitrarily combining the required procedures on the occasion of working in the working system.

2-1. [Extraction of Dimensions of Maximum External Configuration]

Figure 4:
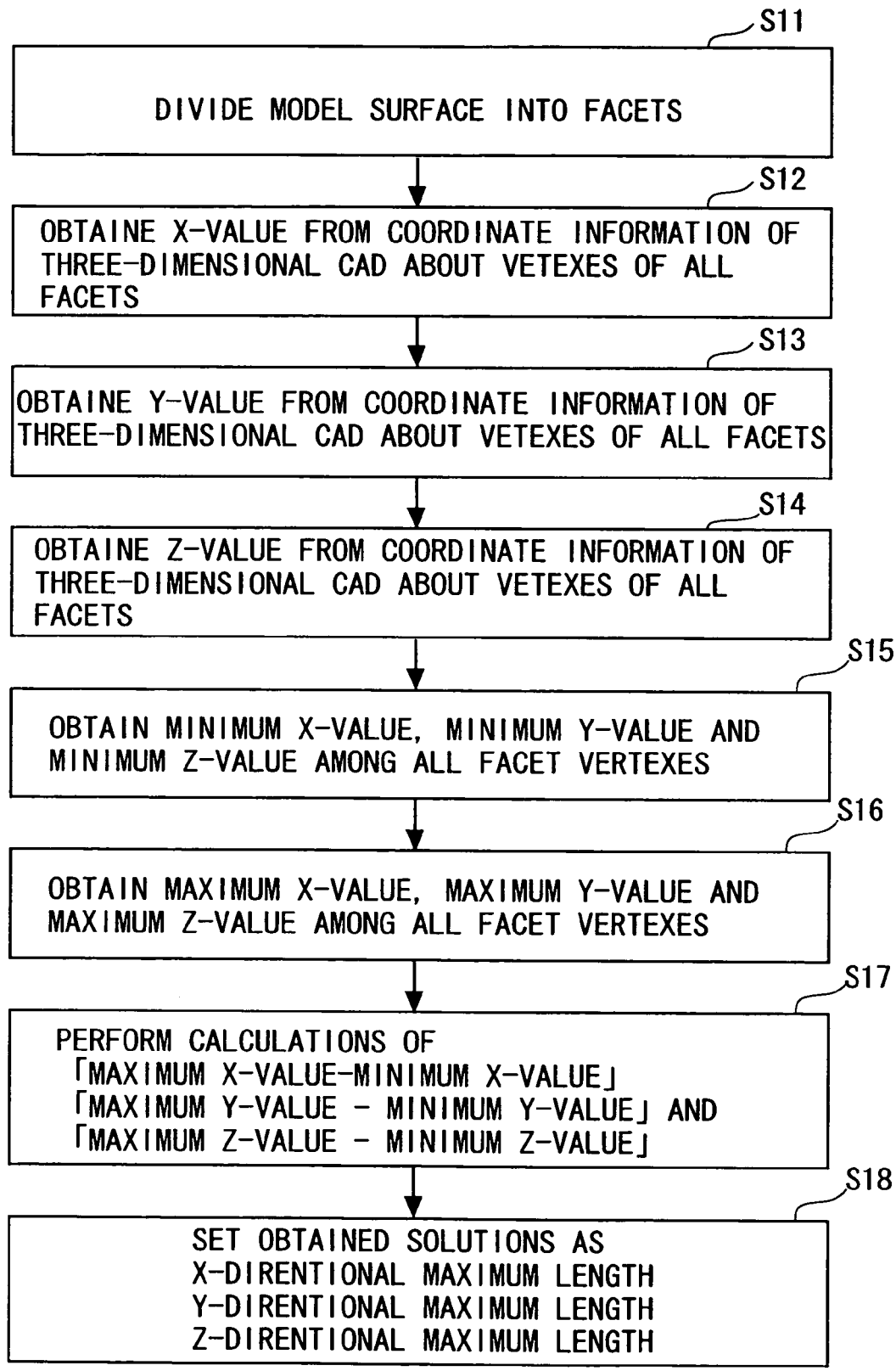
FIG. 4 is a flowchart of calculating maximum external configuration dimensions.

FIG. 4 is an explanatory chart of a procedure in which the three-dimensional configuration characteristic extraction unit 12 extracts dimensions of a maximum external configuration as configuration information from the three-dimensional CAD data 100 in-step S1.

Figure 5A:
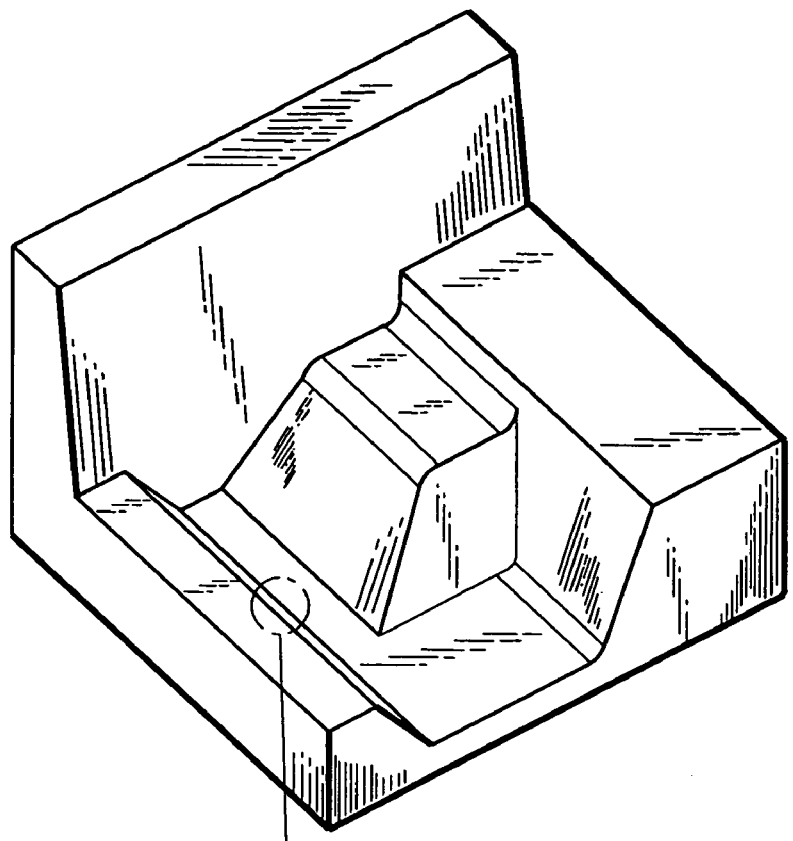
FIG. 5A-5B are an explanatory view of calculating the maximum external configuration dimensions.
Figure 5B:
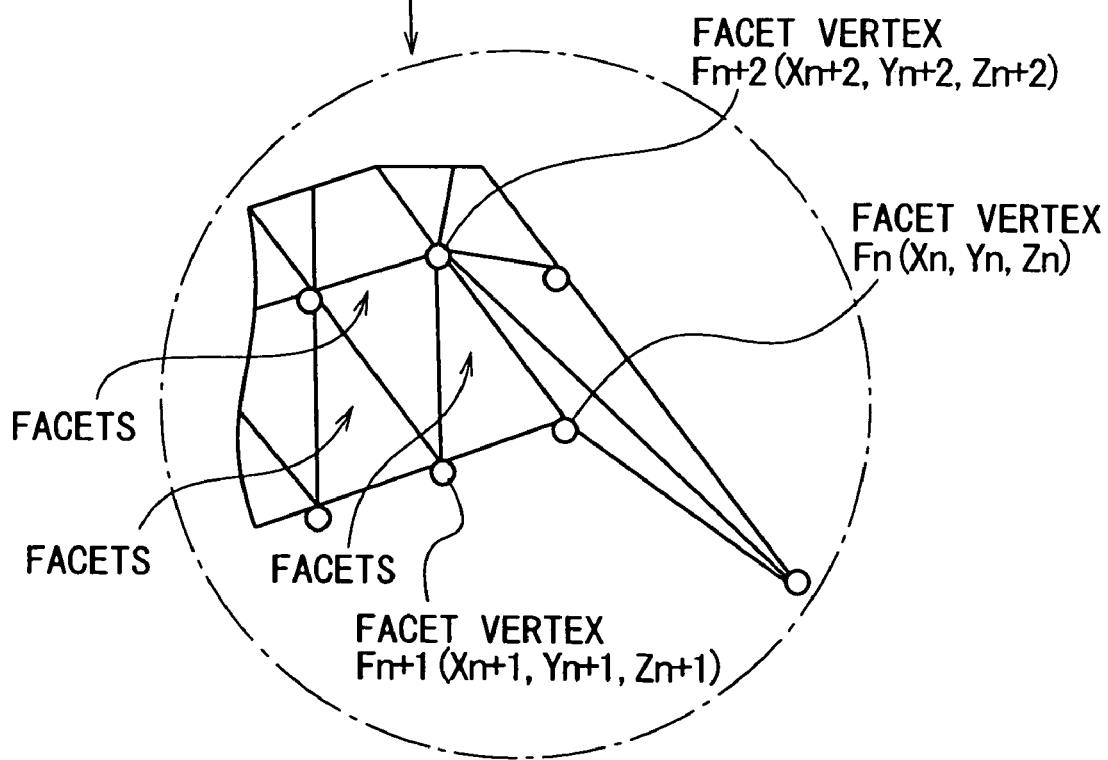

The three-dimensional configuration characteristic extraction unit 12 divides, based on the three-dimensional CAD data 100, surfaces of a three-dimensional model (an object workpiece) into, as shown in FIG. 5A, minute polygonal shapes (triangles in this example, which will hereinafter be called facets) (step S11, which will hereinafter be abbreviated such as S11), thereafter, as shown in FIG. 5B, obtains X-coordinates, Y-coordinates and Z-coordinates (Fn (Xn, Yn, Zn), Fn+1 (Xn+1, Yn+1, Zn+1), Fn+2 (Xn+2, Yn+2, Zn+2) . . . ) of three vertexes of the facet, and repeatedly performs the same calculation with respect to all the facets (S12~14). The three-dimensional configuration characteristic extraction unit 12 obtains the X-coordinates, Y-coordinates and Z-coordinates of the vertexes of all the faces and acquires the minimum X-coordinates, Y-coordinates and Z-coordinates and the maximum X-coordinates, Y-coordinates and Z-coordinates by making comparisons between the coordinates of the vertexes of all the facets (S15, S16).

Figure 6:
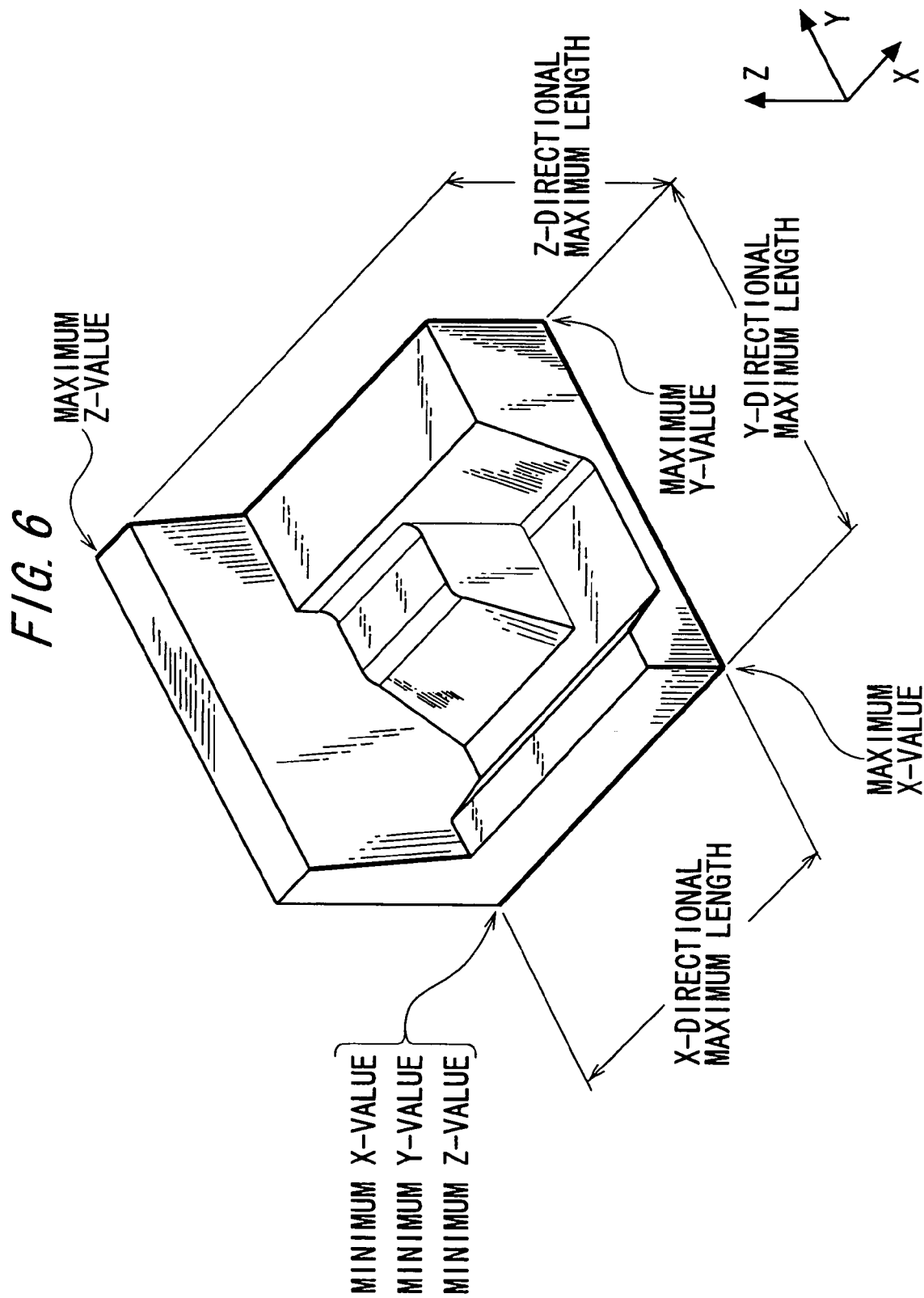
FIG. 6 is an explanatory view of calculating the maximum external configuration dimensions.

The three-dimensional configuration characteristic extraction unit 12 subtracts the minimum X-value from the maximum X-value obtained as above, and similarly makes the calculations with respect to the Y-coordinates and the Z-coordinates (S17), thereby obtaining, as shown in FIG. 6, a maximum X-directional length, a maximum Y-directional length and a maximum Z-directional length of the three-dimensional model and setting them as maximum external configuration dimensions (configuration information) (S18).

2-2. [Calculation of Removal Volume]

FIG. 7 is an explanatory chart of a procedure in which the three-dimensional configuration characteristic extraction unit 12 acquires a removal volume as configuration information from the three-dimensional data 100 in step S1.

The three-dimensional configuration characteristic extraction unit 12 divides the surfaces of the three-dimensional model (FIG. 8A) represented in the three-dimensional CAD data 100 into facets as shown in FIG. 8B (S21), thereafter creates triangles by projecting, as illustrated in FIG. 8C, the respective facets on an X-Y plane, i.e., a fitting surface to the working machine (S22), connects the facets to corresponding vertexes of the triangles formed by projecting the facets onto the X-Y plane (S23), obtains a volume of a triangle pole (FIG. 8D) configured by three sides of the facet, three sides of the triangle formed by projecting the facet onto the X-Y plane, and three line segments that connect the facet to corresponding vertexes of the triangle formed by projecting the facet onto the X-Y plane (FIG. 8D)(S24), obtains volumes with respect to all the facets by repeating this (S25), and thus calculates a total sum of the volumes, i.e., a value of the three-dimensional model (S26).

Figure 9A:
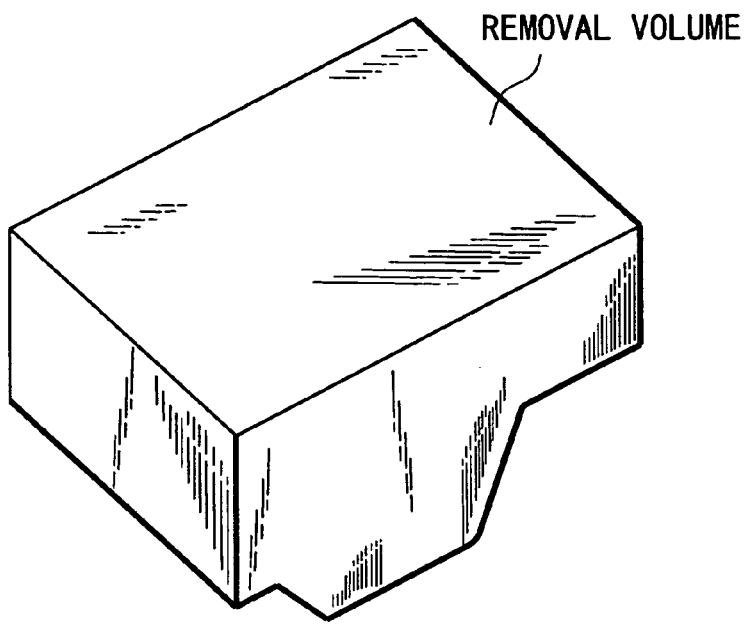
FIG. 9A-9B are an explanatory view of calculating the removal volume.
Figure 9B:
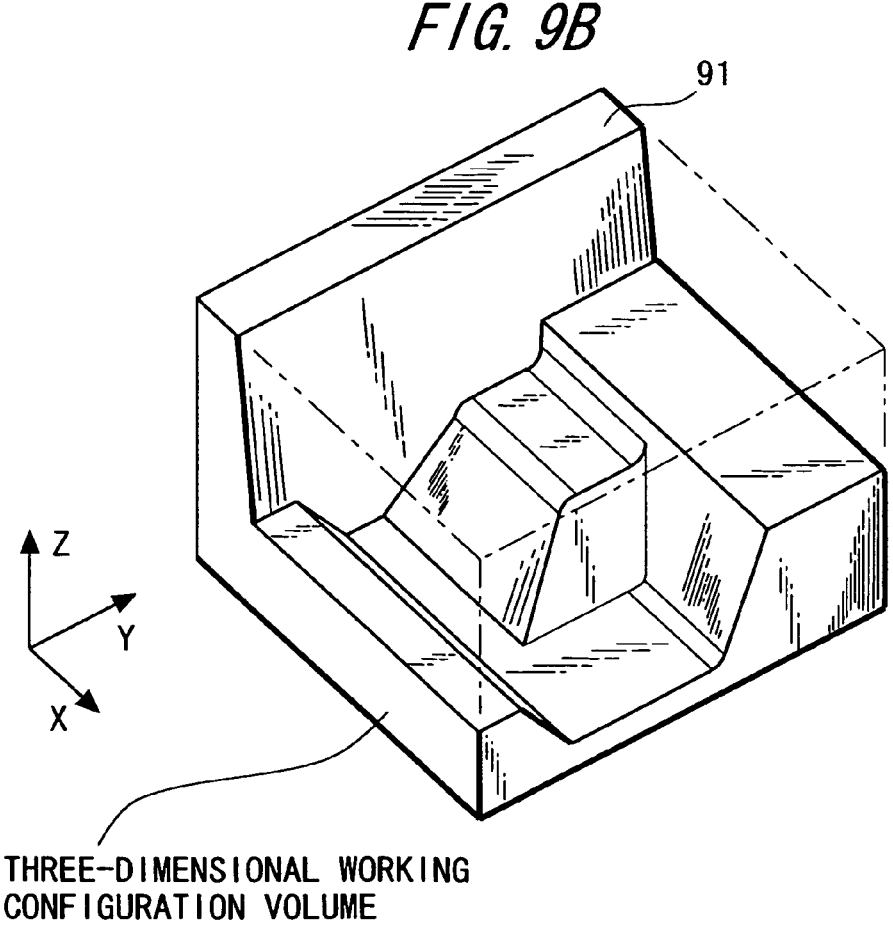

Thus, after calculating the volume of a three-dimensional model 91 in FIG. 9A, as described above, a maximum X-directional length, a maximum Y-directional length and a maximum Z-directional length are obtained with respect to the 3-cutting working unit 21, a maximum model external configuration volume is obtained by multiplying the maximum X-directional length, the maximum Y-directional length and the maximum Z-directional length (S27), and a volume of the 3-cutting working unit 21 is subtracted from this maximum external configuration volume, thereby acquiring a volume removed by the cutting/working as shown in FIG. 9B (S28).

2-3. [Calculation of Surface Information]

Figure 10:
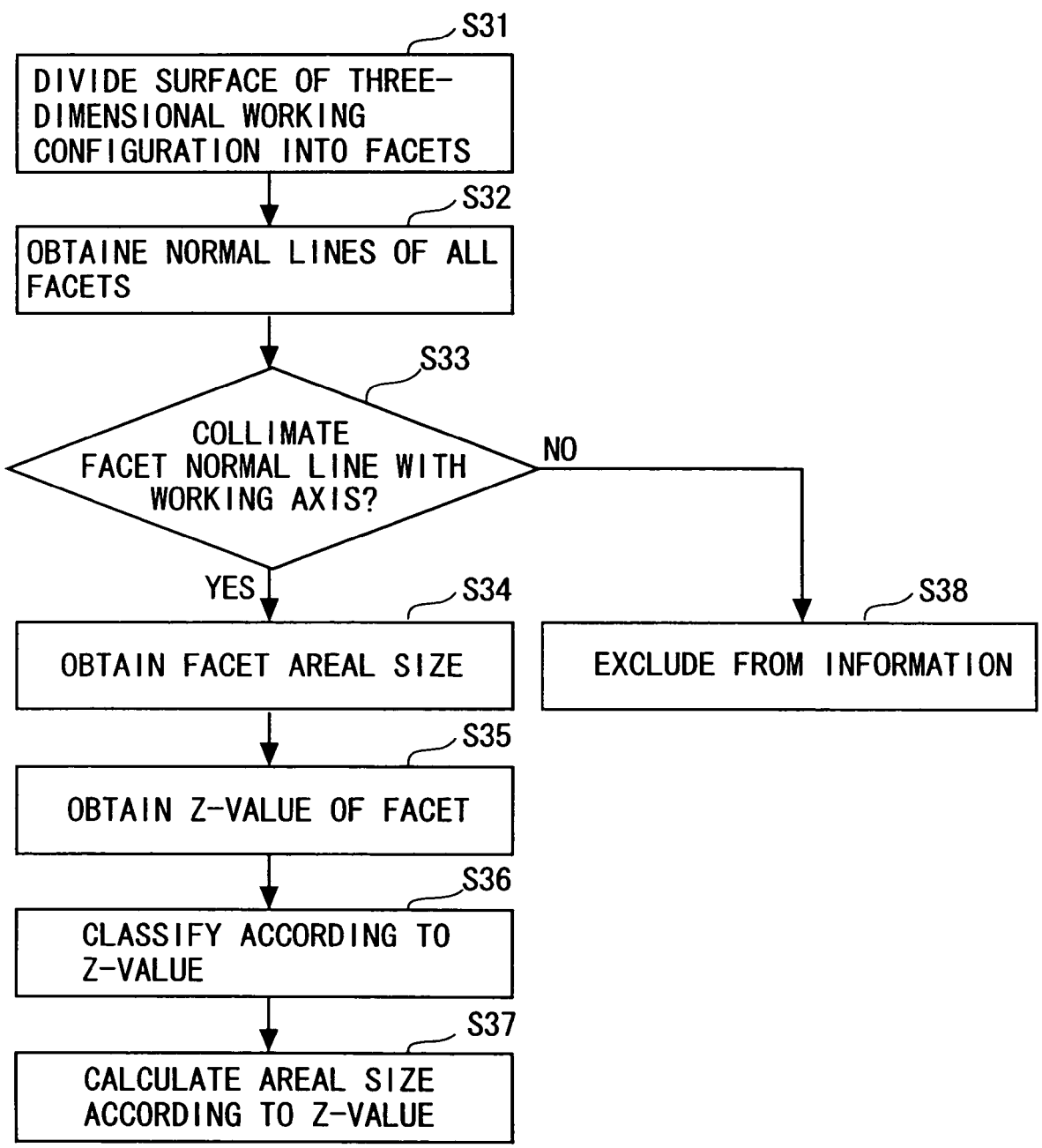
FIG. 10 is a flowchart of obtaining surface information.

FIG. 10 is an explanatory chart of a procedure in which the three-dimensional configuration characteristic extraction unit 12 acquires surface information as configuration information from the three-dimensional data 100 in step S1.

Figure 11:
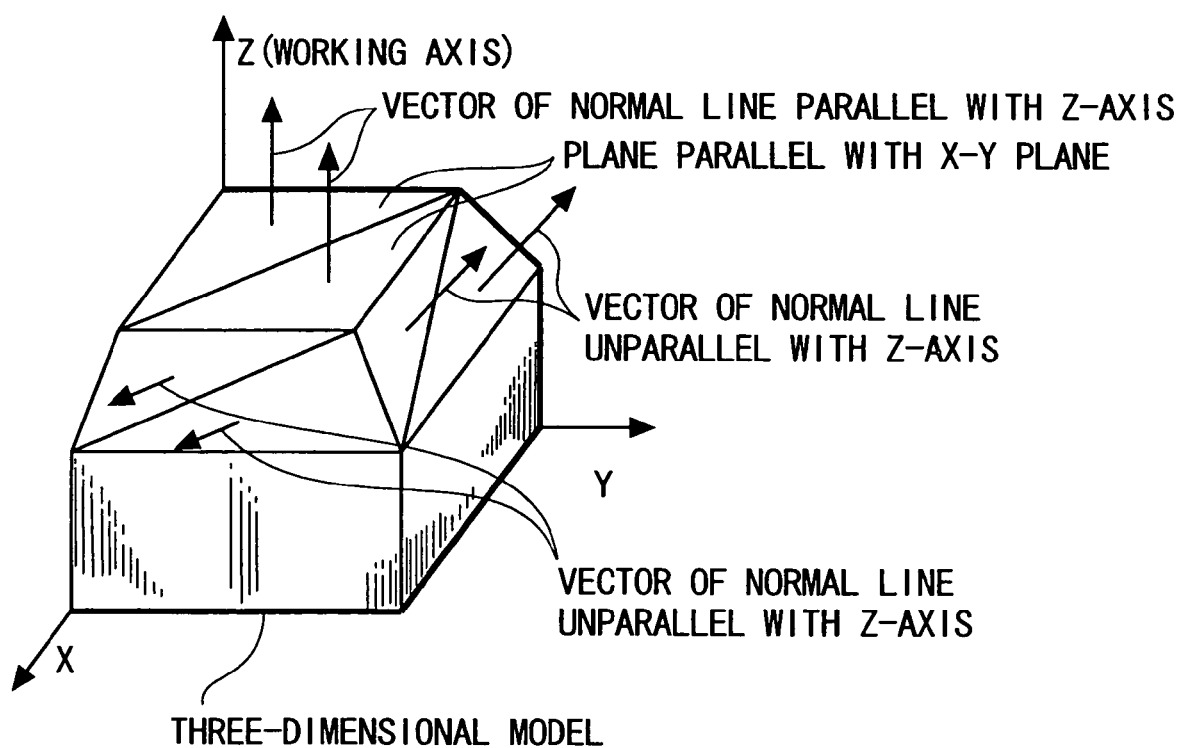
FIG. 11 is an explanatory view of obtaining the surface information.

The three-dimensional configuration characteristic extraction unit 12 divides, based on the three-dimensional CAD data 100, surfaces of a three-dimensional working configuration into facets (S31, and thereafter, as shown in FIG. 11, obtains normal line vectors of all the facets (S32). The three-dimensional configuration characteristic extraction unit 12 judges whether or not the normal line vectors (directions) of these facets are parallel with the Z-axis, i.e., a working axis (S33), obtains a real sizes of the facets and Z-values about only the facets showing the parallelism (S34, S35), sorts out the areal sizes per Z-value (S36), and acquires the surface information, according to the Z-values, of the flat surfaces parallel with the X-Y plane (S37). Note that the facets of which the normal line vectors are judged not to be parallel with the working axis in step S33 are excluded from the information (S38).

As for a surface, perpendicular to the working axis, in the three-dimensional model, viz., the surface that can be machined by a flat end mill, an areal size per position in the Z-axis direction, i.e., the areal size presumed so that it can be machined at one time, is thereby acquired; and the cutting working condition auto setting unit 14, on the occasion of determining the working conditions, based on this piece of surface information, selects a tool having a large diameter if the areal size is large and a tool having a small diameter if the areal size is small.

2-4. [Calculation of Minimum Concave Shape Radius Dimension]

Figure 12:
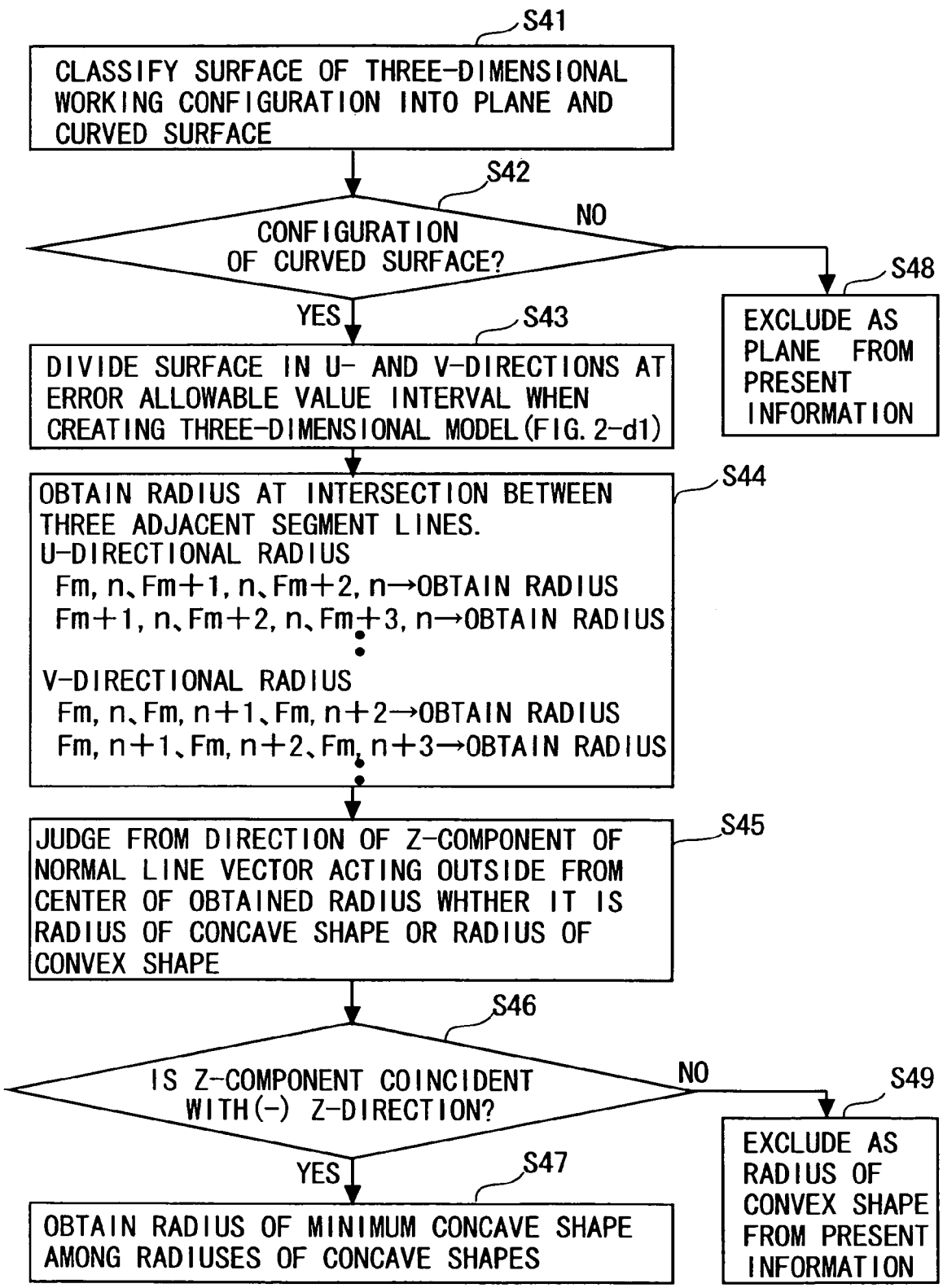
FIG. 12 is a flowchart of obtaining a minimum concave shape radius.

FIG. 12 is an explanatory chart of a procedure in which the three-dimensional configuration characteristic extraction unit 12 acquires a minimum concave shape radius dimension as configuration information from the three-dimensional data 100 in step S1.

The three-dimensional configuration characteristic extraction unit 12 classifies, based on the three-dimensional CAD data 100, the surfaces of the three-dimensional model into flat surfaces and surfaces other than those, i.e., curved surfaces (S41), extracts surfaces of the curved surfaces (S42), and excludes the surfaces other than those from the information (S48).

Figure 13A:
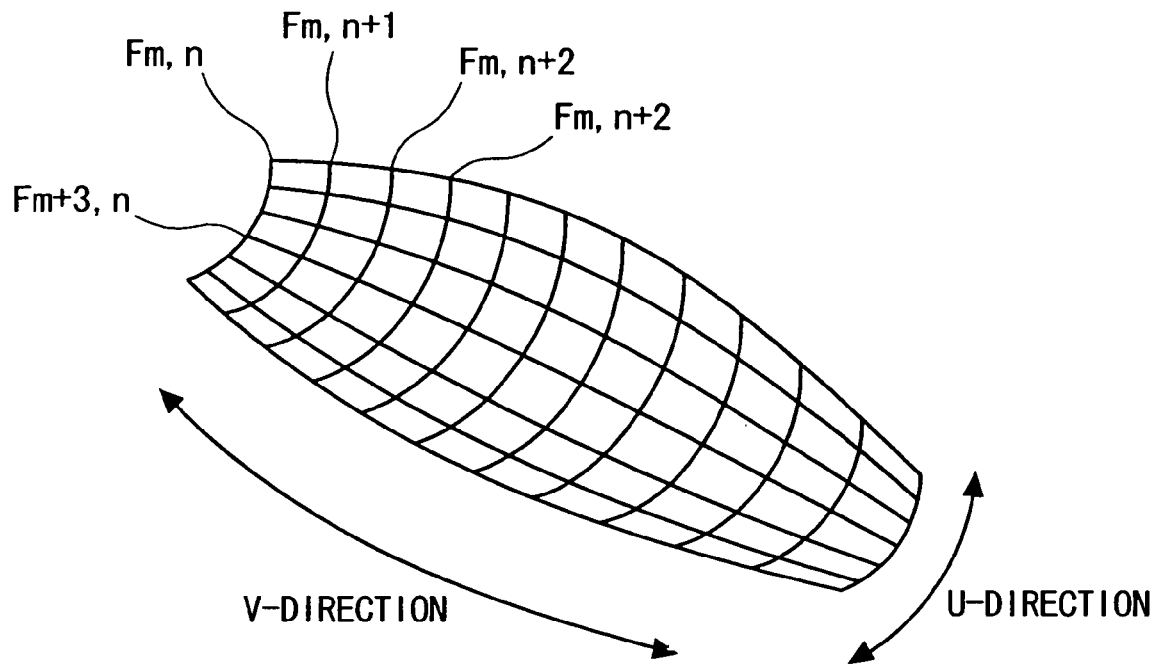
FIG. 13A-13B are an explanatory view of obtaining the minimum concave shape radius.
Figure 13B:
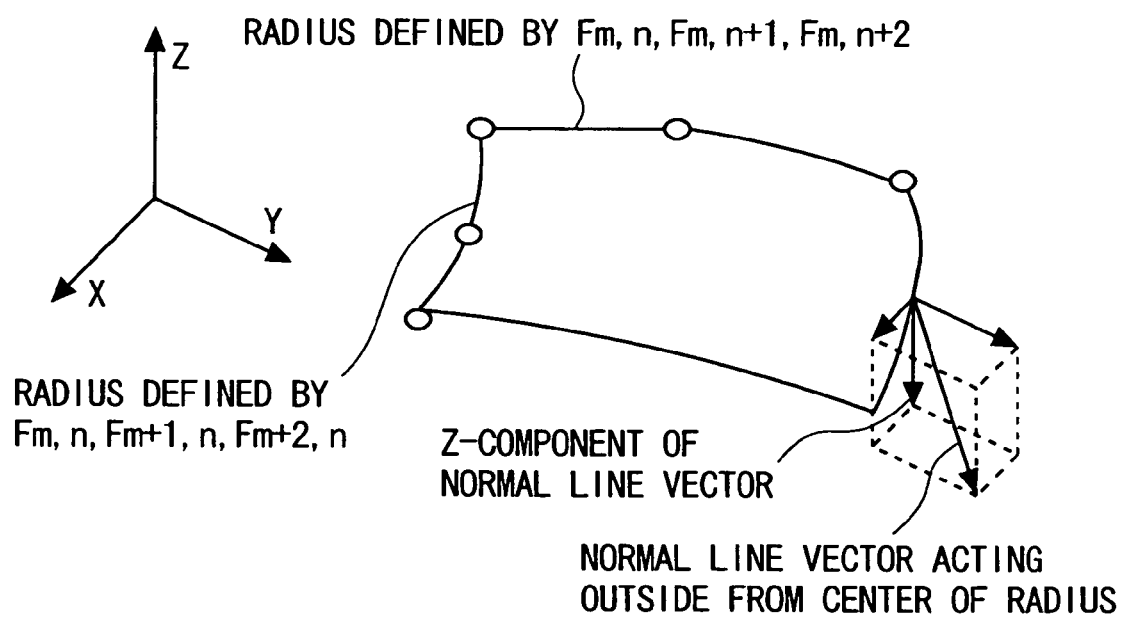

Then, the three-dimensional configuration characteristic extraction unit 12, as shown in FIG. 13A, divides the curved surface respectively in U- and V-directions at an error allowable value interval when creating the three-dimensional model (S43), acquires a radius from three intersections between dividing lines adjacent to each other in the U- and V-directions (S44), as shown in FIG. 13B, obtains a direction of the Z-component of the normal line vector acting outwards from a center of the acquired radius (S45), seeks out whether this direction of the Z-component is coincident with a (−) Z-direction (S46), judges, if not coincident, that it is a convex shape radius and excludes it from the information (S49), then judges, if coincident, that it is a concave shape radius (S46), and acquires a minimum concave shape radius among these radiuses (S47).

With this, the cutting working condition auto setting unit 14, on the occasion of determining the working conditions, obtains a diameter of the tool used for finishing on the basis of this minimum concave shape radius dimension.

2-5. [Calculation of Largest Concave Shape Radius Dimension]

Figure 14:
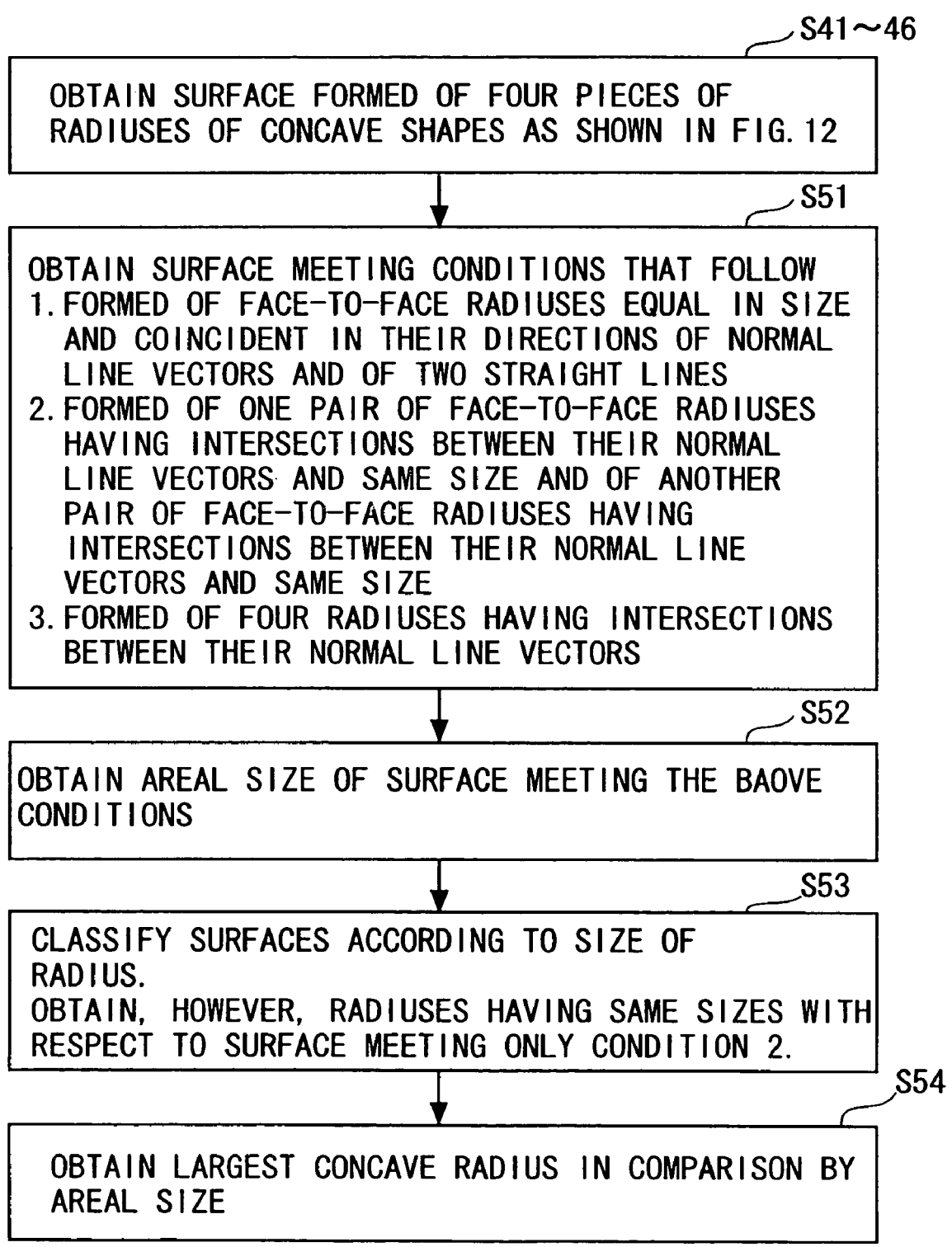
FIG. 14 is a flowchart of obtaining a largest concave shape radius.

FIG. 14 is an explanatory chart of a procedure in which the three-dimensional configuration characteristic extraction unit 12 acquires a largest concave shape radius dimension as configuration information from the three-dimensional data 100 in step S1.

The three-dimensional configuration characteristic extraction unit 12 acquires, in the same way as the above-mentioned, the surfaces (FIG. 15A) having the concave shapes (S41~S46 in FIG. 12), obtains, from among these surfaces, a surface configured by sides having the same size and coincident in their directions of the normal line vectors and by two straight lines as shown in FIG. 15B, a surface configured by one pair of face-to-face sides having intersections between the normal line vectors and by one pair of face-to-face sides having intersections between the normal line vectors and having the same radius as shown in FIG. 15C and a surface having intersections between the normal line vectors of four sides as shown in FIG. 15D (S51), then calculates areal sizes of these surfaces (S52), and classifies these surfaces according to sizes of the radiuses. The surface shown in FIG. 15C is, however, classified based on the radius having the same size (S53)

Then, the three-dimensional configuration characteristic extraction unit 12 obtains an areal size according to every size of the thus classified radius, and acquires the size of the radius with the areal size coming to the maximum, as a largest concave shape radius dimension (S54).

The cutting working condition auto setting unit 14 thereby acquires, based on this largest concave shape radius dimension, a diameter of the tool used before finishing on the occasion of determining the working condition.

2-6. [Calculation of Maximum Depth]

Figure 16:
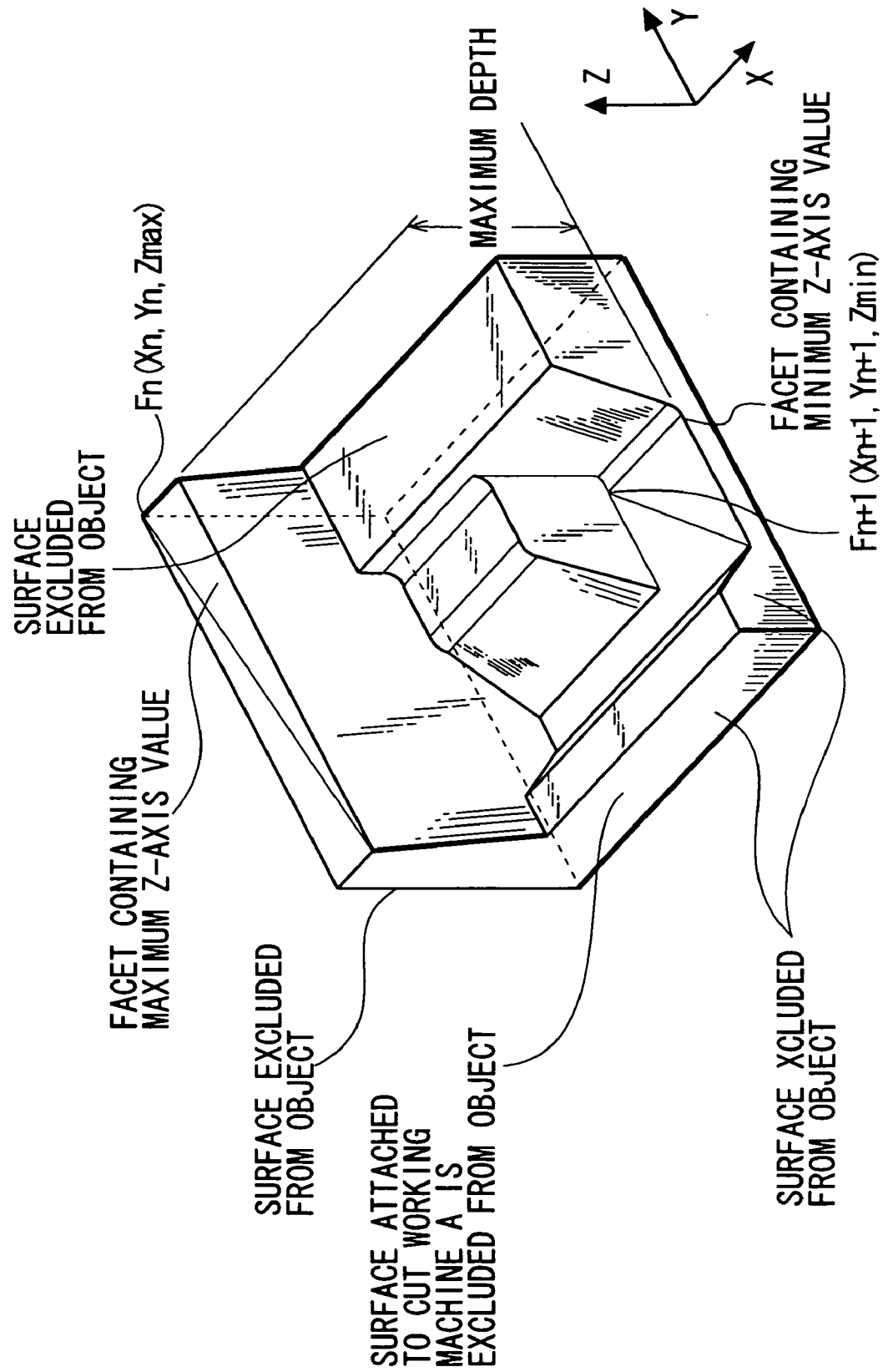
FIG. 16 is an explanatory view of calculating a maximum depth.

FIG. 16 is an explanatory view in a case where the three-dimensional configuration characteristic extraction unit 12 acquires a maximum depth as configuration information from the three-dimensional data 100 in step S1.

The three-dimensional configuration characteristic extraction unit 12 divides, based on the three-dimensional CAD data 100, the surfaces of the three-dimensional model into the facets, thereafter acquires, as shown in FIG. 16, Z-axis values of vertexes with respect to the facets configuring a surface perpendicular to the X-Y plane of the cutting working machine 2 and abutting on (coincident in the Z-axis value) the fitting surface to the cutting working machine 2 or a surface containing a circular arc and a surface excluding the fitting surface to the cutting working machine A, and obtains a difference, as a maximum depth, between Zmax, i.e., the maximum Z-axis value and Zmin, i.e., the minimum Z-axis value.

The cutting working condition auto setting unit 14 thereby selects, mapping to this maximum depth, a tool having such a length as not to interfere with the work material on the occasion of determining the working condition.

2-7. [Calculation of Cutting Range Boundary Line]

FIG. 17 is an explanatory view in a case where the three-dimensional configuration characteristic extraction unit 12 acquires a cutting range boundary line as configuration information from the three-dimensional data 100 in step S1.

The three-dimensional configuration characteristic extraction unit 12 divides, based on the three-dimensional CAD data 100, the surfaces of the three-dimensional model into the facets, then judges whether a normal line of this facet is perpendicular to the X-Y plane, i.e., parallel with the working axis, and sorts out them into surfaces configured by the facets exhibiting the parallelism and the surfaces containing the facets exhibiting none of parallelisms.

Then, the surfaces with edges shared in each classification are grouped and thus obtained as a working range, and edges, which are not shared with other surfaces in each of groups, are obtained as working range boundary lines. For example, in FIG. 17, surfaces 41, 42, 43 are grouped, wherein edges that are not shared with other surfaces in this group, i.e., an outer periphery of the group that is drawn by a bold line is obtained as a working range boundary line.

The cutting working condition auto setting unit 14 thereby determines this working range boundary line and a working range on the occasion of determining the working conditions. Moreover, the cutting working condition auto setting unit 14, depending on whether the surfaces becoming this working range are surface perpendicular to the working axis or not, determines whether they are cut by a flat end mill or a ball end mill.

2-8. [Calculation of Blank Dimensions]

Figure 18:
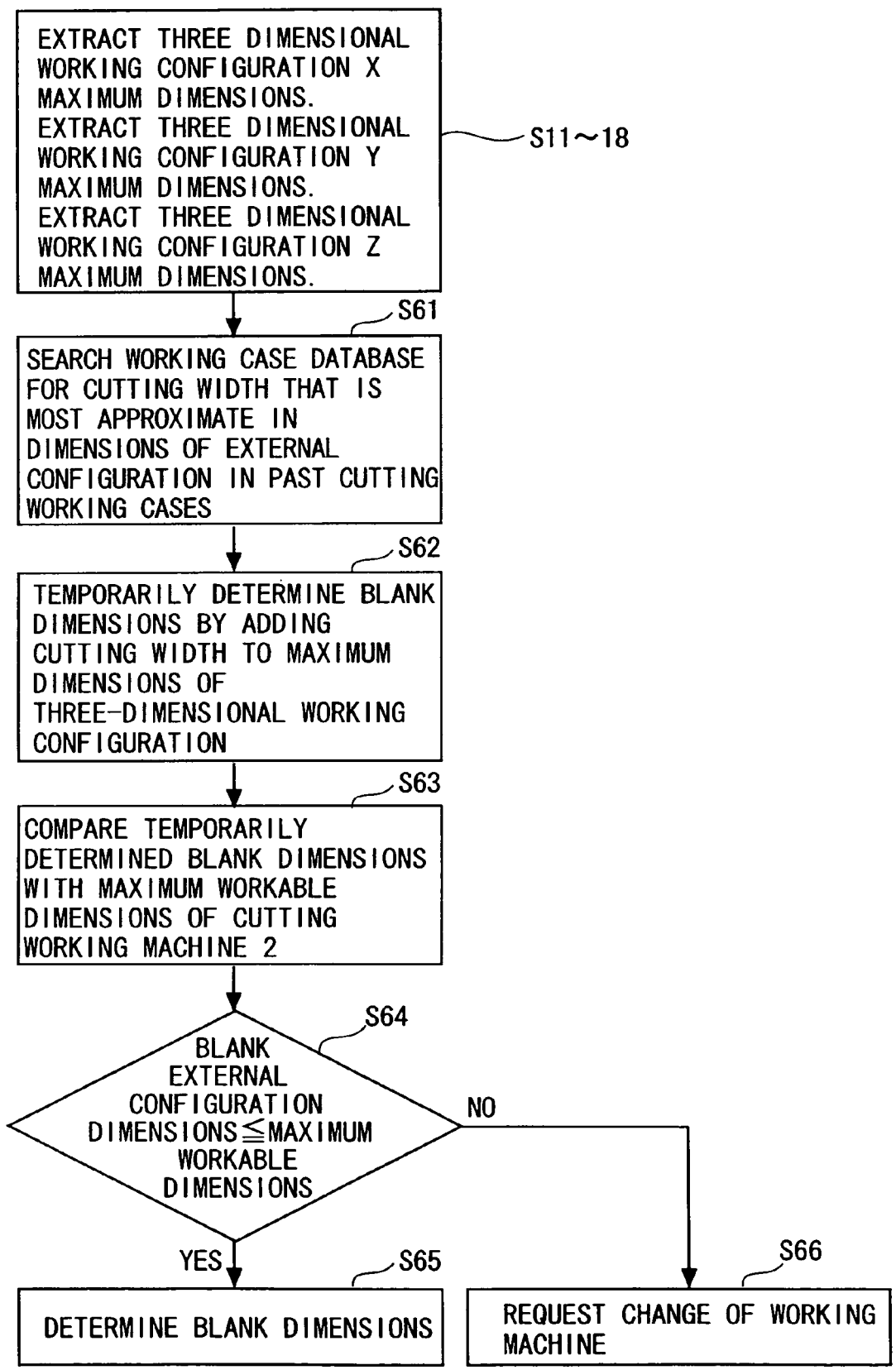
FIG. 18 is a flowchart of calculating blank dimensions.

FIG. 18 is an explanatory view in a case where the three-dimensional configuration characteristic extraction unit 12 acquires blank dimensions as configuration information from the three-dimensional data 100 in step S1.

Figure 19:
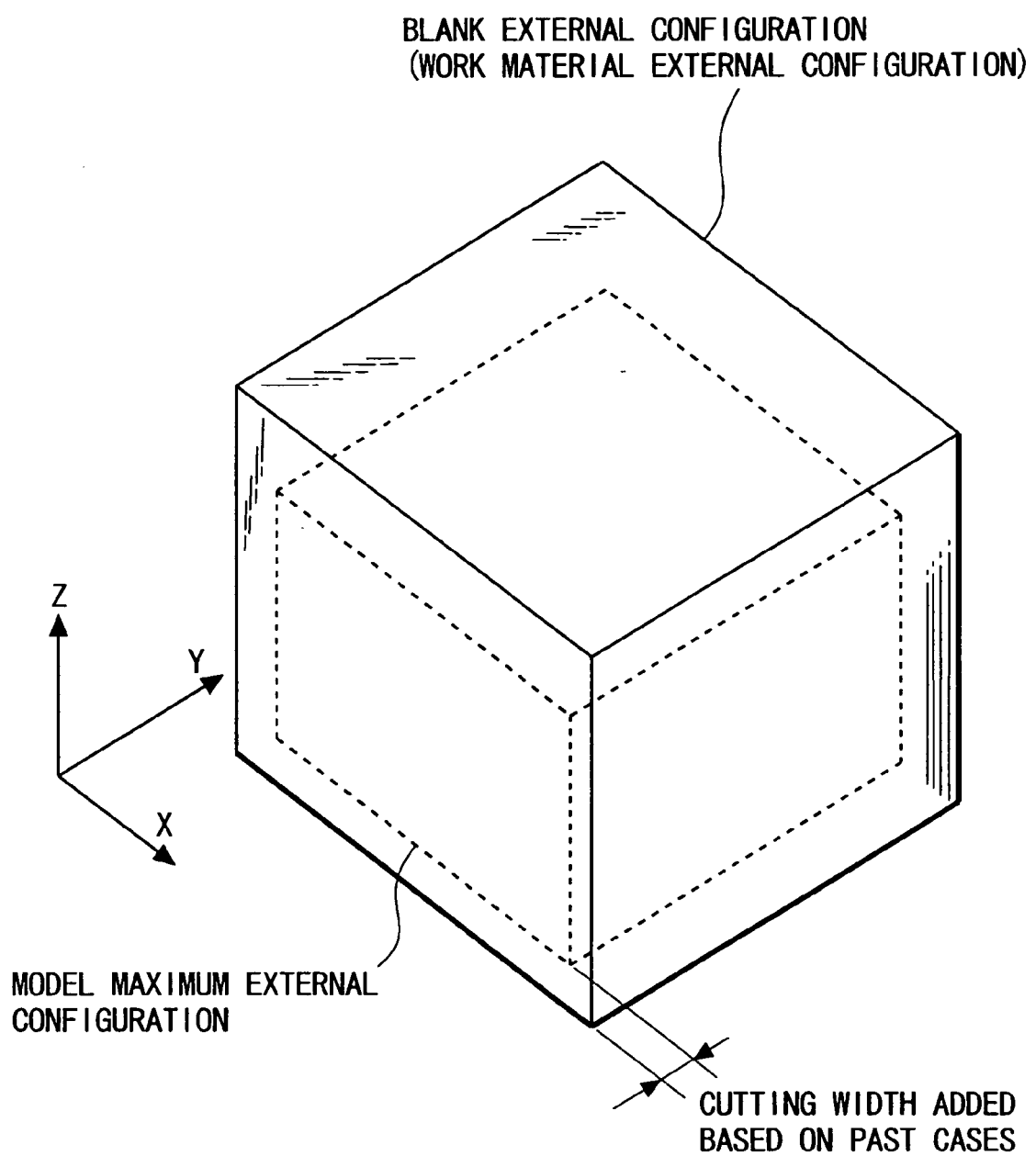
FIG. 19 is an explanatory view of calculating the blank dimensions.

The three-dimensional configuration characteristic extraction unit 12 obtains maximum external configuration dimensions respectively in the X-, Y- and Z-directions in the procedure shown in FIG. 4 in the same way as in the items 2-1 (S11~S18). Then, the three-dimensional configuration characteristic extraction unit 12 searches the working case database 15 for a past cutting working case where the external configuration dimensions are most approximate, then obtains a cutting margin (working margin) from this past working case (S61), temporarily determines the blank dimensions by adding the thus obtained cutting width to the maximum external configuration dimensions (S62), makes a comparison with maximum possible-of-working dimensions of the cutting working machine 2 (S63), and, in the case of judging that the working by the cutting working machine 2 is possible (S64), determines the temporarily determined blank dimensions as (final) blank dimensions as shown in FIG. 19) (S65).

3. [Determination of Working Conditions Based on Past Working Results]

Figure 20:
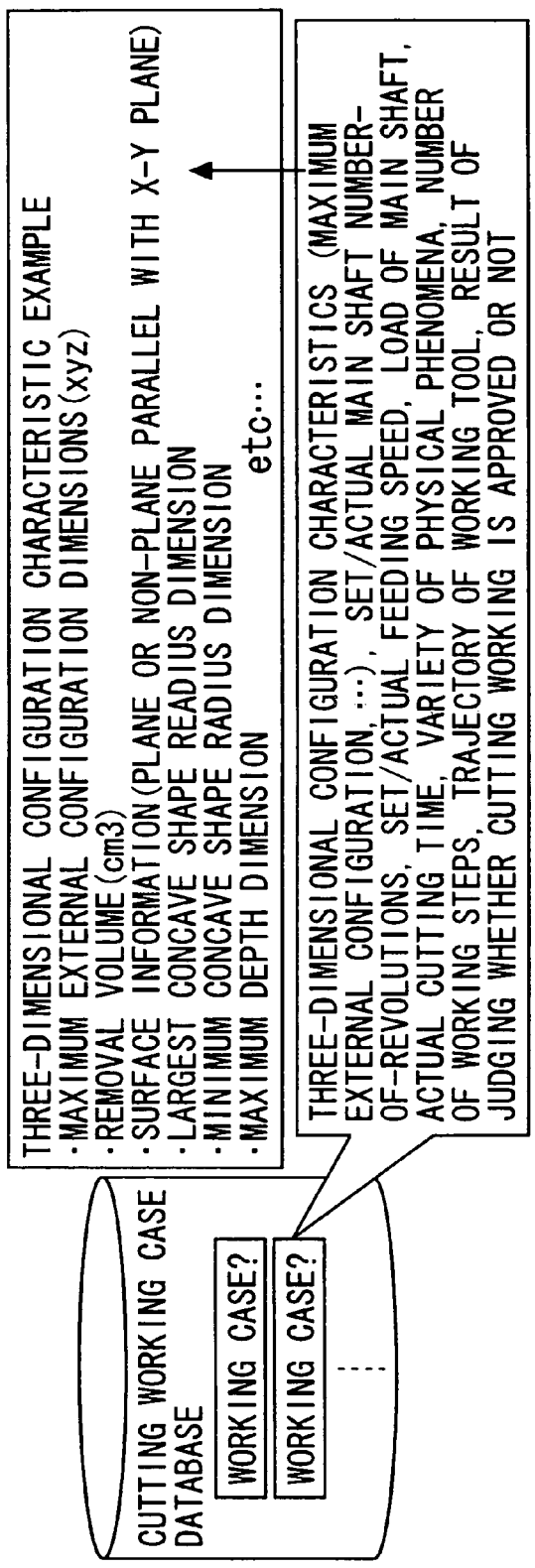
FIG. 20 is an explanatory diagram of a cutting working case database.

The working case database 15 is accumulated per working case with: the maximum external configuration dimensions (X, Y, Z), the removal volume, the surface information (about whether the surface is a flat surface parallel with the working X-Y plane or is a non-flat surface), the largest concave shape radius dimension, the minimum concave shape radius dimension and the maximum depth dimension which have been extracted by the three-dimensional configuration characteristic extraction unit 12; the cutting working conditions such as the cutting working step procedure, the classification of the cutting working tool, the set number of revolutions of the main shaft, the feeding speed, the feeding pitch, the Z-cutting quantity, the trajectory of the working tool; the actual number of revolutions of the main shaft, the actual feeding speed, the load on the main shaft in the process of working, the actual cutting time when the cutting/working is actually conducted; the information on a variety of physical phenomena; and the information about whether the cutting/working is judged by the operator to be preferable or not. Note that FIG. 20 is a conceptual diagram of this working case database 15.

Figure 21:
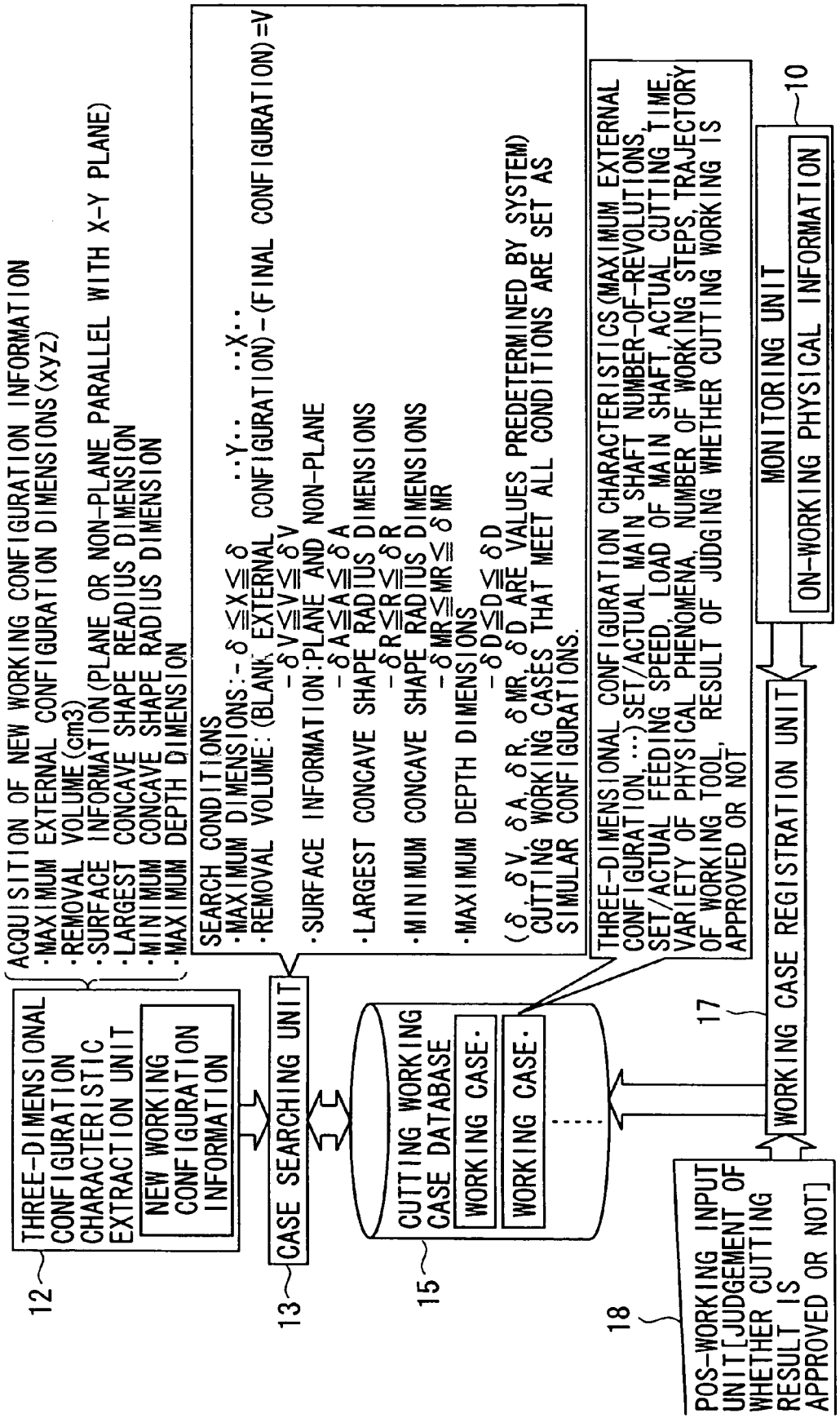
FIG. 21 is an explanatory diagram of determining working conditions.

The case searching unit 13 searches this cutting working case database 15 for a working case exhibiting a similar configuration, as shown in FIG. 21, on the basis of pieces of configuration information such as the maximum external configuration dimensions, the removal volume, the surface information, the largest concave shape radius dimension, the minimum concave shape radius dimension and the maximum depth dimension which have been, as described above, acquired by the three-dimensional configuration characteristic extraction unit 12.

For example, in case a search condition is the maximum external configuration dimension, a dimensional difference is obtained as an absolute value by comparing a maximum X-axis length of the three-dimensional model with a maximum X-axis length in the working case, similarly dimensional differences in Y- and Z-axis directions are obtained, and, if the values in all the X-, Y- and Z-axis directions are equal to or smaller than values (d) predetermined by the system, it is deemed that the maximum external configuration dimensions take a similar configuration.

Further, in case the search condition is the removal volume, there is obtained a difference in the removal volume (a cutting working volume) between the three-dimensional model and the past working case, and, in a case where an absolute value thereof is equal to or smaller than a value (dV) predetermined by the system, it is deemed that the removal volume is similar.

In case the search condition is the surface information, there is obtained a difference in the areal size of the flat surface parallel with the X-Y plane between the three-dimensional model and the working case, and, in a case where an absolute value thereof is equal to or smaller than a value (dA) predetermined by the system, it is deemed that the surface information is similar.

In case the search condition is the largest concave shape radius dimension, there is obtained a difference in the largest concave shape radius dimension between the three-dimensional model and the past working case, and, in a case where an absolute value thereof is equal to or smaller than a value (dR) predetermined by the system, it is deemed that the largest concave shape radius dimension is similar.

In case the search condition is the minimum concave shape radius dimension, there is obtained a difference in the minimum concave shape radius dimension between the three-dimensional model and the past working case, and, in a case where an absolute value thereof is equal to or smaller than a value (dMR) predetermined by the system, it is deemed that the minimum concave shape radius dimension is similar.

In case the search condition is the maximum depth, there is obtained a difference in the maximum depth dimension between the three-dimensional model and the past working case, and, in a case where an absolute value thereof is equal to or smaller than a value (dD) predetermined by the system, it is deemed that the maximum depth dimension is similar.

The case searching unit 13 searches out the working case that meets these search conditions, and, in case the information about whether the working in this working case is preferable or not is acceptable, the cutting working condition auto setting unit 14 determines the cutting working conditions on the basis of the number of working steps, the working tool for use, the feeding speed, the number of revolutions of the main shaft that are stored by way of this working case.

Note that the cutting working condition auto setting unit 14 may also optimize the cutting working conditions as will be mentioned later on in order to reduce a cutting working time and to improve a working accuracy.

4-1. [Cutting Pitch and Z-Cutting Adjustments Based on Working Surface Roughness]

In case the cutting working case database 15 has a small number of working cases, and in case there are not any work materials and cutting working tools nor combinations thereof that show none of the working cases as a result of the search and a premise is that the ball end mill is employed as the cutting working tool, the cutting working condition auto setting unit 14 determines the cutting working conditions on the basis of standard values stored on the cutting condition database 16c and values indicated by the operator from on the pre-working input unit 11.

Figure 22:
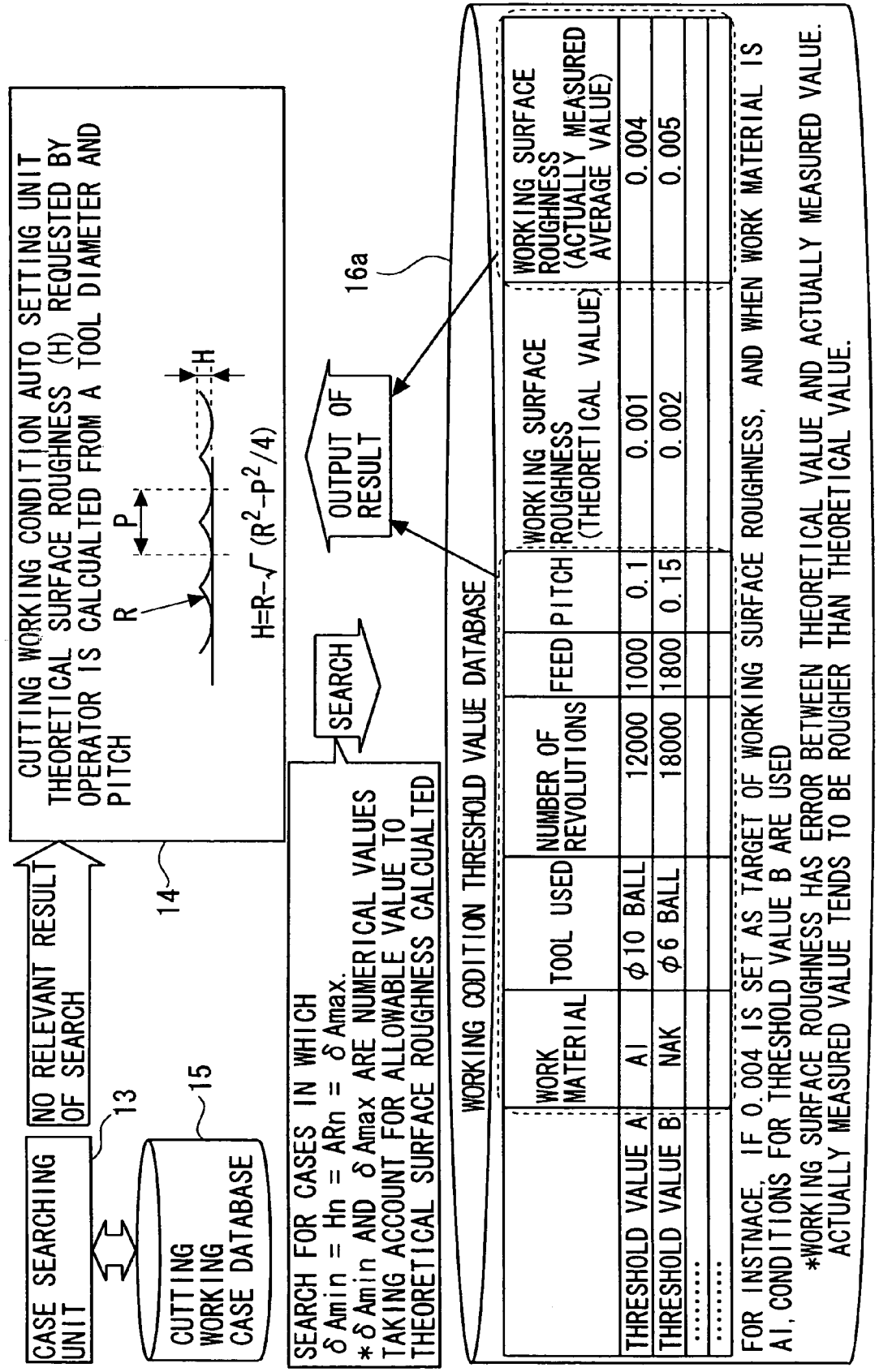
FIG. 22 is an explanatory diagram of work control based on working surface roughness.

At this time, theoretical surface roughness is, as shown in FIG. 22, expressed by $H=R-(R^2-P^2/4)^{1/2}$, where H is a scrap height, P is a feeding pitch and R is a radius of the working tool (which is herein the ball end mill), and hence the scrap height, viz., the theoretical surface roughness is obtained by giving the finishing working tool and the feeding pitch of the cutting working conditions.

Accordingly, the working surface roughness obtained in the cutting working conditions becomes this theoretical surface roughness. Performing the working in fact, however, the actual roughness of the working surface (the actual working surface roughness) might differ depending on a type of the work material, the feeding speed, etc.

Figure 23:
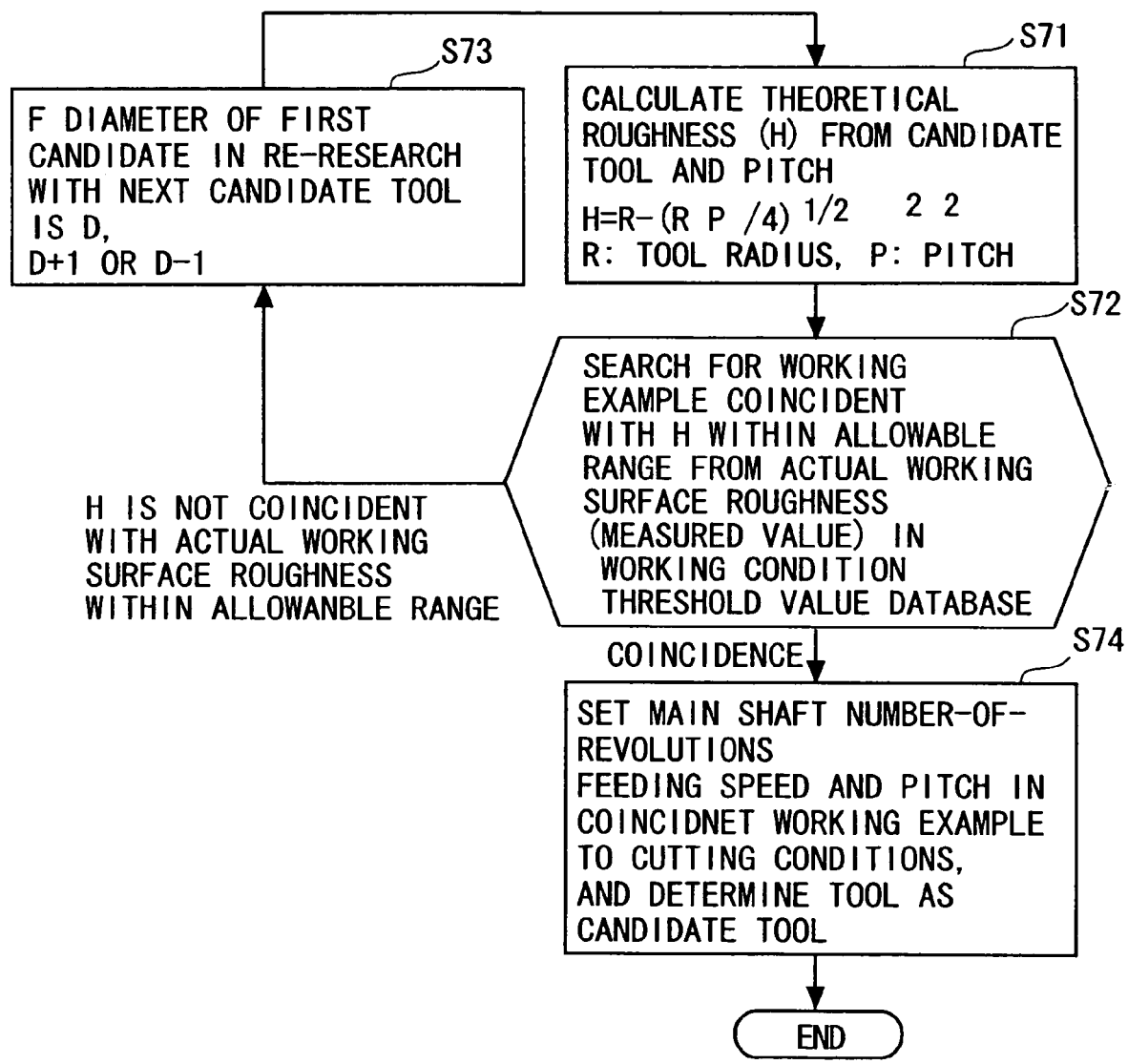
FIG. 23 is an explanatory diagram of the work control based on the working surface roughness.

Therefore, the cutting working condition auto setting unit 14 effects, as shown in FIG. 23, a recalculation based on the working condition threshold value database 16*a* so that the working surface roughness required is to be acquired.

Note that the working condition threshold value database 16*a* is stored with a corresponding relation between the actual working surface roughness and the working conditions in the case of coming to this roughness, the relation being obtained from a cutting test, the cutting case and the working data, etc. provided from a maker.

To start with, the cutting working condition auto setting unit 14 obtains the theoretical roughness (S71), adds a predetermined allowable value to this theoretical surface roughness, and searches the working condition threshold value database 16*a* for the actual working surface roughness existing in an allowable value range (S72).

Then, the cutting working condition auto setting unit 14, if the theoretical roughness is not coincident with the actual working surface roughness, searches again with a next candidate tool (S73), and, whereas if coincident, acquires pieces of data of the cutting tool, the work material, the main shaft number-of-revolutions, the feeding speed, the feeding pitch and the actual working surface roughness in this working case. Further, a peripheral speed of the cutting working tool and a feed quantity per edge are obtained by calculation from these pieces of data. Next, the main shaft number-of-revolutions and the feeding speed are obtained by calculations from these calculated values and a diameter of the working tool used for a new working configuration, and results thereof are set as cutting conditions of a new cutting configuration (S74).

The cutting working conditions in which the working surface roughness required is acquired also in the new configuration having none of the working cases, can be thereby automatically outputted.

4-2. [Control Taking Load on Main Shaft into Consideration]

Figure 24:
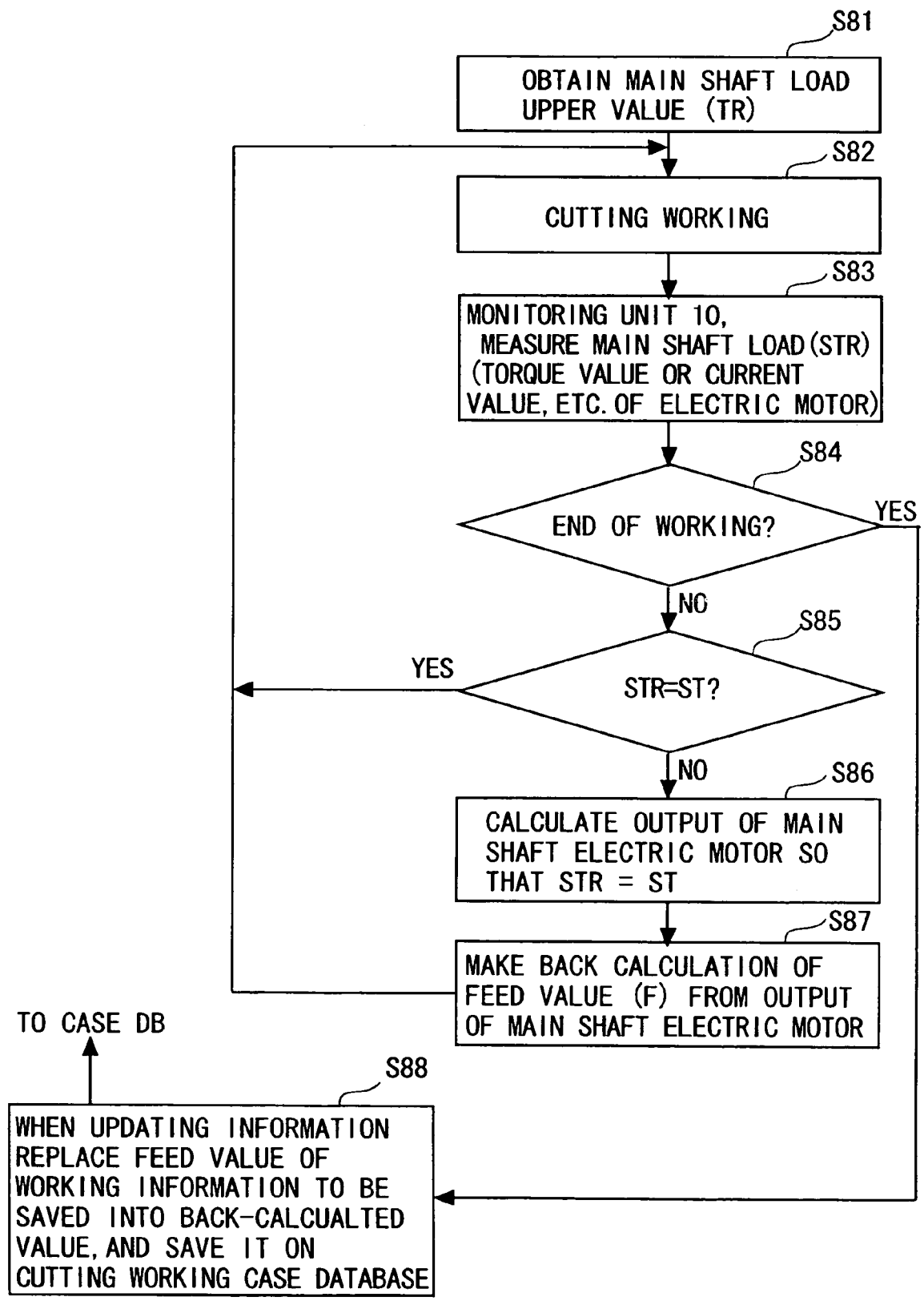
FIG. 24 is a flowchart of the work control based on a main shaft load.

FIG. 24 shows a procedure of control of properly working by monitoring the main shaft load wen working in steps S7~S9.

The auto NC data creating unit 19 makes the working machine 2 start the working by transmitting NC data creases based on the cutting working conditions given from the cutting working condition auto setting unit 14 to the working machine 2, and simultaneously measures, in the monitoring unit 10, working states (a variety of physical states) of the working machine 2 in real time. At this time, if the main shaft load increases abnormally, this induces a damage to the working machine 2 and deterioration of the cutting workpiece, and therefore the auto NC data creating unit 19 controls so that this main shaft load becomes proper.

To begin with, the auto NC data creating unit 19 obtains an upper value of main shaft load and a proper value of main shaft load from the working machine control unit 22 or the judgment criterion database.

Further, the auto. NC data creating unit 19 makes the working machine 2 start the working by transmitting the NC data to the working machine 2 (S82), and obtains the main shaft load from the monitoring unit 10.

At this time, the monitoring unit 10 detects a drive current value (a main shaft power P) of an electric motor for driving the main shaft with the sensor unit 22*a*, and calculates the actual feeding speed from this current value by use of the following formula 1 (S83).

$$t*f=(6120*P*n)/(k*v) \quad \text{(Formula 1)}$$

where t: a pitch (or a cutting depth, mm), f: a feeding speed (mm/min), P: a main shaft power (kW), n: a machine tool efficiency ($\approx$0.8), k: a specific cutting resistance (that differs depending on the work material), and v: a cutting speed (a tool peripheral speed, m/min).

The auto NC data creating unit 19 judges whether the working is finished or not (S84), then judges whether or not a main shaft load STR is equal to a proper value ST if not finished (S85), returns to step S82 ad continues the working if equal, obtains, if not equal, such a main shaft,power (main shaft electric motor output) P as to become equal thereto (S86), acquires from the formula 1 such a feeding speed as to become this main shaft power P (S87), and transmits such NC data as to become this feeding speed to the working machine 2 (S82).

Then, in the case of judging that the working is finished (S84), the working case registration unit 17 changes the feed value in the working conditions to a feed value when STR=ST, and registers it in the cutting working case database 15 (S88).

This, even in a case where the set working conditions are not proper, makes it possible to prevent a damage to the working machine 2 and deterioration of the object workpiece by controlling the feeding speed in real time.

Further, a consequence of this working are registered as the working result, and hence the working can be carried out with proper values from the beginning when performing the working next time.

Moreover, this value controlled by monitoring may also be, without being limited to the feeding speed, the main shaft number-of-revolutions, the Z-cutting quantity, the feeding pitched, etc. Further, these are not singly controlled, but the control items can be also controlled throughout the whole items such as controlling the main shaft number-of-revolutions next to the control of the feeding speed, then controlling the Z-cutting quantity, subsequently controlling the feeding pitch, and so on.

5-1. [Determination of Tool Diameter Based on Cutting Range]

Figure 25A:
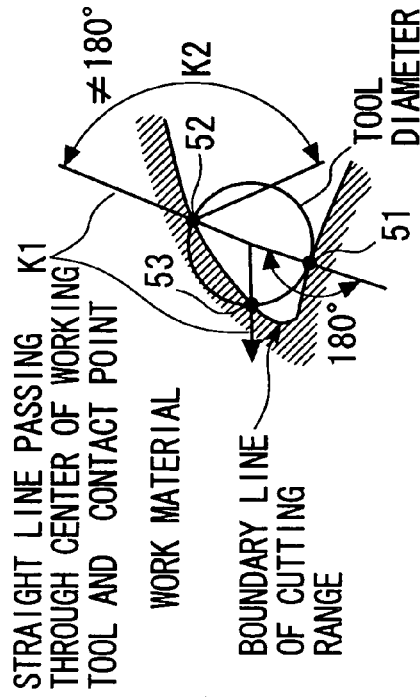
FIG. 25A-25B are an explanatory diagram in the case of obtaining a tool diameter based on a cutting range boundary line.
Figure 25B:
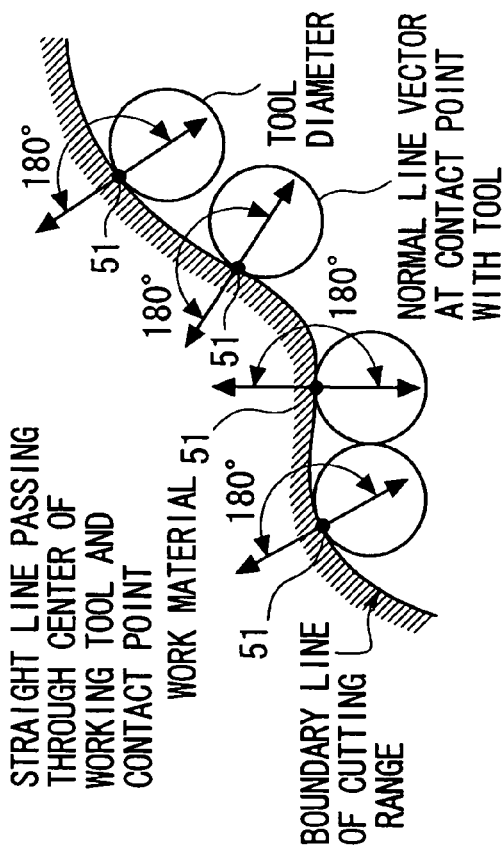
Figure 26:
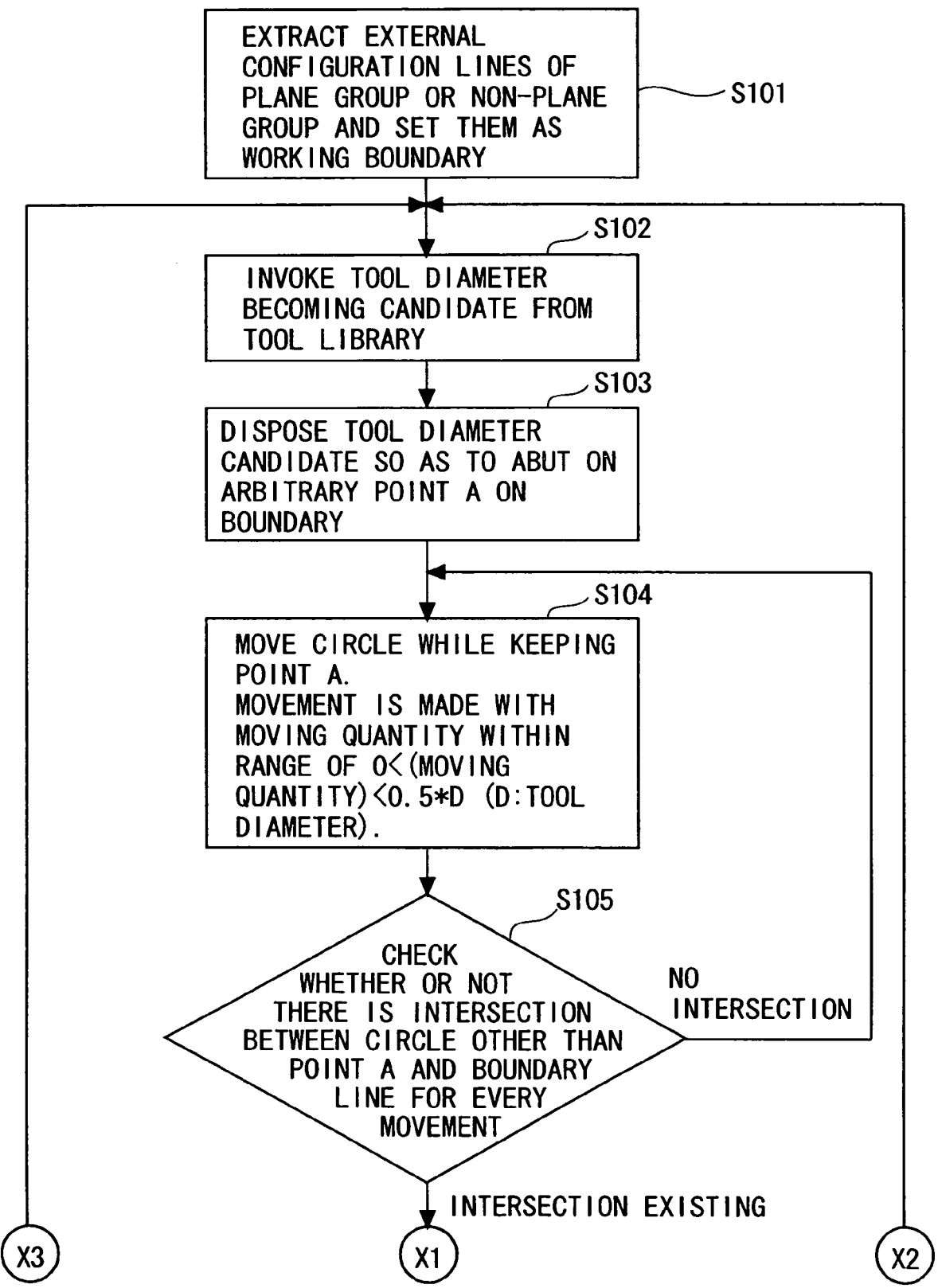
FIG. 26 is a flowchart of obtaining the tool diameter based on the cutting range boundary line.
Figure 27:
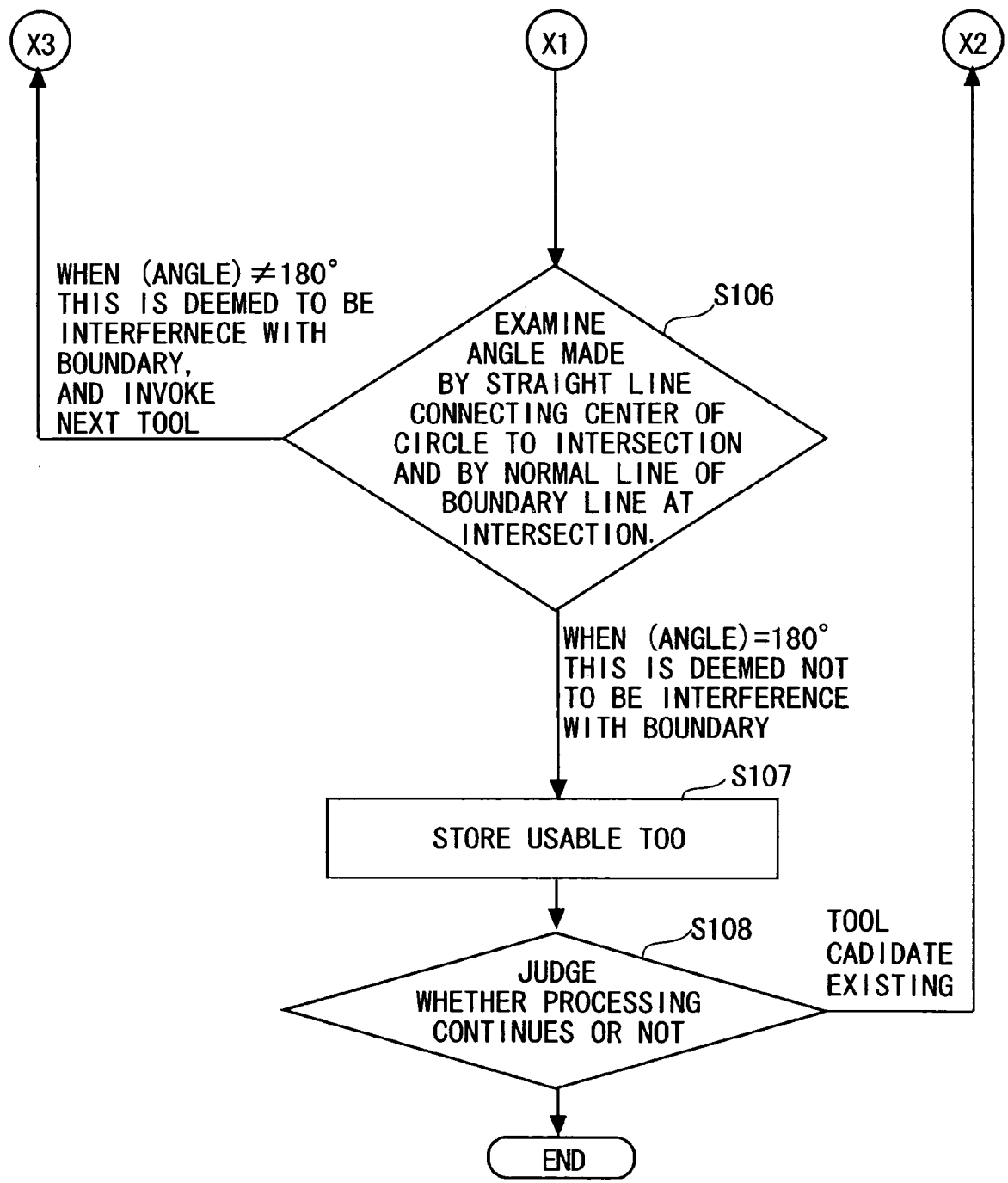
FIG. 27 is a flowchart of obtaining the tool diameter based on the cutting range boundary line.

FIGS. 25~27 are explanatory diagrams in the case of obtaining the tool diameter based on the cutting range boundary line acquired in the item 2-7.

The cutting working condition auto setting unit 14, upon acquiring the cutting range boundary line as described above (S101), refers to the tool library 16*b*, selects the working tool registered in the library 16*b* in an ascending or descending sequence of the diameter (S102), and disposes it so as to abut at an arbitrary point 51 on the cutting range boundary line as shown in FIG. 25 (S103). Then, the cutting working condition auto setting unit 14 moves the working tool so as to abut at the point 51 on this boundary line at all times (S104), checks whether or not there exists other contact point excluding the point 51 between the tool and the boundary line (S105), and, if it exists, judges whether an angle made by a straight line K1 connecting this point to the center of the working tool and by a normal line K2 across the point on the boundary is 180° or not (S106).

Then, the cutting working condition auto setting unit 14 deems it to be an interference that this angle is an angle other than 180°, selects, moving back to step S102, a next tool from the tool library, then repeats the processing, judges to be usable without any interference whereas if this angle is 180° (S107), and repeats this process till a largest working tool diameter with no interference is acquired (S108).

5-2. [Determination of Tool Protrusion Quantity Based on Cutting Depth]

Figure 28:
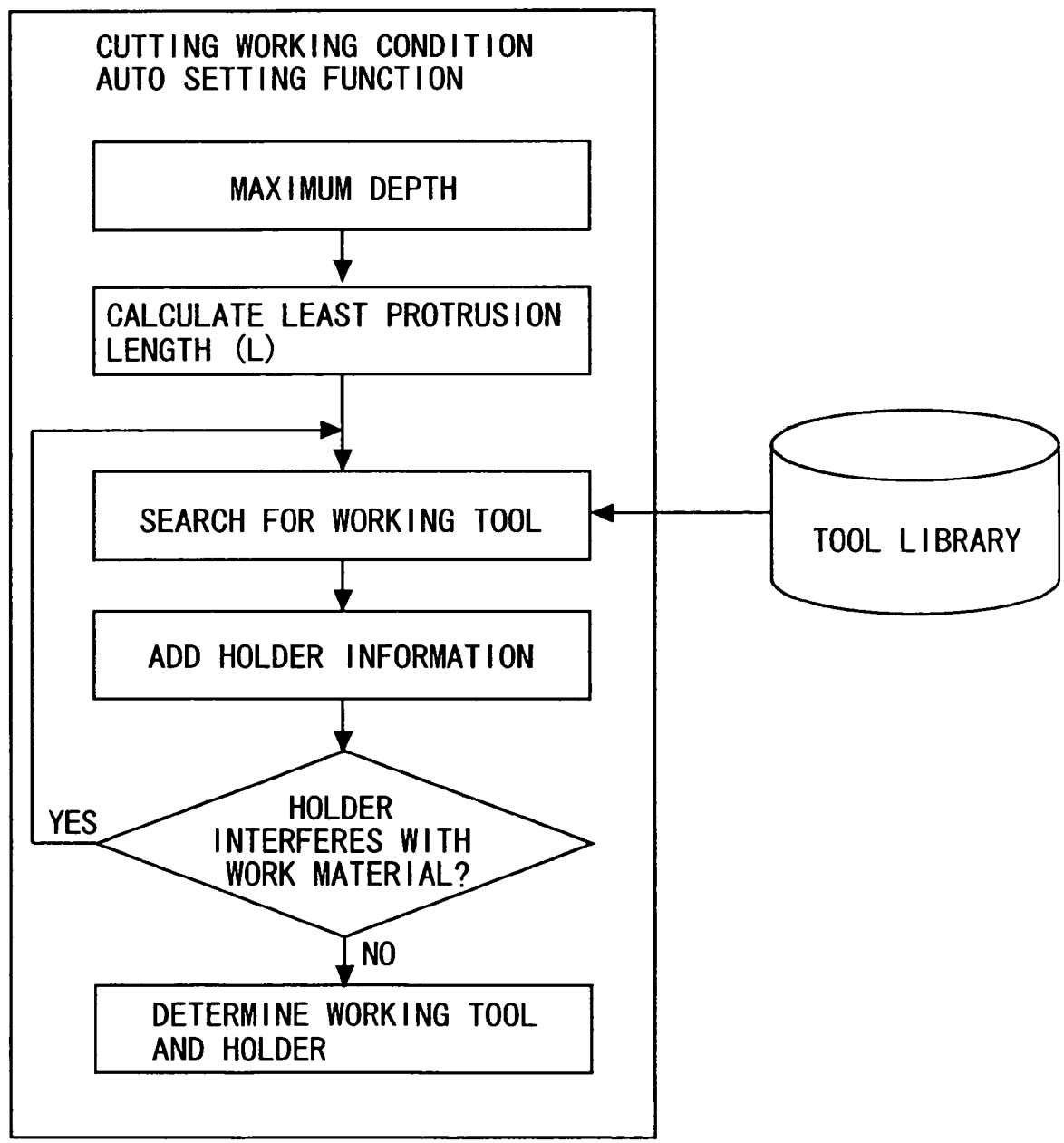
FIG. 28 is a flowchart of obtaining a tool protrusion quantity based on a cutting depth.

FIG. 28 is an explanatory diagram in the case of obtaining a tool protrusion quantity based on the cutting depth acquired in the item 2-6.

Figure 29:
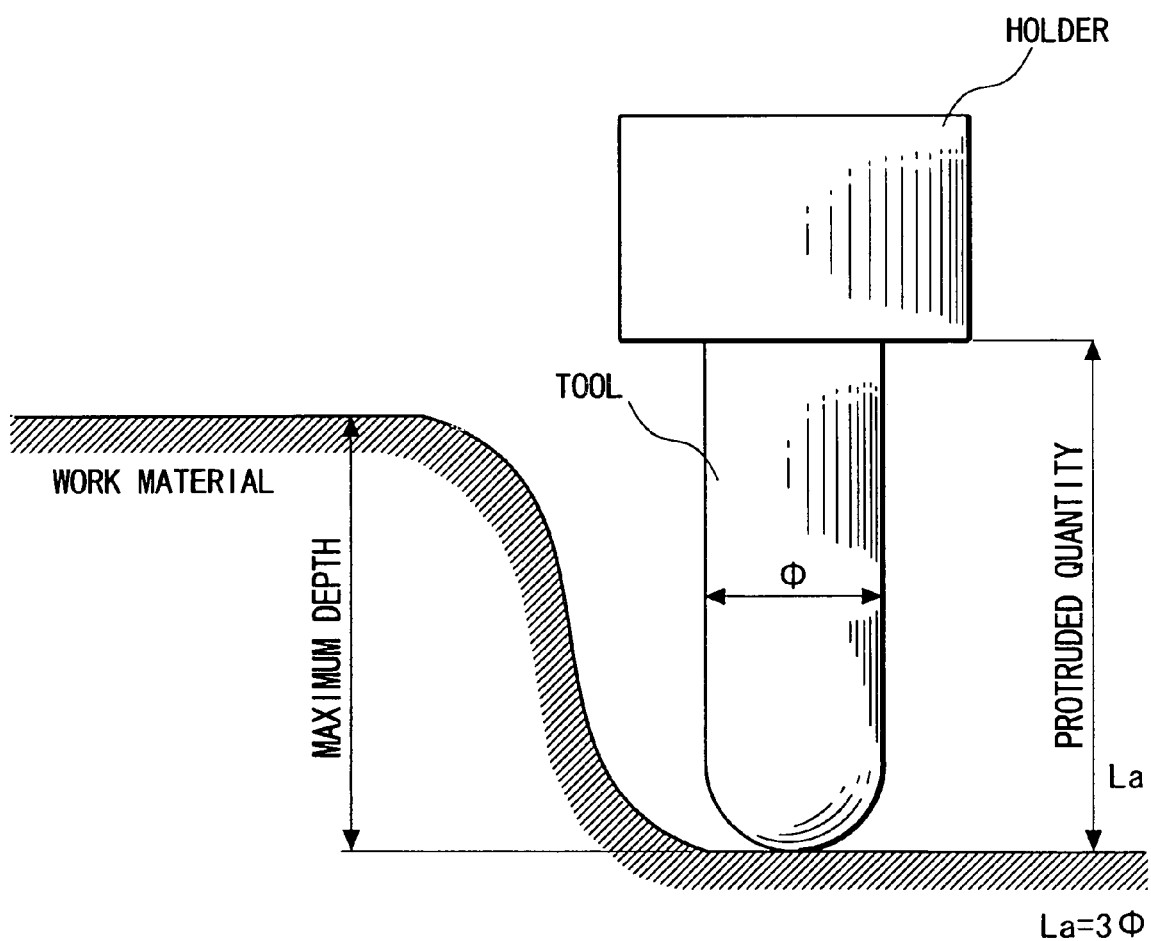
FIG. 29 is an explanatory diagram in the case of obtaining a tool protrusion quantity based on a cutting depth.

The cutting working condition auto setting unit 14, upon obtaining the cutting range boundary line as described above (S91), acquires a protrusion quantity L required at the minimum from the maximum depth (S92), selects from the tool library a cutting working tool having a protrusion quantity that exceeds this minimum protrusion quantity but is a small protrusion quantity or total length by referring to the tool library 16b (S93), then checks, in the case of combining with a designated holder shape designated from a diameter, etc. of the cutting working tool as shown in FIG. 29 (S94), whether or not the three-dimensional model interferes with this holder-attached cutting working tool (S95), deems it usable if not interfered (S96), and deems it unusable if interfered.

In the case of being unusable, a tool approximate to the maximum depth and having a small protrusion quantity or total length is next retrieved from the tool library, and similarly the interference check is conducted by combining the designated holder.

The cutting working condition auto setting unit 14 selects a working tool suited to the working depth by repeating this the working tool selection, the designated holder fitting and the interference check.

5-3. [Determination of Type of Tool Based on Surface Information]

Figure 30:
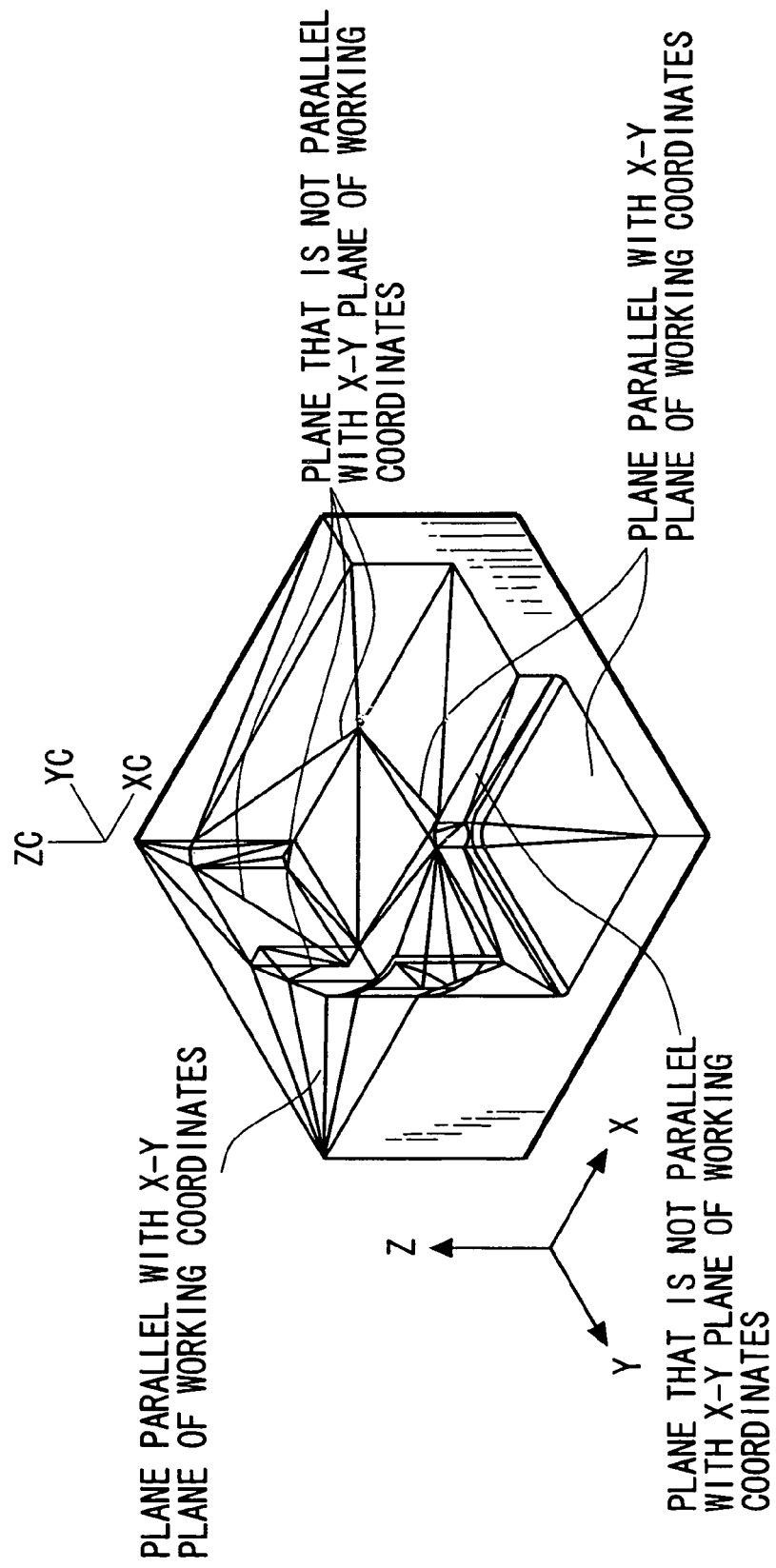
FIG. 30 is an explanatory diagram in the case of obtaining a type of a working tool based on the surface information.

FIG. 30 is an explanatory diagram in the case of obtaining a type of the working tool on the basis of the surface information acquired in the item 2-3.

The cutting working condition auto setting unit 14 obtains the surface information as described above and classifies them into flat surfaces parallel with the X-Y plane and surfaces unparallel therewith. Then, the cutting working condition auto setting unit 14 selects from the tool library 16C a flat end mill or a bull nose as a tool for working the flat surface parallel with the X-Y plane, and selects from the tool library 16c a ball end mill as a tool for working the flat surface unparallel with the X-Y plane of the working coordinates and a non-flat surface.

6. [Detection of Tool Life-Time or Breakage]

Figure 31:
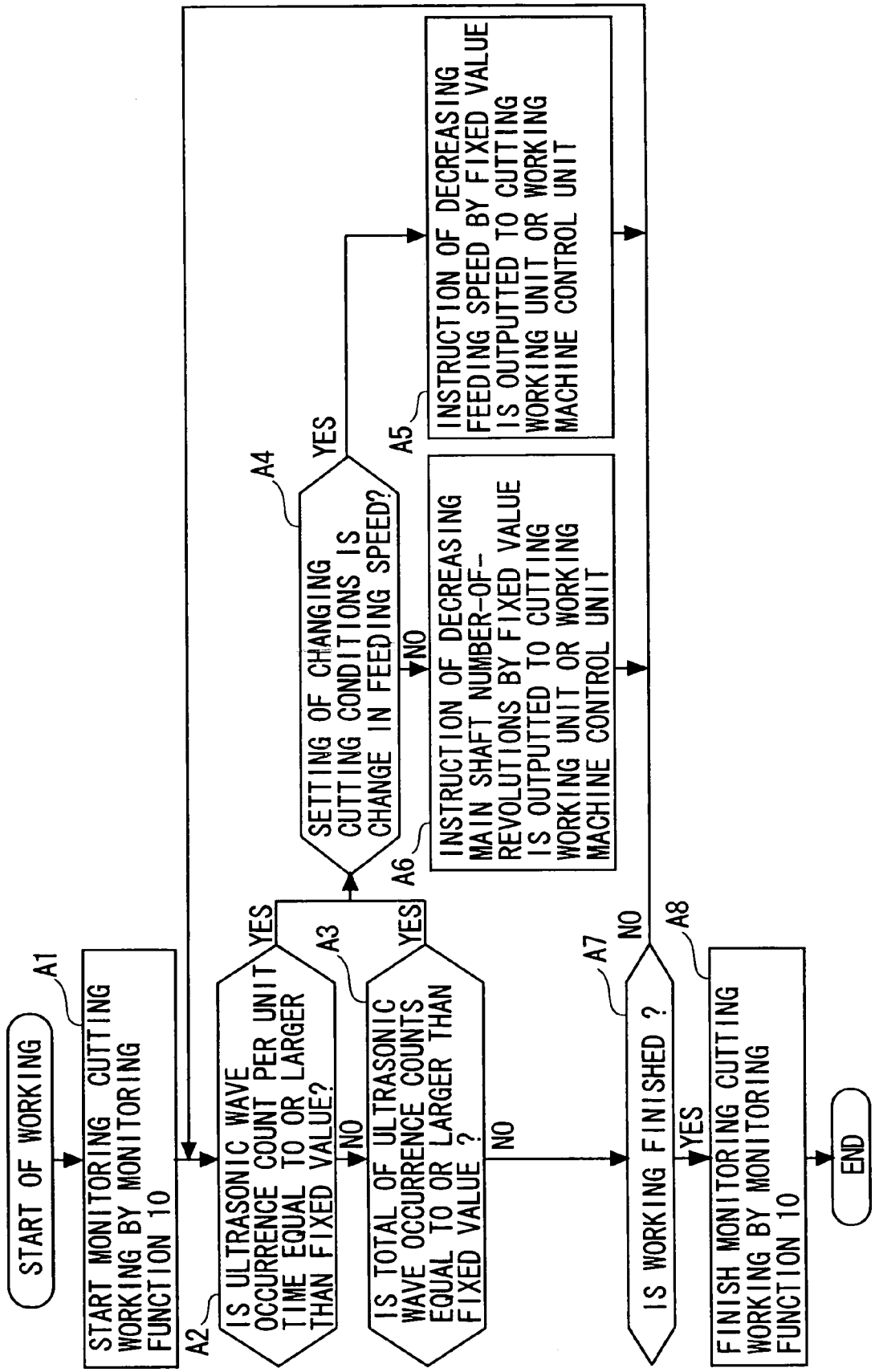
FIG. 31 is a flowchart of control of detecting a tool line-time or breakage.
Figure 32:
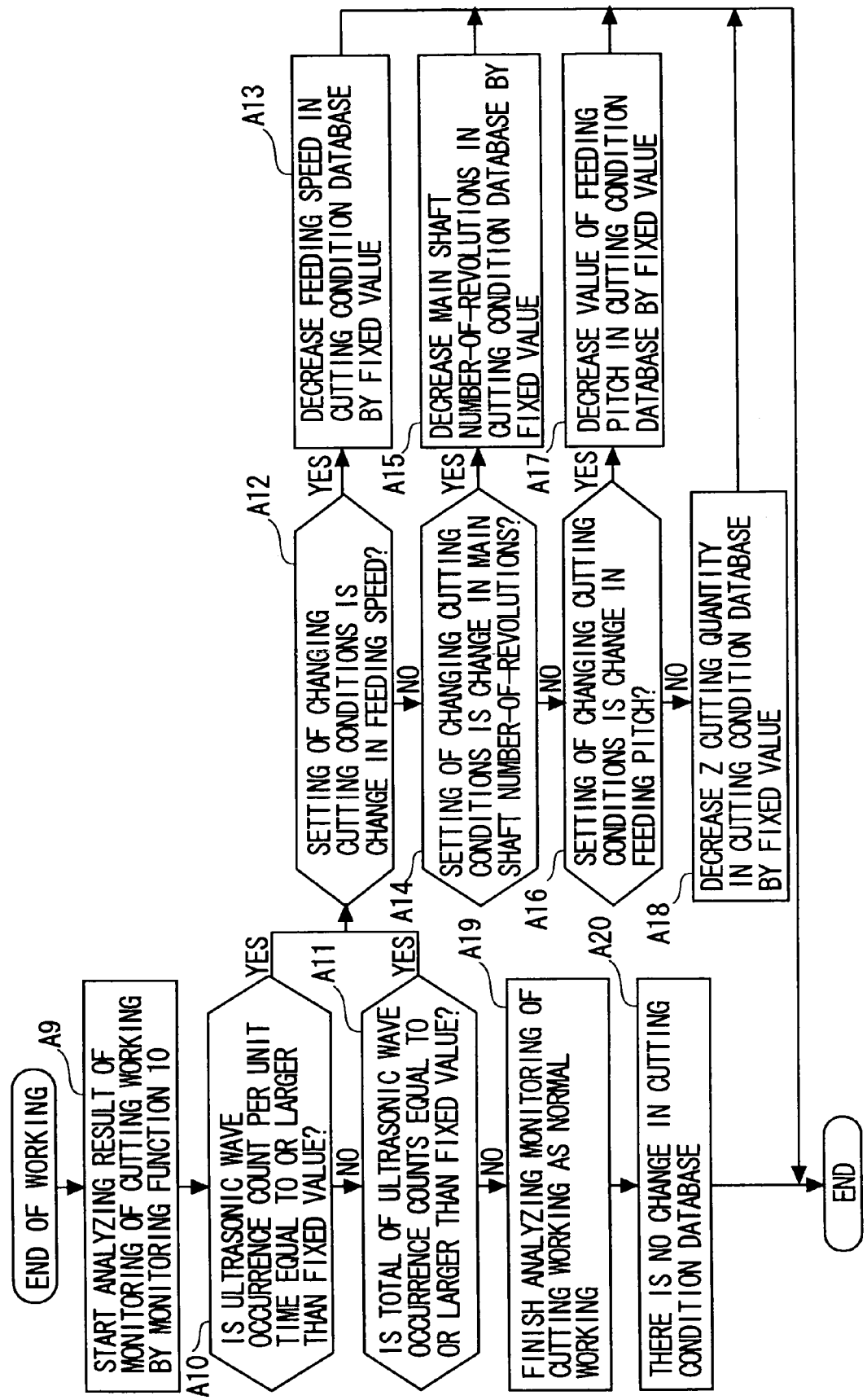
FIG. 32 is a flowchart of the control of detecting the tool line-time or breakage.

FIG. 31, FIG. 32 are explanatory charts for detecting a tool line-time or breakage.

The NC data automatically created by the auto NC data creating unit 19 are sent to the working machine control unit 22, and, when the cutting working machine 2 starts working, the monitoring unit 10 measures in real time a variety of physical states in the process of working on the basis of the values detected by the sensor unit 22a.

The auto NC data creating unit 19 avoids a breakage by controlling the cutting working conditions in real time in accordance with generated ultrasonic waves when a working tool material comes to a breakage among physical phenomena monitored by this monitoring unit 10, or controls the cutting working conditions of the next time in a way that changes the cutting condition database 16c after the cutting/working.

In the case of controlling the cutting working conditions in real time, the auto NC data creating unit 19, as shown in FIG. 31, at first starts monitoring (step A1, which will hereinafter be abbreviated such as A1), judges whether or not a quantity of ultrasonic waves intrinsic to the working tool material per unit time is equal to or larger than a predetermined value and whether or not a total number of generated ultrasonic waves is equal to or larger than a predetermined value (A3), and, in the case of exceeding this predetermined value, namely, a value from which to enable a prediction of an abnormal abrasion/breakage phenomenon of the working tool that is predetermined from the working test and the cutting/working experience (YES in A2)m or in case the number of generated ultrasonic waves during the cutting/working exceeds a value just before an expiration of the life-time and the breakage of the working tool (YES in A3), transmits an instruction (NC data) with the cutting working conditions changed to the cutting working machine 3 or via the cutting machine control unit 22 to the cutting working machine 2.

Herein, in case the change in the cutting working conditions is a change in the feeding speed (YES in A4), an instruction of decreasing the feeding speed by a fixed value at a predetermined rate is outputted to the cutting working machine 2 or via the working machine control unit 22 to the cutting working machine 2, and this is repeated till the number of generated ultrasonic waves becomes equal to or smaller than the predetermined value (A5). For example, in a case where the feeding speed has been set at F1000, that is done till it comes to F900. Even by doing so, in case the number of generated ultrasonic waves of the tool cannot be restrained, the feeding speed is decreased stepwise such as F800, F700 . . . during the cutting/working.

Moreover, in case the change in the cutting conditions is a change in the main shaft number-of-revolutions (NO in A4), an instruction of decreasing the main shaft number-of-revolutions by a fixed value at a predetermined rate is outputted to the cutting working machine 2 or via the working machine control unit 22 to the cutting working machine 2 (A6), further a quantity of the ultrasonic waves per unit time is measured, determining the main shaft number-of-revolutions is repeated, and this is conducted till the number of generated ultrasonic waves becomes equal to or smaller than the predetermined value.

Furthermore, in the case of changing the cutting condition database 16c after the cutting/working, as shown in FIG. 32, the cutting/working is performed according to the first NC data without changing the cutting conditions during the cutting/working, and the number of generated ultrasonic waves related to the abnormal abrasion/breakage phenomenon that has been monitored is temporarily stored on the storage device 33.

Then, after the cutting/working has been finished, the monitoring unit 10 judges whether or not the number of generated ultrasonic waves per unit time which has been temporarily recorded on the storage device 33 is equal to or larger than the predetermined value (A10) or whether or not a total number of generated ultrasonic waves is equal to or larger than a predetermined value (A11) In the case of judging in steps A10, All that the number of generated ultrasonic waves is equal to or larger than the predetermined value, the monitoring unit 10 judges whether the setting of the cutting condition is the change in the feeding speed or not (A12) and transmits, in the case of the change in the feeding speed, this piece of information to the working case registration unit 17, and the working case registration unit 17 decreases the feeding speed in the cutting condition database 16c by a predetermined value (A13).

Moreover, if the setting of the change in the cutting conditions is not the change in the feeding speed, it is judged whether or not this is a change in the main shaft number-of-revolutions (A14) or whether this is a changed in the feeding pitch or not (A15), in the case of YES, this piece of information is transmitted to the working case registration unit 17 in the same way as in the case of the feeding speed, and the working case registration unit 17 decreases the main shaft number-of-revolutions in the cutting condition database 16*c* by a predetermined value (A15) or decreases the feeding pitch by a predetermined value (A17).

Moreover, in case the setting of the change in the cutting conditions is none of the changes given above, the working case registration unit 17 decreases the Z-cutting quantity in the cutting condition database 16*c* by a predetermined value (A18).

As a result, in the setting of the cutting working conditions from the next time onwards, it follows that the working conditions, which this change is reflected in, and the NC data can be outputted.

The above operations are effected, whereby the cutting working conditions can be automatically controlled so as not to cause the occurrence of the abnormal abrasion of the tool when employing the same type of working tool.

In the embodiment, the physical phenomenon has been explained as the ultrasonic waves, however, the physical phenomena may be not only the ultrasonic waves but also, if being phenomena detectable by the sensor, sounds or vibrations perceptible to the five senses of a human being, a change in configuration and a suing time of the tool and further physical phenomena unperceptible to the five senses of the human being such as the ultrasonic waves.

7. [Control Dealing with Plural Tools as Set of Working Tools]

It is general that the cutting/working is conducted by separating it into a plurality of processes such as rough working, intermediate finishing working and finishing working. In this case, to begin with, the cutting is roughly done by a tool for rough working, and next this cutting residual is cut by a tool for the intermediate finishing working. At this time, as shown in FIG. 33A, if a tool C exhibiting an excessive cutting quantity is selected as the tool for the intermediate finishing working, it follows that more of cutting than needed is to be done, resulting in rough finishing. Therefore, it is required that a tool B capable of cutting the cutting residual and cutting to such an extent that the finishing working can be done by the tool A for finishing working as shown in FIG. 33B, be selected. Thus, in the case of selecting the tool, it is desirable that the selection be made taking into account the tools used before and after it.

Such being the case, in the embodiment, as shown in FIGS. 34, 35, the selection is made in a way that deals with the plurality of tools as a set (FIG. 33C).

To start with, the three-dimensional configuration characteristic extraction unit 12 of the system extracts the configuration information of the three-dimensional model for performing a working process design (B1). Next, the case searching unit 13 searches the working case database 15 for pieces of configuration information, i.e., the maximum external configuration dimensions, the removable volume, the surface information, the largest concave shape radius dimension, the minimum concave shape radius dimension, the maximum depth and the cutting range boundary line, and searches out a working case in which these pieces of configuration information are coincident within a predetermined allowable range and the working result is preferable (B2).

The cutting working condition auto setting unit 14 extracts a diameter of a single or a plurality of working tools used in this working case, a working tool holder, a tool material and a type such as a tool edge shape, etc. batchwise as a working tool set, and uses them as initial values in the new working process design (B3).

Next, the cutting working condition auto setting unit 14 assigns the working process to each of the tools extracted. For example, in case this searched-out working tool set is ball end mills having a diameter of 10 mm, a diameter of 6 mm, a diameter of 3 mm and a diameter of 1 mm, a first working process is assigned to the diameter of 10 mm, a second working process is assigned to the diameter of 6 mm, a third working process is assigned to the diameter of 3 mm, and a fourth working process is assigned to the diameter of 1 mm, thus assigning the working processes to the working tools from the largest diameter of the working tool down to the smallest diameter thereof (B4).

Next, the cutting working condition auto setting unit 14 obtains a cutting residual quantity per working process assigned, and, if there is a gap between the cutting residual quantity and the allowable range of the next tool, adds tools. A cutting residual volume of an n-th tool is obtained by, for instance, a method or the like of calculating the cutting residual part as shown in FIG. 22, and, if this is a larger than the allowable range (the Z-cutting quantity+a coefficient) of the next tool, an interpolation working process is automatically added to between an n-th working process and an (n+1) th working process subsequent thereto (B5).

Next, the cutting working condition auto setting unit 14, if the cutting residual quantity is small and falls within the allowable range of the next tool even when there are none of the tools, deletes this tool for efficiency. For example, if the cutting residual quantity of the n-th tool falls within the allowable range of an (n+2)th tool, the (n+1)th tool is deleted (B6).

Then, the cutting working condition auto setting unit 14 determines the tool set undergoing the execution of this adding/deleting process, as the using tools (B7).

This makes it feasible to design the working process that automatically uses the proper tools.

8. [Control of Determining Tool and Working Process from Target Time]

FIGS. 3, 36, 37, 38 are explanatory diagrams of control of determining the tool and the working process from a target time. As shown in the same Figures, the working control device of the invention executes respective steps of a method of determining the tool and the working process in accordance with the working control program (including a tool determining program).

To begin with, in step 1, the three-dimensional configuration characteristic extraction unit 12 acquires a final configuration (a configuration of an object workpiece) and a blank configuration from three-dimensional CAD data of the object workpiece, and acquires an area, as a removal area, into which the final configuration is removed from the blank configuration. For instance, in FIG. 36A, a solid black area represents the final configuration, a rectangular area drawn by a bold line represents the blank configuration, and a white-base area inside the blank configuration represents the removal area. Note that the blank configuration is acquired from the three-dimensional CAD data in the same way as in the item 2-8 in the embodiment. In the embodiment, the three-dimensional configuration characteristic extraction unit 12 obtains the removal area by removing the final configuration from the blank configuration (namely, a volume of the removal area is obtained by subtracting a volume of the final configuration from a volume of the blank), however, without being limited to this, only the final configuration is obtained in step 1, the blank configuration is inputted in step 2, and the cutting working condition auto setting unit 14 may acquire the removal area by removing the final configuration from the blank configuration in step 5.

In step 2, the pre-working input unit 11 accepts an input of pieces of object workpiece information such as a classification of a product, a material of the workpiece, etc. Note that the cutting working case database is previously stored with a cutting quantity (a reference cutting quantity) per unit time which serves as a reference, mapping to the object workpiece information such as the classification of the product, the material of the workpiece, etc.

In step 3, the case searching unit 13 searches the cutting working case database and thus obtains the cutting quantity mapping to the classification of the product and the material of the workpiece, as a working case.

In case this working case is searched out (S4), moving to step 5, the cutting working condition auto setting unit 14 determines, based on this working case, the working conditions, i.e., the tool and the working process.

Figure 37:
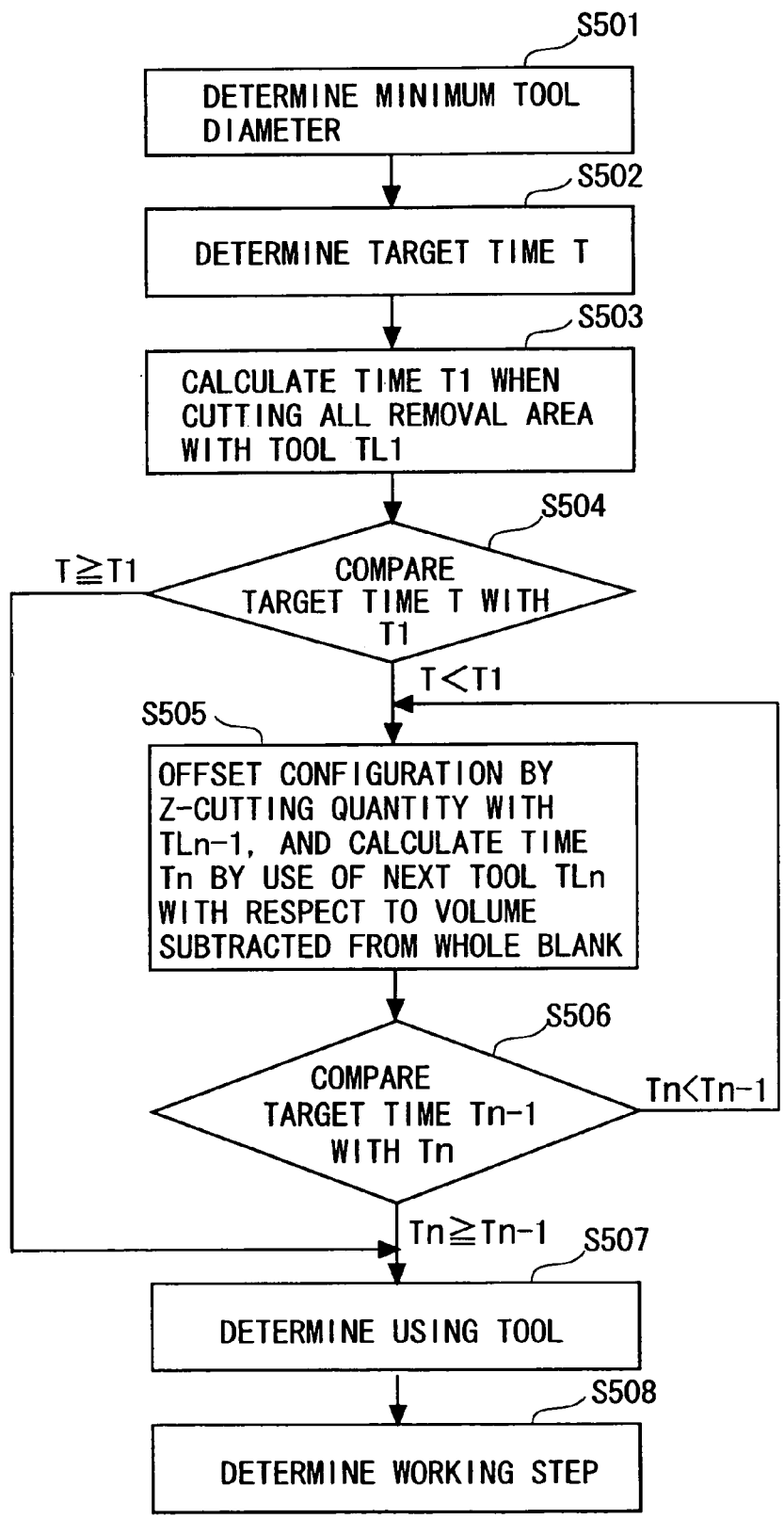
FIG. 37 is a flowchart of control of determining the tool and the process from a target time

FIG. 37 is the chart showing in detail a procedure of determining the tool and the working process in step 5.

As shown in the same chart, the cutting working condition auto setting unit 14 executes steps 501~508 that follow.

In step 501, a minimum tool diameter required for the cutting/working is determined based on the information about the usable tool information stored on the tool library and the three-dimensional CAD data. Namely, the minimum concave shape radius dimension is obtained as in the item 2-4 from the three-dimensional CAD data, and, among the diameters of the tools stored on the tool library, a diameter that is equal to or smaller than but most approximate to this dimension is set as the minimum tool diameter.

The tool library is stored with the tool diameter of the usable tool, the feeding speed, the pitch, the Z-cutting quantity and the cutting quantity per unit time as shown in, e.g., Table 1.

TABLE 1

| n | TOOL DIAMETER (mm) | FEEDING SPEED (mm/min) | PITCH (mm) | z-CUTTING QUANTITY (mm) | CUTTING QUANTITY PER UNIT TIME (mm³/min) |
|---|---|---|---|---|---|
| 1 | Ø1 | 450 | 0.25 | 0.1 | 11.25 |
| 2 | Ø2 | 480 | 0.5 | 0.2 | 48 |
| 3 | Ø3 | 560 | 0.75 | 0.3 | 126 |
| 4 | Ø4 | 640 | 1 | 0.4 | 256 |
| 5 | Ø6 | 700 | 1.5 | 0.6 | 630 |
| 6 | Ø8 | 800 | 2 | 0.8 | 1280 |
| 7 | Ø10 | 820 | 2.5 | 1 | 2050 |
| 8 | Ø12 | 740 | 3 | 1.2 | 2664 |

In step 502, a target time T of the cutting/working is determined based on the working case searched out by the case searching unit 13. Namely, the target time T is calculated by dividing the volume of the removal area by the reference cutting quantity.

In step 503, a time T1 when the entire removal area is cut by a tool TL1 having the minimum tool diameter, is calculated. That is, the cutting time T1 is obtained by dividing the volume of the removal area by the cutting quantity, per unit time, of the tool TL1.

In step 504, the target time T is compared with the cutting time T1, and there moves to step 505 if T<T1 and to step 507 if T=T1.

In step 505, the tools are added in sequence from the tool having the minimum tool diameter, and a cutting time Tn in the case of effecting the cutting/working with the tools inclusive of the n-th tool, is calculated. The tools to be added, which have diameters larger than the diameter of the tool with the cutting time already calculated, are extracted by every predetermined number of pieces from among the usable tools. For instance, if the minimum tool diameter is F1 and if extracted one by one, a tool having a tool diameter of F2 is added as T12. Further, the predetermined number of pieces are stored mapping to the object workpiece information on the cutting working case database and may also be a value searched out mapping to the object workpiece information. For instance, if the classification of the product is a die mold, the extraction is done one by one, and, if being a box body for a personal computer, the extraction is done by every twos.

Figure 36A:
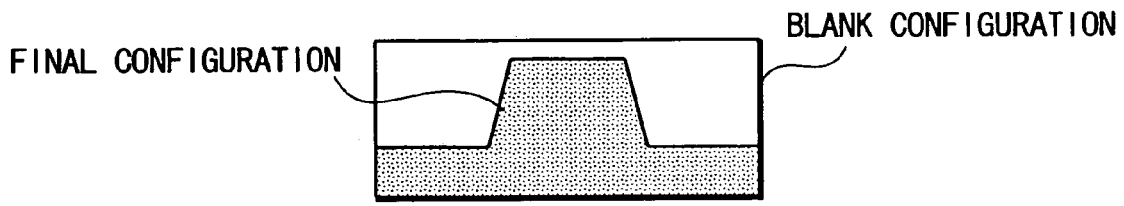
FIG. 36A-36D are an explanatory diagram of control of determining a tool and a working process.
Figure 36B:
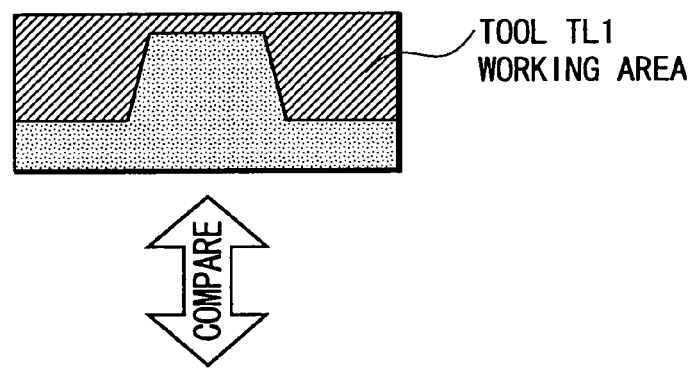
Figure 36C:
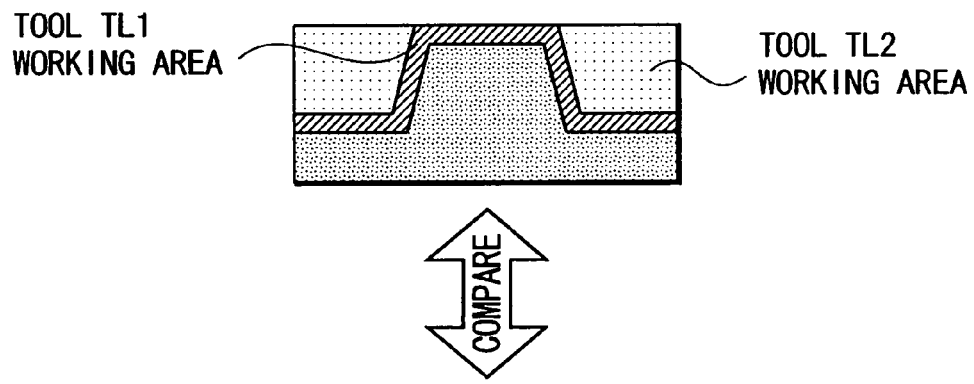
Figure 36D:
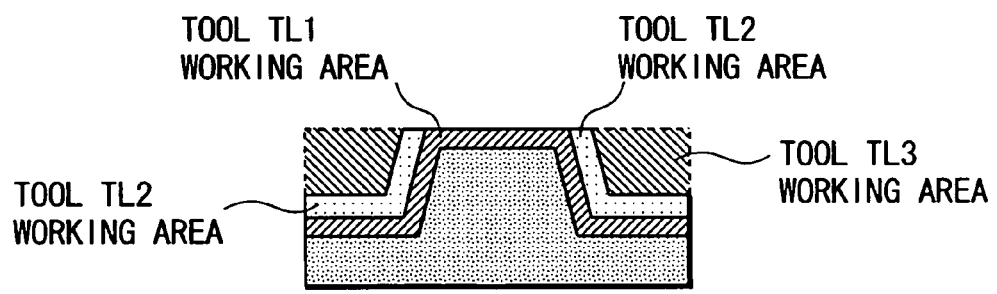

Moreover, in step 505, the cutting time Tn is calculated, wherein the cutting/working for the Z-cutting quantity is performed with the tools inclusive of TLn−1 when the n-th tool is set as TLn, and a time for which the residual cutting/working is effected with the tool TLn is set as the time Tn. Namely, in step 503, as indicated by a hatching area in FIG. 36B, the working time when the entire removal area is cut by the tool TL1 is obtained, while in step 505, in the case of adding the second tool TL2, the cutting is conducted with the tool TL1 by the Z-cutting quantity as shown in FIG. 36C (the hatching area), and a time T2 when a residual vertical line area is cut with TL2, is obtained. Moreover, in the case of adding TL3, as shown in FIG. 37C, a time T3 is obtained.

Figure 38A:
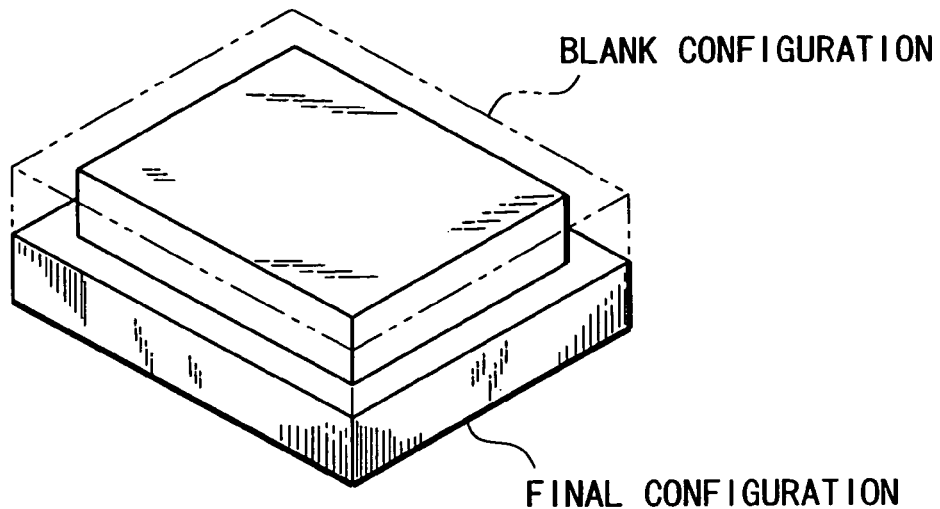
FIG. 38A-38B are an explanatory diagram of the control of determining the tool and the working process.
Figure 38B:
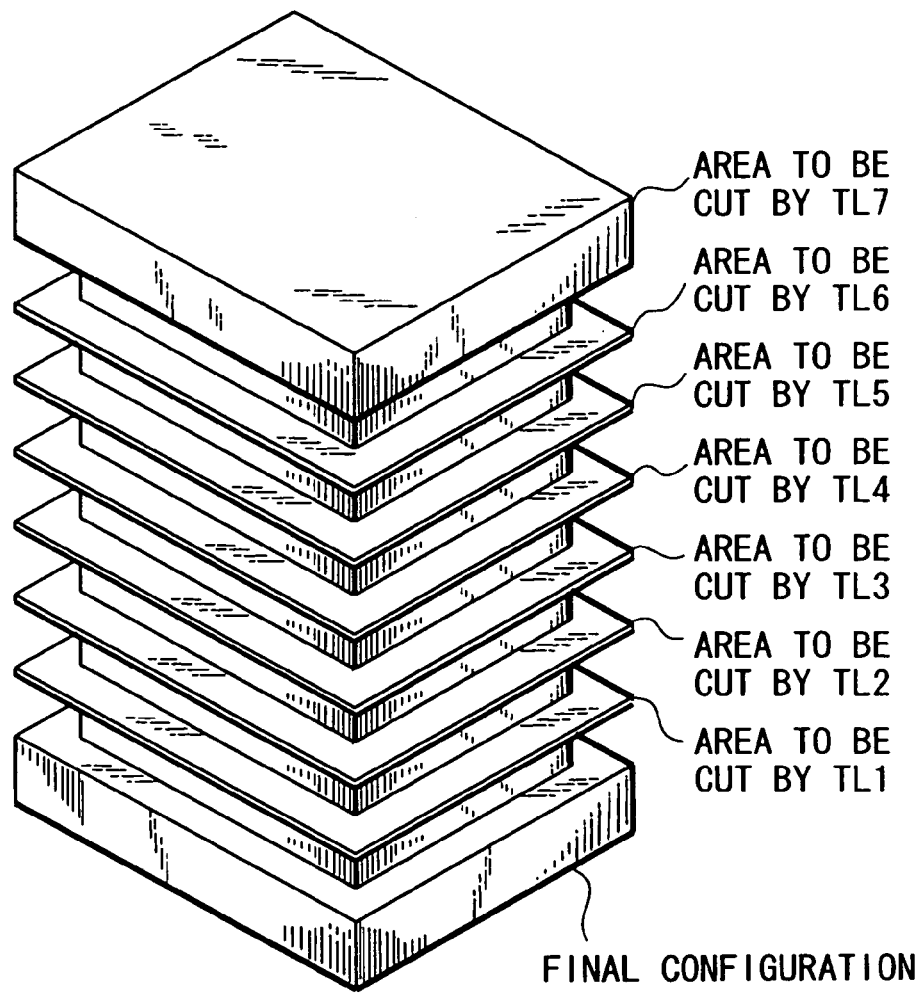

For example, in the case of working a blank (workpiece) of 100×80×50 (mm) in a final configuration as shown in FIG. 38A, the minimum tool diameter is set to Φ1, the tools registered on the tool library shown in Table 1 are added one by one, in the case of working with seven pieces of tools, as shown in FIG. 38B, the cutting/working is effected respectively with the tools of TL1 through TL6 by the Z-cutting quantity, and the residual cutting/working is done with the a tool TL7.

Table 2 shows volumes cut respectively by the tools TL1~TL8 in the case of performing the working by n-pieces of tools.

TABLE 2

| n | TOOL DIAMETER | Ø1 | Ø2 | Ø3 | Ø4 | Ø6 | Ø8 | Ø10 | Ø12 |
|---|---|---|---|---|---|---|---|---|---|
| 1 | Ø1 | 144000 | | | | | | | |
| 2 | ~Ø2 | 1360.8 | 142639.2 | | | | | | |
| 3 | ~Ø3 | 1360.8 | 2726.4 | 139912.8 | | | | | |
| 4 | ~Ø4 | 1360.8 | 2726.4 | 4101.6 | 135811.2 | | | | |
| 5 | ~Ø6 | 1360.8 | 2726.4 | 4101.6 | 5491.2 | 130320 | | | |
| 6 | ~Ø8 | 1360.8 | 2726.4 | 4101.6 | 5491.2 | 8284.8 | 122035.2 | | |
| 7 | ~Ø10 | 1360.8 | 2726.4 | 4101.6 | 5491.2 | 8284.8 | 11136 | 110899.2 | |
| 8 | ~Ø12 | 1360.8 | 2726.4 | 4101.6 | 5491.2 | 8284.8 | 11136 | 14064 | 96835.2 |

Namely, the cutting time Tn in the case of effecting the cutting/working by each number of pieces is a sum of the time when cut with the tools TL1~TLn−1 by the Z-cutting quantity and the time when the residual cutting is done with the tool TLn. Table 3 shows the cutting time Tn in the case of effecting the cutting/working with each number of pieces.

TABLE 3

| n | TOOL DIAMETER (min) | CUTTING TIME Tn(min) |
|---|---|---|
| 1 | p11 Ø1 | 12800 |
| 2 | ~Ø2 | 3093 |
| 3 | ~Ø3 | 1288 |
| 4 | ~Ø4 | 741 |
| 5 | ~Ø6 | 439 |
| 6 | ~Ø8 | 340 |
| 7 | ~Ø10 | 308 |
| 8 | ~Ø12 | 297 |

In step 506, the cutting time Tn is compared the target time T, the tool is added if T<Tn, the process (S505) of calculating the cutting time Tn is repeated, and there moves to step 507 if T=Tn.

In step 507, the using tool is determined from among the n-pieces of tools at a point of time when the cutting time Tn becomes shorter than the target time. Namely, if the cutting time T1 is equal to or less than the target time T, only the tool TL1 is used, and, if equal to or less than the target time T when the cutting time Tn=T5, the using tool is determined from among TL1~TL5. For example, if the target time is 330 sec in an example of the Table 3, the using tool is determined from among TL1~TL7.

Note that the method of determining the using tool from the plurality of tools is arbitrary, all the tools may be used, and a predetermined number of pieces may also be selected. For instance, in the case of selecting three pieces from among n-pieces of tools (n is three or larger in this case), a tool having the minimum diameter, a tool having the maximum diameter and one piece of tool having an intermediate diameter therebetween are selected. Similarly, in the case of selecting four pieces from among the n-pieces of tools, the tool having the minimum diameter, the tool having the maximum diameter and two pieces of tools having the intermediate diameter therebetween are selected.

In step 508, the working process is determined in sequence from the largest tool diameter among the selected tools. For example, in case this searched-out working tool set is ball end mills having a diameter of 10 mm, a diameter of 6 mm, a diameter of 3 mm and a diameter of 1 mm, a first working process is assigned to the diameter of 10 mm, a second working process is assigned to the diameter of 6 mm, a third working process is assigned to the diameter of 3 mm, and a fourth working process is assigned to the diameter of 1 mm, thus assigning the working processes to the working tools from the largest diameter of the working tool down to the smallest diameter thereof.

Then, processes from step 7 onwards are executed by use of the determined tools and the working processes.

Thus, the tools are added in sequence from the tool TL1 having the minimum tool diameter, the tool Ln when the target time is reached is obtained, and the tools are determined to use TL1~TLn, whereby the target time is set from general pieces of information such as the classification of the product, the material of the blank and the tools can be easily determined even in a case where the cutting working case database has none of the similar working cases.

Further, in the case of determining the tools in sequence from the largest diameter as a man determines the tools, irrespective of the configuration of the object workpiece, a calculation as to whether the tool is usable or not in sequence from the largest tool among those registered on the tool library, must be performed, however, the tool having the minimum tool diameter can be uniquely obtained from the three-dimensional CAD data of the object workpiece, and, if the tools are determined in a diameter decreasing sequence from the tool having the smallest diameter, the tools and more essentially the working processes can be determined.

9. [Control of Determining Tool and Working Process from Reduction Time]

Figure 39:
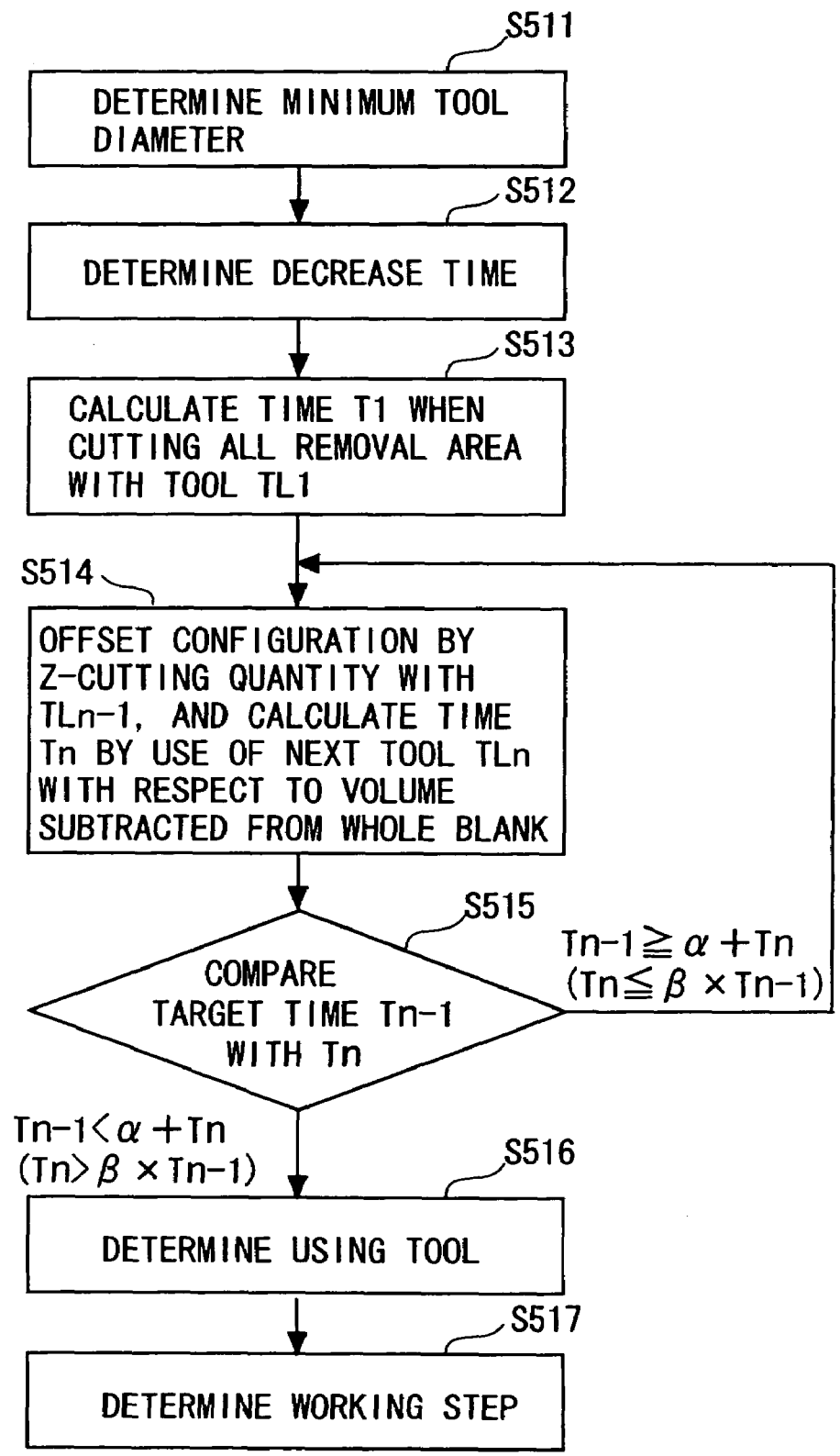
FIG. 39 is a flowchart of the control of determining the tool and the process from a reduction time.

FIGS. 3 and 39 are explanatory diagrams of control of determining the tool and the working process from a reduction time. As shown in the same Figures, the working control device of the invention executes respective steps of a method of determining the tool and the working process from the reduction time in accordance with the working control program (including the tool determining program).

At first, in step 1, the three-dimensional configuration characteristic extraction unit 12 acquires a final configuration (a configuration of an object workpiece) and a blank configuration from the three-dimensional CAD data of the object workpiece, and acquires an area, as a removal area, into which the final configuration is removed from the blank configuration (namely, a volume of the removal area is obtained by subtracting a volume of the final configuration from a volume of the blank). In the embodiment, the three-dimensional configuration characteristic extraction unit 12 obtains the removal area, however, without being limited to this, only the final configuration is obtained in step 1, the blank configuration is inputted in step 2, and the cutting working condition auto setting unit 14 may acquire the removal area by removing the final configuration from the blank configuration in step 5.

In step 2, the pre-working input unit 11 accepts an input of pieces of object workpiece information such as a classification of a product, a material of the workpiece, etc. Note that the cutting working case database is previously stored with a cutting quantity (a reference cutting quantity) per unit time which serves as a reference for determining the tool, mapping to the object workpiece information such as the classification of the product, the material of the workpiece, etc.

In step 3, the case searching unit 13 searches the cutting working case database and thus obtains a reference value mapping to the classification of the product and the material of the workpiece, as a working case.

In case this working case is searched out (S4), moving to step 5, the cutting working condition auto setting unit 14 determines, based on this working case, the working conditions, i.e., the tool and the working process.

FIG. 39 is the chart showing in detail a procedure of determining the tool and the working process in step 5.

As shown in the same chart, the cutting working condition auto setting unit 14 executes the following steps.

In step 511, a minimum tool diameter required for the cutting/working is determined based on the information about the usable tool information stored on the tool library and the three-dimensional CAD data. Namely, the minimum concave shape radius dimension is obtained as in the item 2-4 from the three-dimensional CAD data, and, among the diameters of the tools stored on the tool library, a diameter that is equal to or smaller than but most approximate to this dimension is set as the minimum tool diameter.

The tool library is stored with the tool diameter of the usable tool, the feeding speed, the pitch, the Z-cutting quantity and the cutting quantity per unit time as shown in, e.g., Table 1.

In step 512, a reduction time of the cutting/working is determined based on the working case (the reference value) searched out by the case searching unit 13. Namely, the reduction time (e.g., 30 min.) is calculated by dividing the value of the removal area by the reference value. This reduction time may be a time difference a between the cutting time Tn and the cutting time Tn−1 and may also be a rate β (a reduction rate: Tn/Tn−1) of the cutting time Tn−1 to the cutting time Tn. Further, in the example, the time difference is determined by calculating the reference value searched out, however, without being limited to this, the reduction time (the time difference a and the reduction rate β) is stored beforehand mapping to the object workpiece information, and the working case searched out by the case searching unit 13 may be determined directly as the reduction time.

In step 513, a time T1 when the entire removal area is cut by a tool TL1 having the minimum tool diameter, is calculated. That is, the cutting time T1 is obtained by dividing the volume of the removal area by the cutting quantity, per unit time, of the tool TL1.

In step 514, the tools are added in sequence from the tool having the minimum tool diameter, and the cutting time Tn in the case of effecting the cutting/working with the tools inclusive of the n-th tool, is calculated. The tools to be added, which have diameters larger than the diameter of the tool with the cutting time already calculated, are extracted by every predetermined number of pieces from among the usable tools.

In this step 514, the cutting time Tn is calculated, wherein the cutting/working for the Z-cutting quantity is performed with the tools inclusive of TLn−1 when the n-th tool is set as TLn, and a time for which the residual cutting/working is effected with the tool TLn is set as the time Tn.

Table 2 shows volumes cut respectively by the tools TL1~TL8 in the case of performing the working by n-pieces of tools.

Namely, the cutting time Tn in the case of effecting the cutting/working by each number of pieces is a sum of the time when cut with the tools TL1~TLn−1 by the Z-cutting quantity and the time when the residual cutting is done with the tool TLn.

In step 515, the cutting time Tn with the tool TLn is compared with the cutting time Tn−1 with the tools TL1~TLn−1, in a case where the time Tn becomes shorter by the reduction time (corresponding to a predetermined value) or above than the time Tn−1, namely, if Tn−1=a+Tn (or Tn=β×Tn−1), the process (S514) of calculating the cutting time Tn by adding the tool is repeated, and, in case the cutting time Tn does not become shorter by the reduction time or above than the cutting time Tn−1, namely, if Tn−1<a+Tn (or Tn>β×Tn−1), there moves to step 516.

Table 4 shows the reduction time (the time difference a and the reduction rate β) in the case of performing the cutting/working with each number of tools.

TABLE 4

| n✱ | TOOL DIAMETER (min) | CUTTING TIME Tn(min) | TIME DIFFERENCE (min) | REDUCTION RATE (%) |
|---|---|---|---|---|
| 1 | Ø1 | 12800 | | |
| 2 | ~Ø2 | 3093 | 9707 | 75.8 |
| 3 | ~Ø3 | 1288 | 1804 | 58.3 |
| 4 | ~Ø4 | 741 | 547 | 42.5 |
| 5 | ~Ø6 | 439 | 302 | 40.8 |
| 6 | ~Ø8 | 340 | 98 | 22.4 |

TABLE 4-continued

| n✱ | TOOL DIAMETER (min) | CUTTING TIME Tn(min) | TIME DIFFERENCE (min) | REDUCTION RATE (%) |
|---|---|---|---|---|
| 7 | ~Ø10 | 308 | 33 | 9.6 |
| 8 | ~Ø12 | 297 | 11 | 3.5 |

In step 516, the using tool is determined from among (n−1)-pieces of tools at a point of time when the time Tn does not shorter by the predetermined value or above than the time Tn−1. That is, if the cutting time T1 is less than a+T2, only the tool TL1 is employed, and, if the cutting time Tn−1=T5 comes to less than a+T6, the tool is determined from among TL1~TL5. For example, in the example in Table 4, if the time difference a is 30 min. or if the reduction rate β is 10%, the tool is determined from among TL1~TL7.

Note that the method of determining the using tool from the plurality of tools is arbitrary, all the tools may be used, and a predetermined number of pieces may also be selected. For instance, in the case of selecting three pieces from among n-pieces of tools (n is three or larger in this case), a tool having the minimum diameter, a tool having the maximum diameter and one piece of tool having an intermediate diameter therebetween are selected. Similarly, in the case of selecting four pieces from among the n-pieces of tools, the tool having the minimum diameter, the tool having the maximum diameter and two pieces of tools having the intermediate diameter therebetween are selected.

In step 517, the working process is determined in sequence from the largest tool diameter among the selected tools. For example, in case this searched-out working tool set is ball end mills having a diameter of 10 mm, a diameter of 6 mm, a diameter of 3 mm and a diameter of 1 mm, a first working process is assigned to the diameter of 10 mm, a second working process is assigned to the diameter of 6 mm, a third working process is assigned to the diameter of 3 mm, and a fourth working process is assigned to the diameter of 1 mm, thus assigning the working processes to the working tools from the largest diameter of the working tool down to the smallest diameter thereof.

Then, the processes from step 7 onwards are executed by use of the determined tools and the working processes.

Thus, the tools are added in sequence from the tool TL1 having the minimum tool diameter, the tool Ln when the target time is reached is obtained, and the tools are determined to use TL1~TLn, whereby the target time is set from general pieces of information such as the classification of the product, the material of the blank, etc. and the tool can be easily determined even in a case where the cutting working case database has none of the similar working cases.

Further, in the case of determining the tools in sequence from the largest diameter as a man determines the tools, irrespective of the configuration of the object workpiece, a calculation as to whether the tool is usable or not in sequence from the largest tool among those registered on the tool library, must be performed, however, the tool having the minimum tool diameter can be uniquely obtained from the three-dimensional CAD data of the object workpiece, and, if the tools are determined in a diameter decreasing sequence from the tool having the smallest diameter, the tools and more essentially the working processes can be determined.

§3. Effects of Embodiment

As described above, according to the embodiment, the working configuration characteristics of how the man has been recognizing the working configuration and determining the cutting process, the using tool, the cutting conditions, etc. from the experiences, are used as the search key to search for the similar working case, the working conditions are determined based on this, and the processes of how the man determines the working conditions as the brain conceives are systematized, thereby enabling the inexperienced person for the cutting/working to perform the cutting/working in safety with the high quality in a way that restrains a scatter in quality, which depends on the know-how and the experiences of other persons.

Further, the numerical value data are acquired form the actual working phenomena and accumulated as the working cases on the database, and this enables them to be retrieved corresponding to the characteristics of the working configuration, whereby the know-how, which could not be so far left except as a memory of the experienced person, is left as the database and made thus reusable.

Moreover, as for the object workpiece about which the there is no cutting/working experience, the proper tool and process can be easily determined based on the general pieces of information (the default values) such as the classification of the product, the material of the blank, etc. Further, it is possible to restrain the scatter in working quality depending on the difference in experience between the operators. Still further, the tool and the process can be efficiently determined by the search starting from the minimum tool diameter.

What is claimed is:

1. A working control device comprising:
    a configuration characteristic extraction unit obtaining configuration information about characteristics of a three-dimensional configuration from design data of an object workpiece;
    a working case storage unit storing working conditions, as a working case, of a working of a prior formed object workpiece conducted in the past;
    a case searching unit searching out the working case from the working case storage unit on the basis of the configuration information;
    a working condition setting unit determining the working conditions based on the working case searched out by the case searching unit;
    a control unit controlling a working machine on the basis of the working conditions;
    a monitoring unit obtaining information of the working machine when the control unit controls based on the working conditions; and
    a working case registration unit having the working case storage unit stored with the working machine information obtained by the monitoring unit in a way that makes it as a working case mapping to the configuration information.

2. A working control device according to claim 1, further comprising:
    a judgment criterion storage unit stored with information serving as a judgment criterion for the working conditions,
    wherein the working condition setting unit determines the working conditions based on the information of the judgment criterion storage unit and on the working case searched out by the case searching unit.

3. A working control device according to claim 1, further comprising:
    a pre-working input unit accepting an input of information about the object workpiece,
    wherein the working condition setting unit determines the working conditions based on the information given from the pre-working input unit and on the design data.

4. A working control device according to claim 1, further comprising:
    a post-working input unit accepting an input of information about whether the working is preferable or not,
    wherein the working case registration unit has the working case storage unit stored with the working case, corresponding to the information accepted by the post-working input unit.

5. A working control device according to claim 1, wherein the configuration characteristic extraction unit divides a surface of the object workpiece represented by the design data into polygons, obtains coordinates of vertexes of these polygons as X-, Y- and Z-values in the case of being expressed by values in X-, Y- and Z-direction, obtains minimum and maximum X-values, minimum and maximum Y-values and minimum and maximum Z-values among all the vertexes, obtains a maximum X-axis directional length by subtracting the minimum X-value from the maximum X-value, obtains a maximum Y-axis directional length by subtracting the minimum Y-value from the maximum Y-value, and obtains a maximum Z-axis directional length by subtracting the minimum Z-value from the maximum Z-value.

6. A working control device according to claim 5, wherein the configuration characteristic extraction unit projects all the polygons onto an X-Y plane on which a lowermost part of the object workpiece is positioned, obtains a volume of a polygon pole created by connecting respectively the vertexes of each polygon to corresponding vertexes of the polygon projected onto the X-Y plane, obtains a volume of the object workpiece by repeating this calculation with respect to all the polygons, and obtains a removal volume by subtracting this from a volume obtained by multiplying the maximum X-axis directional length, the maximum Y-axis directional length and the maximum Z-axis directional length.

7. A working control device according to claim 1, wherein the configuration characteristic extraction unit judges whether a normal line of the polygon is parallel with a working axis or not, and classifies the polygon exhibiting the parallelism according to a value in the Z-axis direction.

8. A working control device according to claim 1, wherein the configuration characteristic extraction unit extracts concave shape parts of the object workpiece represented by the design data, and obtains a concave shape radius dimension having a minimum radius in the concave shape parts.

9. A working control device according to claim 1, wherein the configuration characteristic extraction unit extracts concave shape parts of the object workpiece represented by the design data, classifies the concave shape parts according to a radius dimension, obtains an areal size of the concave shape part according to this radius dimension, and obtains a radius dimension having a maximum areal size.

10. A working control device according to claim 1, wherein the configuration characteristic extraction unit divides a surface of the object workpiece represented by the design data into polygons, compares, in the case of representing the coordinates of the vertexes of these polygons in values in the X-Y- and Z-directions, Z-axis values of the vertexes of the polygons excluding the polygons having fitting surfaces to the working machine and the polygons abutting on these fitting surfaces, and obtains a minimum Z-axis value as a maximum depth of the object workpiece.

11. A working control device according to claim 1, wherein the configuration characteristic extraction unit divides a surface of the object workpiece represented by the design data into polygons, judges whether or not a normal line of the polygon is parallel with the working axis, classifies the polygons into the polygons exhibiting the parallelism and the polygons exhibiting no parallelism, obtains a working range by grouping the polygons including shared edges with respect to each classification, and obtains the edges, as a working range boundary line, which are not shared with other polygons in each group.

12. A working control device according to claim 1, wherein the configuration characteristic extraction unit obtains blank dimensions by adding a working margin in the working case searched out by the case searching unit to the maximum X-axis directional length, the maximum Y-axis directional length and the maximum Z-axis directional length.

13. A working control device according to claim 1, further comprising:
   a monitoring unit obtaining information of the working machine when the control unit performs the control based on the working conditions;
   a post-working input unit accepting an input of information about whether a result of the working is preferable or not when performing the control; and
   a working case registration unit having the working case storage unit stored with the working machine information obtained by the monitoring unit and information about whether a result of the working is preferable or not in a way that makes it as a working case mapping to the configuration information,
   wherein in case the result of the working in the working case searched out by the case searching unit is preferable, the working condition setting unit determines the working conditions based on the working case.

14. A working control device according to claim 1, wherein the case searching unit searches the working case database by using the configuration information obtained from the configuration characteristic extraction unit as a search key, and thus searches out a working case mapping to the configuration information falling within a predetermined range.

15. A working control device according to claim 1, wherein the working machine is a cutting machine,
   the monitoring unit measures a main shaft load state of the working machine, and
   the control unit, in case the measured main shaft load is out of a predetermined range, adjusts a feeding speed of the cutting machine so as to fall within the predetermined range.

16. A working control device according to claim 1, wherein the working machine is a cutting machine,
   the monitoring unit measures a main shaft load state of the working machine, and
   the control unit, in case the measured main shaft load is out of a predetermined range, adjusts a the number of revolutions of the main shaft of the cutting machine so as to fall within the predetermined range.

17. A working control device according to claim 1, wherein in the case of using a plurality of tools, the working condition setting unit compares a cutting residual quantity of the tool to be used ahead with an allowable range of the tool to be used next, and, if the cutting residual quantity of the tool to be used ahead exceeds the allowable range of the next tool, sets so that the cutting residual quantity of the tool to be used head falls within the allowable range of the next tool by changing, adding or deleting the tool.

18. A working control device according to claim 1, wherein in the case of using a plurality of tools, the working condition setting unit compares a cutting residual quantity of the tool to be used ahead with an allowable range of the tool to be used next, adds a tool used between the tool to be used ahead and the tool to be used next if the cutting residual quantity of the tool to be used ahead is over an upper limit of the allowable range of the next tool, compares the cutting residual quantity of the tool to be used ahead with the allowable range of the tool to be used next if the cutting residual quantity of the tool to be used ahead is under a lower limit of the allowable range of the next tool, and deletes the tool to be used next if the cutting residual quantity of the tool to be used ahead is within the allowable range of the tool to be used next.

19. A working control device according to claim 1, further comprising a judgment criterion storage unit having a tool library stored with information of usable tools,
   wherein the working condition setting unit determines a minimum tool diameter necessary for the cutting/working on the basis of the design data and the usable tool information, determines a target time T of the cutting/working on the basis of the working case searched out by the case searching unit, adds the tools in sequence from the tool having the minimum tool diameter, calculates a time Tn in the case of effecting the cutting/working with the tools inclusive of an n-th tool, repeats a process of calculating the time Tn by adding the tools till the time Tn becomes shorter than the target time T, and determines the using tool from among the n-pieces of tools at a point of time when the time Tn becomes shorter than the target time.

20. A working control device according to claim 1, further comprising a judgment criterion storage unit having a tool library stored with information of usable tools,
   wherein the working condition setting unit determines a minimum tool diameter necessary for the cutting/working on the basis of the design data and the usable tool information, adds the tools in sequence from the tool having the minimum tool diameter, calculates a time Tn in the case of effecting the cutting/working with the tools inclusive of an n-th tool, repeats a process of calculating the time Tn by adding the tools till the time Tn becomes shorter by a predetermined value than a time Tn−1 in the case of effecting the cutting/working with the tool inclusive of an (n−1)th tool, and determines the using tool from among the (n−1)-pieces of tools at a point of time when the time Tn does not become shorter by the predetermined value than the time Tn−1.

21. A computer readable medium comprising a working control program for making a computer execute steps of:
   obtaining configuration information about characteristics of a three-dimensional configuration from design data of an object workpiece;
   searching out a working case on the basis of the configuration information from a working case storage unit storing working conditions, as a working case, of a working of a prior formed object workpiece conducted in the past;
   determining the working conditions based on the working case;
   controlling a working machine on the basis of the working conditions;
   obtaining from a monitoring unit information of the working machine when the control program controls based on the working conditions; and
   storing in a working case registration unit having the working case storage unit the working machine information obtained by the monitoring unit in a way that makes it as a working case mapping to the configuration information.

22. A working control system comprising a working machine and a working control device for controlling the working machine,
   the working control device including:
   a configuration characteristic extraction unit obtaining configuration information about characteristics of a three-dimensional configuration from design data of an object workpiece;

a working case storage unit storing working conditions, as a working case, of a working of a prior formed object workpiece conducted in the past;

a case searching unit searching out the working case from the working case storage unit on the basis of the configuration information;

a working condition setting unit determining the working conditions based on the working case searched out by the case searching unit;

a control unit controlling a working machine on the basis of the working conditions;

a monitoring unit obtaining information of the working machine when the control unit controls based on the working conditions; and a working case registration unit having the working case storage unit stored with the working machine information obtained by the monitoring unit in a way that makes it as a working case mapping to the configuration information.

23. A tool determining method for a working control device comprising the steps of:

obtaining configuration information about characteristics of a three-dimensional configuration from design data of an object workpiece utilizing a configuration characteristic extraction unit, storing in a judgment criterion storage unit a tool library with information of usable tools, storing working conditions, as a working case, of the working conducted in the past in a working case storage unit, searching out the working case from the working case storage unit on the basis of the configuration information utilizing a case searching unit, determining the working conditions based on the working case searched out by the case searching unit utilizing a working condition setting unit, controlling a working machine on the basis of the working conditions utilizing a control unit, the working condition setting unit executing steps of:

determining a minimum tool diameter necessary for the cutting/working on the basis of the design data and the usable tool information;

determining a target time T of the cutting/working on the basis of the working case searched out by the case searching unit;

adding the tools in sequence from the tool having the minimum tool diameter and calculating a time Tn in the case of effecting the cutting/working with the tools inclusive of an n-th tool;

comparing the time Tn with the target time T and repeating a step of calculating the time Tn by adding the tools till the time Tn becomes shorter than the target time T; and determining the using tool from among the n-pieces of tools at a point of time when the time Tn becomes shorter than the target time.

24. A tool determining method for a working control device comprising the steps of:

obtaining configuration information about characteristics of a three-dimensional configuration from design data of an object workpiece utilizing a configuration characteristic extraction unit, storing in a judgment criterion storage unit a tool library with information of usable tools, storing working conditions, as a working case, of the working conducted in the past in a working case storage unit, searching out the working case from the working case storage unit on the basis of the configuration information utilizing a case searching unit, determining the working conditions based on the working case searched out by the case searching unit utilizing a working condition setting unit, controlling a working machine on the basis of the working conditions utilizing a control unit, the working condition setting unit executing:

a step of determines a minimum tool diameter necessary for the cutting/working on the basis of the design data and the usable tool information;

a step of adding the tools in sequence from the tool having the minimum tool diameter and calculating a time Tn in the case of effecting the cutting/working with the tools inclusive of an n-th tool;

a step of comparing a time Tn−1 in the case of effecting the cutting/working with the tools inclusive of an(n−1)th tool with the time Tn, and repeating a process of calculating the time Tn by adding the tools in case the time TN becomes shorter by a predetermined value or above than the time Tn−1; and a step of determining the using tool from among the (n−1)-pieces of tools at a point of time when the time Tn does not become shorter by the predetermined value or above than the time Tn−1.

25. A tool determining program on a computer readable medium comprising the program steps of:

obtaining configuration information about characteristics of a three-dimensional configuration from design data of an object workpiece utilizing a configuration characteristic extraction unit, storing in a judgment criterion storage unit a tool library with information of usable tools, storing working conditions, as a working case, of the working conducted in the past in a working case storage unit, searching out the working case from the working case storage unit on the basis of the configuration information utilizing a case searching unit, determining the working conditions based on the working case searched out by the case searching unit utilizing a working condition setting unit, and controlling a working machine on the basis of the working conditions utilizing a control unit by executing steps of:

determining a minimum tool diameter necessary for the cutting/working on the basis of the design data and the usable tool information;

determining a target time T of the cutting/working on the basis of the working case searched out by the case searching unit;

adding the tools in sequence from the tool having the minimum tool diameter and calculating a time Tn in the case of effecting the cutting/working with the tools inclusive of an n-th tool;

comparing the time Tn with the target time T and repeating a step* of calculating the time Tn by adding the tools till the time Tn becomes shorter than the target time T; and determining the using tool from among the n-pieces of tools at a point of time when the time Tn becomes shorter than the target time.

* * * * *